United States Patent
Tsusaka et al.

(10) Patent No.: US 9,211,646 B2
(45) Date of Patent: *Dec. 15, 2015

(54) CONTROL APPARATUS AND CONTROL METHOD FOR ROBOT ARM, ASSEMBLY ROBOT, CONTROL PROGRAM FOR ROBOT ARM, AND CONTROL-PURPOSE INTEGRATED ELECTRONIC CIRCUIT FOR ROBOT ARM

(75) Inventors: Yuko Tsusaka, Osaka (JP); Yasunao Okazaki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

This patent is subject to a terminal disclaimer.

(21) Appl. No.: 13/085,560

(22) Filed: Apr. 13, 2011

(65) Prior Publication Data

US 2011/0190932 A1    Aug. 4, 2011

Related U.S. Application Data

(63) Continuation of application No. PCT/JP2010/005054, filed on Aug. 12, 2010.

(30) Foreign Application Priority Data

Aug. 21, 2009   (JP) ................................. 2009-191796

(51) Int. Cl.
*B25J 13/08*   (2006.01)
*B25J 9/16*    (2006.01)
*G05B 19/423*  (2006.01)

(52) U.S. Cl.
CPC ................ *B25J 13/08* (2013.01); *B25J 9/1687* (2013.01); *G05B 19/423* (2013.01);
(Continued)

(58) Field of Classification Search
CPC ...... B25J 9/0081; B25J 9/1671; B25J 9/1674; B25J 9/1687; B25J 9/10–9/1005; B25J 9/1628–9/1633; B25J 9/1679; B25J 13/08–13/082; B25J 13/085–13/089; G05B 19/423; G05B 19/42; G05B 19/425; G05B 2219/36432; G05B 2219/36473; G05B 2219/36433; G05B 2219/39198; G05B 2219/39319; G05B 2219/39338; G05B 2219/39409; G05B 2219/39466; G05B 2219/39529; G05B 2219/40028; G05B 2219/40033; G05B 2219/40403; G05B 2219/40547; G05B 2219/40549; G05B 2219/40562; G05B 2219/45058; G05B 2219/45151; Y10S 1/02–1/04; Y10S 1/34

See application file for complete search history.

(56) References Cited

U.S. PATENT DOCUMENTS 5,380,978 A * 1/1995 Pryor ........................ 219/121.64
5,495,410 A * 2/1996 Graf ................................ 700/86
(Continued)

FOREIGN PATENT DOCUMENTS

CN    1824472      8/2006
JP    59-157715    9/1984
(Continued)

OTHER PUBLICATIONS

MicrosoftComputerDictionary_FifthEd_p147.pdf (Mircosoft Computer Dictionary, Fifth Edition, p. 147).*

(Continued)

*Primary Examiner* — Bao Long T Nguyen
(74) *Attorney, Agent, or Firm* — Wenderoth, Lind & Ponack, L.L.P.

(57) ABSTRACT

Provided is a control apparatus for a robot arm performing assembly. The control apparatus includes an operation database recording information as to an operation of the robot arm, and includes a correction operation type determining unit determining a correction type for the operation. The control apparatus also includes a force detecting unit detecting a force of a person, and an operation correction unit correcting an operation in accordance with the force of the person and the correction type, while the robot arm is performing a task.

14 Claims, 43 Drawing Sheets

(52) U.S. Cl.
CPC ............... *G05B 2219/36432* (2013.01); *G05B 2219/36433* (2013.01); *G05B 2219/39319* (2013.01); *G05B 2219/39338* (2013.01); *G05B 2219/40028* (2013.01); *G05B 2219/40033* (2013.01)

(56) References Cited

U.S. PATENT DOCUMENTS

| | | | |
|---|---|---|---|
| 5,956,465 A * | 9/1999 | Takagi et al. | 700/255 |
| 6,385,508 B1 * | 5/2002 | McGee et al. | 700/254 |
| 6,496,756 B1 * | 12/2002 | Nishizawa et al. | 700/264 |
| 6,826,450 B2 * | 11/2004 | Watanabe et al. | 700/245 |
| 2006/0178775 A1 * | 8/2006 | Zhang et al. | 700/245 |
| 2009/0259412 A1 * | 10/2009 | Brogardh | 702/41 |
| 2010/0114371 A1 | 5/2010 | Tsusaka et al. | |

FOREIGN PATENT DOCUMENTS

| | | |
|---|---|---|
| JP | 6-190753 | 7/1994 |
| JP | 6-250728 | 9/1994 |
| JP | 8-141961 | 6/1996 |
| JP | 11-39020 | 2/1999 |
| JP | 2006-212741 | 8/2006 |
| JP | 2008-110406 | 5/2008 |
| JP | 2008-238338 | 10/2008 |
| JP | 2008-296308 | 12/2008 |
| JP | 4512672 | 5/2010 |
| WO | 2008/123200 | 10/2008 |
| WO | 2009/004772 | 1/2009 |
| WO | 2010/016210 | 2/2010 |

OTHER PUBLICATIONS

Notification of Transmittal of Translation of the International Preliminary Report on Patentability mailed Nov. 16, 2010 in corresponding International Application No. PCT/JP2010/005054.

International Search Report issued Nov. 16, 2010 in International (PCT) Application No. PCT/JP2010/005054.

Chinese Office Action and Search Report mailed Dec. 17, 2013 in corresponding Chinese Application No. 201080005370.4, including partial English translation.

* cited by examiner

Fig. 4

| TASK ID | OPERATION ID | RAIL POSITION (x,y) | HAND POSITION AND ORIENTATION OF ROBOT ARM (m) (x,y,z,φ,θ,ψ) | FORCE (N) ($f_x, f_y, f_z,$ $f_\phi, f_\theta, f_\psi$) | FLAG (32 BITS) | TIME (sec) | CORRECTION PARAMETER FLAG (32 BITS) | PROGRESS INFORMATION |
|---|---|---|---|---|---|---|---|---|
| 3 | 1 | 0.1,0 | 0.1,0.1,0.3,0,0,0 | 0,0,0,0,0,0 | BIT 0,1,2 : 1 | 0.37 | BIT 0,1,2 : 1 | 0 |
| 3 | 2 | 0.2,0 | 0.2,0.2,0.4,0,0,0 | 0,0,0,0,0,0 | BIT 0,1,2 : 1 | 0.37 | BIT 0,1,2 : 1 | 0 |
| : | : | : | : | : | : | : | : | : |
| 3 | 7 | 0.5,0.4 | 0.3,0.2,0.4,0,0,0 | 0,0,0,0,0,0 | BIT 0,1,2 : 1 | 0.37 | BIT 0,1,2 : 1 | 0 |
| 3 | 8 | 0.6,0.4 | 0.4,0.2,0.4,0,0,0 | 0,0,0,0,0,0 | BIT 0,1,2 : 1 | 0.37 | BIT 0,1,2 : 1 | 0 |
| 3 | 9 | 0.1,0 | 0.1,0.1,0,0,0,0 | 0,0.5,0,0,0,0 | BIT 0,1,8 : 1 | 0.37 | BIT 0,1,8 : 1 | 0 |
| 3 | 10 | 0.2,0 | 0.1,0.2,0,0,0,0 | 0,0.5,0,0,0,0 | BIT 0,1,8 : 1 | 0.37 | BIT 0,1,8 : 1 | 0 |
| : | : | : | : | : | : | : | : | : |
| 3 | 15 | 0.5,0.4 | 0.2,0.2,0,0,0,0 | 0,0.5,0,0,0,0 | BIT 0,1,8 : 1 | 0.37 | BIT 0,1,8 : 1 | 0 |
| 3 | 16 | 0.6,0.4 | 0.2,0.1,0,0,0,0 | 0,0.5,0,0,0,0 | BIT 0,1,8 : 1 | 0.37 | BIT 0,1,8 : 1 | 0 |
| : | ... | | | | | | | ... |

Fig.5

| | | | | | | | | | | | | UNUSED | |
|---|---|---|---|---|---|---|---|---|---|---|---|---|---|
| | x | y | z | φ | θ | ψ | f$_x$ | f$_y$ | f$_z$ | f$_φ$ | f$_θ$ | f$_ψ$ | | |
| BIT NUMBER | 0 | 1 | 2 | 3 | 4 | 5 | 6 | 7 | 8 | 9 | 10 | 11 | 12 | ... | 31 |
| VALUE | 1 | 1 | 0 | 0 | 0 | 0 | 0 | 0 | 1 | 0 | 0 | 0 | 0 | ... | 0 |

Columns x through ψ: POSITION AND ORIENTATION OF ROBOT ARM

Columns f$_x$ through f$_ψ$: FORCE

Fig.6

| BIT NUMBER | | | | | | | | | | | | | 31 |
|---|---|---|---|---|---|---|---|---|---|---|---|---|---|
| | x | y | z | φ | θ | ψ | $f_x$ | $f_y$ | $f_z$ | $f_φ$ | $f_θ$ | $f_ψ$ | UNUSED |
| | 0 | 1 | 2 | 3 | 4 | 5 | 6 | 7 | 8 | 9 | 10 | 11 | 12 ... |
| VALUE | 1 | 1 | 0 | 0 | 0 | 0 | 0 | 0 | 1 | 0 | 0 | 0 | 0 ... 0 |

Columns x through ψ: POSITION AND ORIENTATION OF ROBOT ARM
Columns $f_x$ through $f_ψ$: FORCE

Fig.10

| TASK DISAPPROVED REGION POSITION (x,y) |
|---|
| ⋮ |
| $x_1, y_1$ |
| $x_2, y_2$ |
| $x_3, y_3$ |
| $x_4, y_4$ |
| ⋮ |

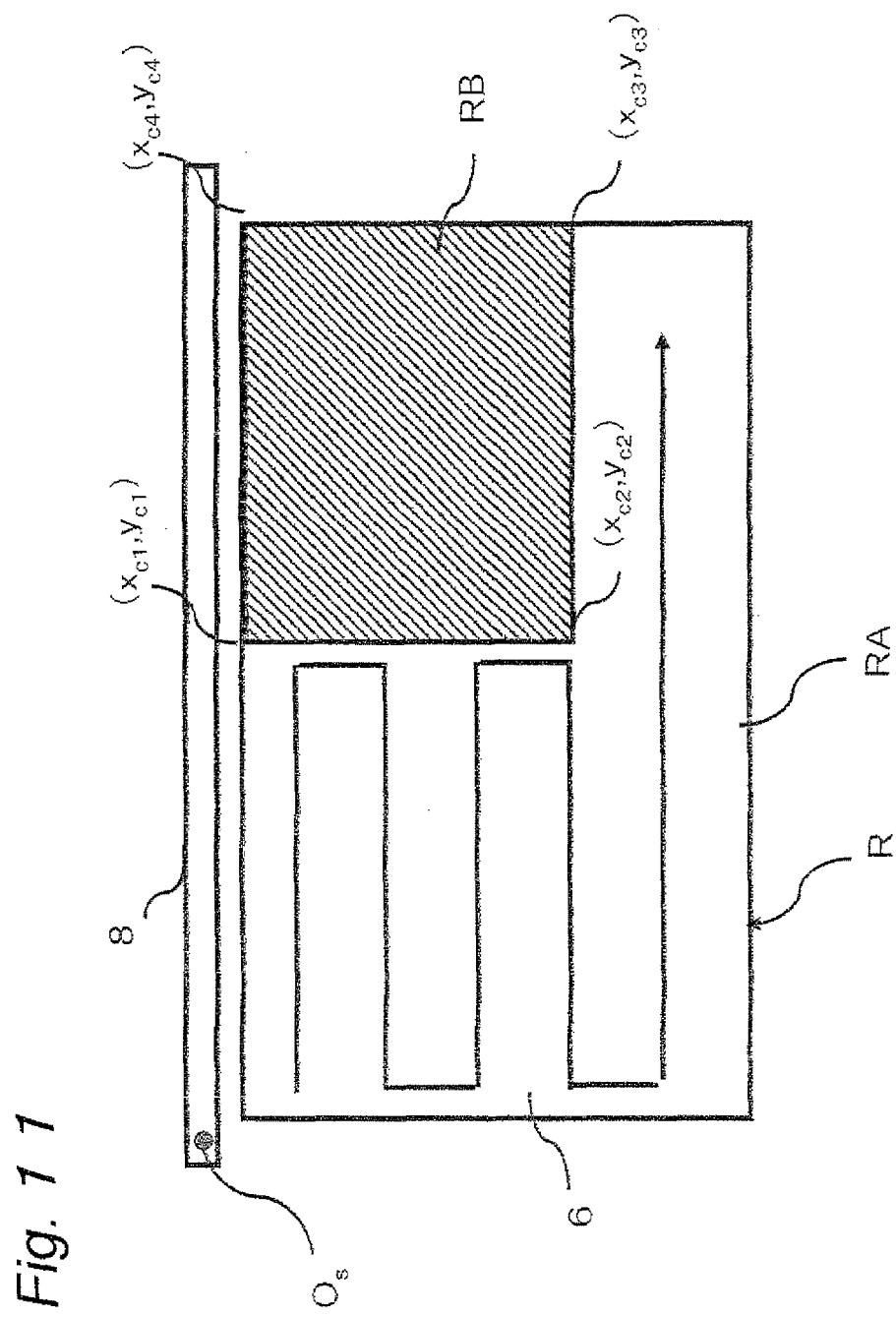

Fig.17

| ID | FLEXIBLE CIRCUIT BOARD ID | 1 | 2 |
|---|---|---|---|
| | CORRECTION PARAMETER | THRESHOLD VALUE | THRESHOLD VALUE |
| 1 | THRESHOLD VALUE FOR FORCE COMPONENTS | $(f_{dx1}, f_{dy1}, f_{dz1}, f_{d\phi1}, f_{d\theta1}, f_{d\psi1})$ | $(f_{dx2}, f_{dy2}, f_{dz2}, f_{d\phi2}, f_{d\theta2}, f_{d\psi2})$ |
| 2 | THRESHOLD VALUE FOR POSITION COMPONENTS | $(g_{x1}, g_{y1}, g_{z1}, g_{\phi1}, g_{\theta1}, g_{\psi1})$ | $(g_{x2}, g_{y2}, g_{z2}, g_{\phi2}, g_{\theta2}, g_{\psi2})$ |
| 3 | THRESHOLD VALUE FOR TARGET OBJECT FORCE COMPONENTS | $(f_{dox1}, f_{doy1}, f_{doz1}, f_{do\phi1}, f_{do\theta1}, f_{do\psi1})$ | $(f_{dox2}, f_{doy2}, f_{doz2}, f_{do\phi2}, f_{do\theta2}, f_{do\psi2})$ |
| 4 | THRESHOLD VALUE 2 FOR TARGET OBJECT FORCE COMPONENTS | $(f_{dox12}, f_{doy12}, f_{doz12}, f_{do\phi12}, f_{do\theta12}, f_{do\psi12})$ | $(f_{dox22}, f_{doy22}, f_{doz22}, f_{do\phi22}, f_{do\theta22}, f_{do\psi22})$ |

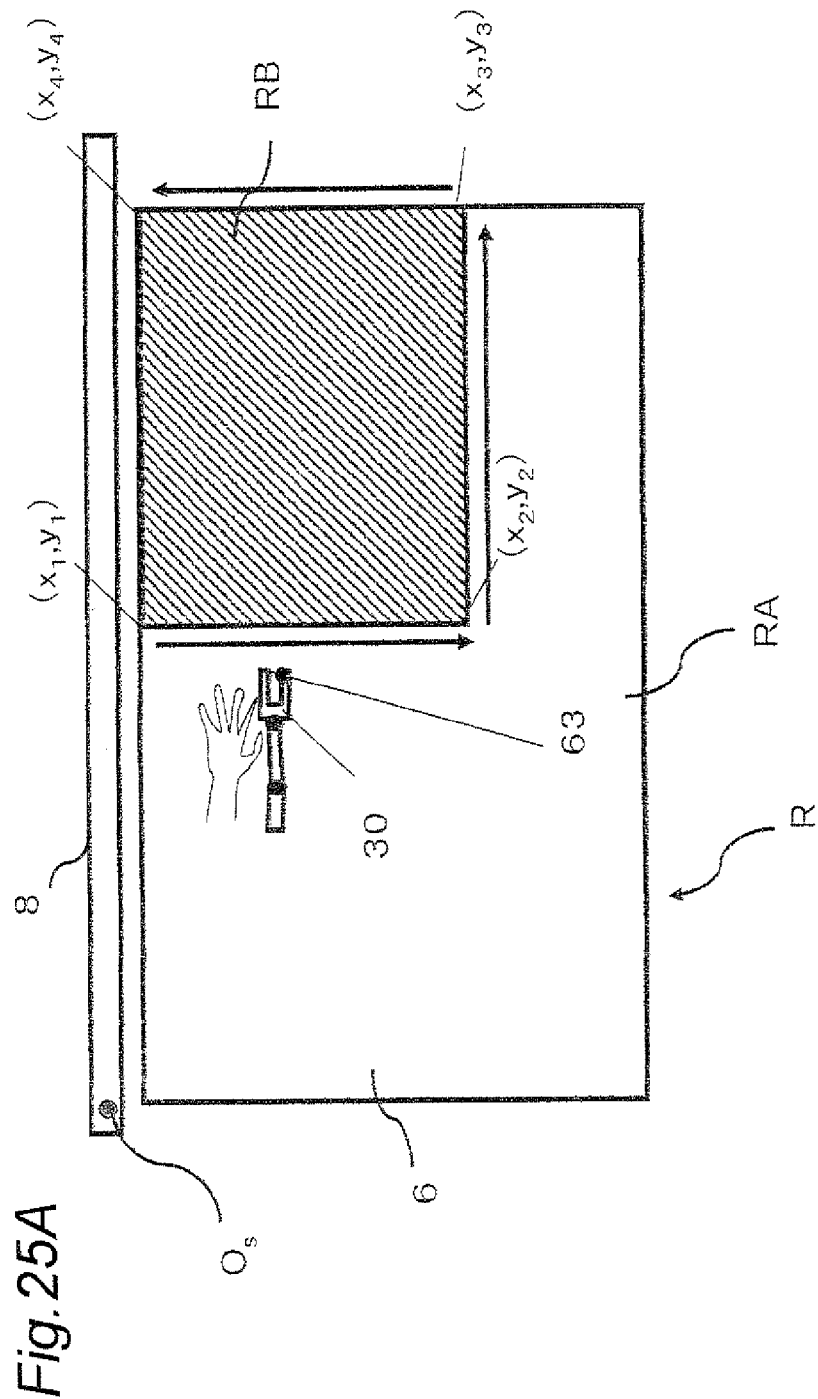
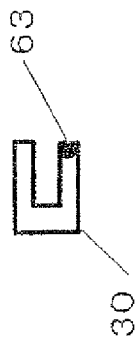

Fig.29

| TASK ID | OPERATION ID | RAIL POSITION (x,y) | HAND POSITION AND ORIENTATION OF ROBOT ARM (m) (x,y,z,φ,θ,ψ) | FORCE (N) ($f_x, f_y, f_z, f_\phi, f_\theta, f_\psi$) | FLAG (32 BITS) | TIME (SEC) | CORRECTION PARAMETER FLAG (32 BITS) | PROGRESS INFORMATION |
|---|---|---|---|---|---|---|---|---|
| 4 | 1 | 0.1,0 | 0.1,0.1,0.3,0,0,0 | 0,0,0,0,0,0 | BIT 0,1,2,3,4,5:1 | 0.37 | BIT 0,1,2,3,4,5:1 | 0 |
| 4 | 2 | 0.2,0 | 0.2,0.2,0.4,0,0,0 | 0,0,0,0,0,0 | BIT 0,1,2,3,4,5:1 | 0.37 | BIT 0,1,2,3,4,5:1 | 0 |
| ... | ... | ... | ... | | ... | ... | ... | ... |
| 4 | 7 | 0.5,0.4 | 0.3,0.2,0.4,0,0,0 | 0,0,0,0,0,0 | BIT 0,1,2,3,4,5:1 | 0.37 | BIT 0,1,2,3,4,5:1 | 0 |
| 4 | 8 | 0.6,0.4 | 0.4,0.2,0.4,0,0,0 | 0,0,0,0,0,0 | BIT 0,1,2,3,4,5:1 | 0.37 | BIT 0,1,2,3,4,5:1 | 0 |
| 4 | 9 | 0.1,0 | 0.1,0.1,0,0,0,0 | 0,0,5,0,0,0 | BIT 0,1,3,4,5,8:1 | 0.37 | BIT 0,1,3,4,5,8:1 | 0 |
| 4 | 10 | 0.2,0 | 0.1,0.2,0,0,0,0 | 0,0,10,0,0,0 | BIT 0,1,3,4,5,8:1 | 0.37 | BIT 0,1,3,4,5,8:1 | 0 |
| 4 | 11 | 0.2,0 | 0.1,0.2,0,0,0,0 | 0,0,8,0,0,0 | BIT 0,1,3,4,5,8:1 | 0.37 | BIT 0,1,3,4,5,8:1 | 0 |
| 4 | 12 | 0.2,0 | 0.1,0.2,0,0,0,0 | 0,0,6,0,0,0 | BIT 0,1,3,4,5,8:1 | 0.37 | BIT 0,1,3,4,5,8:1 | 0 |
| 4 | 13 | 0.2,0 | 0.2,0.2,0,0,0,0 | 0,0,0,0,0,0 | BIT 0,1,2,3,4,5:1 | 0.37 | BIT 0,1,2,3,4,5:1 | 0 |
| 4 | 14 | 0.2,0 | 0.2,0.1,0,0,0,0 | 0,0,0,0,0,0 | BIT 0,1,2,3,4,5:1 | 0.37 | BIT 0,1,2,3,4,5:1 | 0 |
| ... | ... | ... | ... | ... | ... | ... | ... | ... |

CONTROL APPARATUS AND CONTROL METHOD FOR ROBOT ARM, ASSEMBLY ROBOT, CONTROL PROGRAM FOR ROBOT ARM, AND CONTROL-PURPOSE INTEGRATED ELECTRONIC CIRCUIT FOR ROBOT ARM

This is a continuation application of International Application No. PCT/JP2010/005054, filed Aug. 12, 2010.

BACKGROUND OF THE INVENTION

The present invention relates to a control apparatus and a control method for a robot arm for generating and teaching an assembly method to a robot that performs assembly in a factory, for example, an assembly robot having a control apparatus for a robot arm, a program for a robot arm, and a control-purpose integrated electronic circuit for a robot arm.

In recent years, cellular manufacturing is becoming actively employed in factories. According to cellular manufacturing, a wide variety of tasks, such as a screw tightening task or a fitting task and an attaching task of components, an inserting task and a polishing task of a flexible circuit board or the like, are mostly carried out manually.

Further, as to electric products such as mobile phones, the number of models thereof is increasing, and additionally, model change frequently occurs for each of such models. Accordingly, a specification change or a change in the task procedure of handled components frequently occurs.

In order for the tasks to be automated by robots, the tasks must address a wide variety of components or task procedures with flexibility.

To this end, a change in components or in task procedures must be taught easily and quickly.

An exemplary teaching method for a robot apparatus is performed as follows. A force sensor is attached to the wrist of a robot, and a teaching person directly grips a handle attached to the tip of the force sensor so as to guide the robot to teaching points. Thus, the positions of the robot are taught (see Patent Document 1).

What is also performed is as follows. When a robot is taught by being directly gripped, the robot comprehends the intention of the task teaching person and manipulation feel in force control is automatically changed during the teaching work (see Patent Document 2).

PRIOR ART DOCUMENTS

Patent Document

[Patent Document 1] Japanese Unexamined Patent Publication No. 59-157715
[Patent Document 2] Japanese Unexamined Patent Publication No. 2008-110406

SUMMARY OF THE INVENTION

Issues to be Resolved by the Invention

However, in Patent Document 1, because the teaching person must teach all the teaching points, the teaching takes time and is very laborious. Further, in the field of industrial use, when a part of taught motion is to be modified, this must be done through programming through use of a remote apparatus called a teaching pendant, or the entire operation must be taught again from the beginning. Thus, it is inefficient.

Further, in Patent Document 2, in the course of direct teaching by the person, the intention of the task teaching person is comprehended, and the manipulation feel during the task is automatically changed. However, this fails to achieve comprehension of any manipulation intention other than the manipulation feel. That is, which parameter out of a plurality of types of teaching parameters such as position, force, speed, and the like the task teaching person is intended to manipulate is not comprehended. Therefore, the task teaching person must explicitly set which parameter the person is to teach. Still further, the taught motion cannot be modified partially, and hence, the task efficiency is poor.

The present invention has been made in consideration of the foregoing issues, and an object thereof is to provide a control apparatus and a control method for a robot arm, an assembly robot, a control program for a robot arm, and a control-purpose integrated electronic circuit for a robot arm, with which a worker teach a robot easily and quickly.

Means for Resolving the Issues

In order to achieve the foregoing object, the present invention is structured as follows.

According to a first aspect of the present invention, there is provided a control apparatus for a robot arm, the control apparatus controlling an operation of the robot arm for an assembly task-performing robot to perform an assembly task of assembling an assembly-target object gripped by the robot arm with respect to a targeted object, comprising:

a force detecting unit that detects a person's force acting on the robot arm;

an information acquiring unit that acquires information as to the operation that includes a position of the robot arm in the assembly task, and the person's force detected by the force detecting unit;

a target object force detecting unit that detects a force applied to the assembly-target object by the robot arm;

a correction operation type determining unit that determines a correction operation type for correcting the operation, based on the information as to the operation including the position of the robot arm in the assembly task and information as to the person's force each acquired by the information acquiring unit, and the force applied to the target object detected by the target object force detecting unit; and an operation correction unit that corrects the operation by controlling the robot arm, in accordance with the person's force detected by the force detecting unit and acquired by the information acquiring unit, and the correction operation type determined by the correction operation type determining unit, during the assembly task of the robot arm previously determined.

According to an 11th aspect of the present invention, there is provided a control method for a robot arm, the control method controlling an operation of the robot arm for an assembly task-performing robot to perform an assembly task of assembling an assembly-target object gripped by the robot arm with respect to a targeted object, comprising:

detecting by a force detecting unit a person's force acting on the robot arm;

detecting by a target object force detecting unit a force applied to the assembly-target object by the robot arm;

determining by a correction operation type determining unit a correction operation type for correcting the operation, using information as to the operation that includes the position of the robot arm in the assembly task, information as to the person's force acting on the robot arm detected by the force detecting unit and acquired by an information acquiring unit, and the force applied to the target object detected by the target object force detecting unit; and correcting the operation by an operation correction unit by controlling the robot arm, in accordance with the person's force detected by the force detecting unit and acquired by the information acquiring unit, and the correction operation type determined by the correction operation type determining unit, during the assembly task of the robot arm previously determined.

According to a 12th aspect of the present invention, there is provided an assembly robot comprising:

the robot arm; and the control apparatus for a robot arm according to any one of the first to ninth aspects which controls the robot arm.

According to a 13th aspect of the present invention, there is provided a control program for a robot arm for an assembly task-performing robot, the control program being for controlling an operation of the robot arm for the assembly task-performing robot to perform an assembly task of assembling an assembly-target object gripped by the robot arm with respect to a targeted object, the control program causing a computer to execute the steps of:

determining by a correction operation type determining unit a correction operation type for correcting the operation, using information as to the operation that includes a position of the robot arm in the assembly task, information as to the person's force acting on the robot arm detected by force detecting unit and acquired by an information acquiring unit, and a force detected by target object force detecting unit and applied to the target object by the robot arm; and correcting the operation by an operation correction unit by controlling the robot arm, in accordance with the person's force detected by the force detecting unit and acquired by the information acquiring unit, and the correction operation type determined by the correction operation type determining unit, during the assembly task of the robot arm previously determined.

According to a 14th aspect of the present invention, there is provided a control-purpose integrated electronic circuit for a robot arm for an assembly task-performing robot, the control-purpose integrated electronic circuit being for controlling an operation of the robot arm for the assembly task-performing robot to perform an assembly task of assembling an assembly-target object gripped by the robot arm with respect to a targeted object, and comprising:

a correction operation type determining unit that determines a correction operation type for correcting the operation, using information as to the operation that includes a position of the robot arm in the assembly task, information as to the person's force acting on the robot arm detected by force detecting unit and acquired by an information acquiring unit, and a force detected by target object force detecting unit and applied to the target object by the robot arm; and an operation correction unit that corrects the operation by controlling the robot arm, in accordance with the person's force detected by the force detecting unit and acquired by the information acquiring unit, and the correction operation type determined by the correction operation type determining unit during the assembly task of the robot arm previously determined.

Effects of the Invention

As has been described in the foregoing, with the control apparatus for a robot arm of the present invention, provision of the correction operation type determining unit, the force detecting unit, the target object force detecting unit, the operation correction unit, and the control unit makes it possible to exert control of the robot arm, in such a way that an assembly operation can easily be corrected in accordance with the person's force, using the information as to the assembly operation including the force applied by the robot arm, the force applied to the target object, and the position and speed of the robot arm.

Further, with the control method for a robot arm, a control program for a robot arm, and a control-purpose integrated electronic circuit for a robot arm of the present invention, provision of the correction operation type determining unit, the operation correction unit, and the control unit makes it possible to exert control of the robot arm, in such a way that an assembly operation can easily be corrected in accordance with the person's force detected by the force detecting unit, using the information as to the assembly operation including the force applied by the robot arm, the force applied to the target object, and the position and speed of the robot arm.

Still further, provision of the correction operation type determining unit makes it possible to automatically switch and correct a plurality of operations, without the necessity of using buttons or the like.

Still further, provision of the correction operation type determining unit makes it possible to switch between corrections of a plurality of correction types executed at once, and a correction of one correction type executed solely, in accordance with the skill of the person who manipulates or the like.

Still further, further provision of the control parameter managing unit and the control unit makes it possible to set the mechanical impedance value of the robot arm in accordance with the correction operation type, whereby it becomes possible to exert control with the mechanical impedance value changed in accordance with the correct direction of the robot arm or to weaken or stop the force applied to the task plane during the correction.

BRIEF DESCRIPTION OF THE DRAWINGS

These and other aspects and features of the present invention will become clear from the following description taken in conjunction with the preferred embodiments thereof with reference to the accompanying drawings, in which:

FIG. 4 is a view describing a list of operation information of an operation database in the control apparatus for the robot arm according to the first embodiment of the present invention;

FIG. 5 is a view describing information as to flags of the operation database in the control apparatus for the robot arm according to the first embodiment of the present invention;

FIG. 6 is a view describing information as to flags of correction parameters in the control apparatus for the robot arm according to the first embodiment of the present invention;

FIG. 10 is a view describing a list of task disapproved region database information in the control apparatus for the robot arm according to the first embodiment of the present invention;

FIG. 11 is a view relating to the route of the robot arm control apparatus according to the first embodiment of the present invention;

FIG. 17 is a view describing threshold values for force and position in the robot arm control apparatus according to the first embodiment of the present invention;

FIG. 25A is a view showing a manipulating state of the robot arm in the robot arm control apparatus according to the first embodiment of the present invention;

FIG. 25B is an enlarged view of a hand for describing a manipulating state of the robot arm in the robot arm control apparatus of the first embodiment of the present invention;

FIG. 29 is a view describing a list of operation information in an operation database in the robot arm control apparatus according to the embodiment of the present invention;

DETAILED DESCRIPTION OF THE PREFERRED EMBODIMENTS

Figure 1:
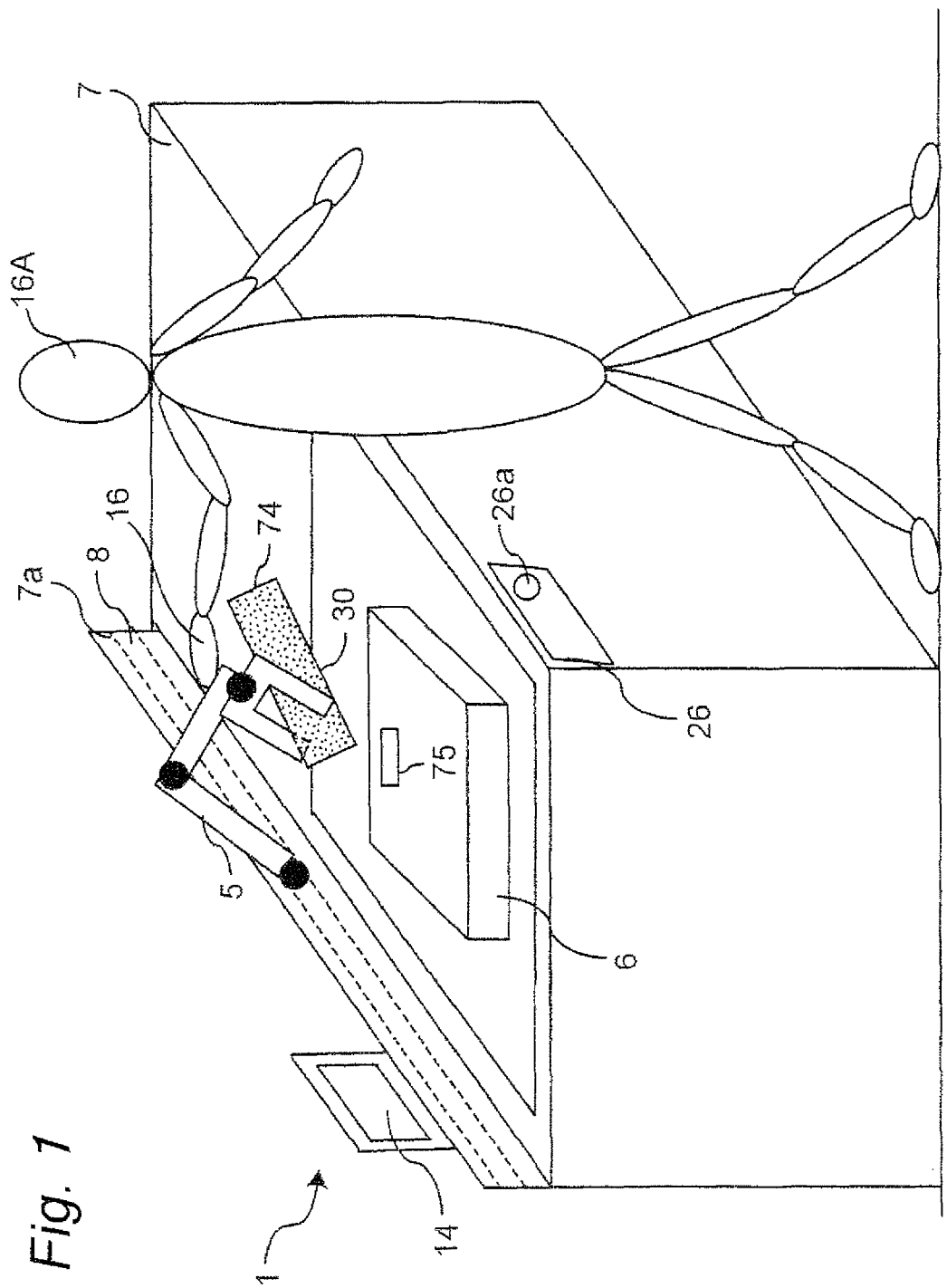
FIG. 1 is a view showing an overview of a control apparatus for a robot arm which structures an assembly robot according to a first embodiment of the present invention.

In the following, with reference to the drawings, a detailed description will be given of embodiments of the present invention.

In the following, before proceeding with the detailed description of the embodiments of the present invention with reference to the drawings, various modes of the present invention will be described.

According to a first aspect of the present invention, there is provided a control apparatus for a robot arm, the control apparatus controlling an operation of the robot arm for an assembly task-performing robot to perform an assembly task of assembling an assembly-target object gripped by the robot arm with respect to a targeted object, comprising:

a force detecting unit that detects a person's force acting on the robot arm;

an information acquiring unit that acquires information as to the operation that includes a position of the robot arm in the assembly task, and the person's force detected by the force detecting unit;

a target object force detecting unit that detects a force applied to the assembly-target object by the robot arm;

a correction operation type determining unit that determines a correction operation type for correcting the operation, based on the information as to the operation including the position of the robot arm in the assembly task and information as to the person's force each acquired by the information acquiring unit, and the force applied to the target object detected by the target object force detecting unit; and an operation correction unit that corrects the operation by controlling the robot arm, in accordance with the person's force detected by the force detecting unit and acquired by the information acquiring unit, and the correction operation type determined by the correction operation type determining unit, during the assembly task of the robot arm previously determined.

With such a structure, an assembly method of the robot arm can be corrected in accordance with the person's force.

According to a second aspect of the present invention, there is provided the control apparatus for a robot arm according to the first aspect, wherein the information as to the operation includes, as being corresponding to the assembly task performed by the robot arm, at least one of: information as to the position and the orientation of the robot arm; information as to a force applied to an assembly task plane by the robot arm; information as to a direction of the robot arm; speed information as to the robot arm; and task disapproved region information being information as to a region where no task of the robot arm is performed.

With such a structure, as being corresponding to the task performed by the robot arm, at least one piece of information out of the positional information, the information as to a force applied by the robot arm, the information as to a direction, the speed information, and the information as to a task undesired region, at each point of time, can be corrected.

According to a third aspect of the present invention, there is provided the control apparatus for a robot arm according to the first aspect, wherein the information as to the operation includes, as being corresponding to the assembly task performed by the robot arm, at least information as to a force applied to the task plane by the robot arm, and based on the information as to the operation, the operation correction unit sets a force control mode in which the robot arm performs the operation having a preset force acted on the task plane, for each of axes of x-, y-, and z-axis directions in which the robot arm is shiftable and, while the robot arm is performing the operation, the operation correction unit corrects, in accordance with the person's force detected by the force detecting unit and acquired by the information acquiring unit, one of a magnitude and a direction of the set force included in the information as to the operation before a correction operation.

With such a structure, while the robot arm is performing the operation in a force control mode in which the robot arm performs the operation having a preset force acted on the task plane, the force control mode being set for each of axes of x-, y-, and z-axis directions in which the robot arm is shiftable, in accordance with the person's force detected by the force detecting unit, one of a magnitude and a direction of the set force included in the information as to the operation before a correction operation can be corrected, based on the information as to the operation.

According to a fourth aspect of the present invention, there is provided the control apparatus for a robot arm according to the first aspect, wherein the information as to the operation includes, as being corresponding to the assembly task performed by the robot arm: information as to the position and the orientation of the robot arm; information as to a direction of the robot arm; speed information as to the robot arm; and task disapproved region information being information as to a region where no task is performed, and an based on the information as to the operation, the operation correction unit sets impedance control mode in which the robot arm actuates in accordance with a force applied to the robot arm by the person while operating in a position control mode in which the position of the robot arm is controlled, the impedance control mode being set for each of axes of x-, y-, z-axis directions in which the robot arm is shiftable and, while the robot arm is operating the task, the operation correction unit corrects, in accordance with the person's force detected by the force detecting unit and acquired by the information acquiring unit, the operation of the information as to the operation in the impedance control.

With such a structure, while the robot arm is operating the task in an impedance control mode in which the robot arm actuates in accordance with a force applied to the robot arm by the person with its drive stopped while operating in a position control mode in which the position of the robot arm is controlled, the impedance control mode being set for each of axes of x-, y-, z-axis directions in which the robot arm is shiftable, the operation of the information as to the operation in the impedance control can be corrected in accordance with the person's force detected by the force detecting unit, based on the information as to the operation.

According to a fifth aspect of the present invention, there is provided the control apparatus for a robot arm according to one of the first to fourth aspects, further comprising a display unit that displays information as to the correction operation type based on the correction operation type determined by the correction operation type determining unit.

According to a sixth aspect of the present invention, there is provided the control apparatus for a robot arm according to the first aspect, wherein the correction operation type determining unit detects a shift amount of the position and the orientation of the hand of the robot arm, when the force applied to the target object detected by the target object detecting unit and acquired by the information acquiring unit is less than a first threshold value, and the shift amount of the position and the orientation of the hand of the robot arm detected by the correction operation type determining unit is equal to or more than a third threshold value, the correction operation type determining unit determines a task plane position-and-orientation shift type as the correction operation type, and the operation correction unit corrects the position and the orientation of the hand of the robot arm, in accordance with the person's force detected by the force detecting unit and acquired by the information acquiring unit and the correction operation type determined by the correction operation type determining unit.

According to a seventh aspect of the present invention, there is provided the control apparatus for a robot arm according to the first aspect, wherein the correction operation type determining unit detects a shift amount of the position and the orientation of the hand of the robot arm, when the force applied to the target object detected by the target object detecting unit and acquired by the information acquiring unit is less than a first threshold value, and the shift amount of the position and the orientation of the hand of the robot arm detected by the correction operation type determining unit is less than a third threshold value, the correction operation type determining unit determines a speed correction type as the correction operation type, and the operation correction unit corrects a speed of the robot arm, in accordance with the person's force detected by the force detecting unit and acquired by the information acquiring unit and the correction operation type determined by the correction operation type determining unit.

According to an eighth aspect of the present invention, there is provided the control apparatus for a robot arm according to the first aspect, wherein the correction operation type determining unit detects a shift amount of the position and the orientation of the hand of the robot aria, in a situation: where a component of the force applied to the target object detected by the target object force detecting unit and acquired by the information acquiring unit exceeds a certain threshold value for a certain time period; where the force applied to the target object detected by the target object force detecting unit and acquired via the information acquiring unit is equal to or less than another certain threshold value for a certain time period; and where the shift amount of the robot arm detected by the correction operation type determining unit is equal to or more than a certain threshold value, the correction operation type determining unit determines a position-and-orientation correction type as the correction operation type, and the operation correction unit corrects the position and the orientation of the robot arm, in accordance with the force applied to the target object detected by the target object force detecting unit and acquired via the information acquiring unit and the correction operation type determined by the correction operation type determining unit.

According to a ninth aspect of the present invention, there is provided the control apparatus for a robot arm according to the first aspect, wherein in a situation: where a component of the force applied to the target object detected by the target object force detecting unit and acquired via the information acquiring unit exceeds a certain threshold value for a certain time period; and where the force applied to the target object detected by the target object force detecting unit and acquired via the information acquiring unit exceeds another certain threshold value for a certain time period, the correction operation type determining unit determines a force correction type as the correction operation type, and the operation correction unit corrects the position and the orientation of the robot arm, in accordance with the force applied to the target object detected by the target object force detecting unit and acquired via the information acquiring unit and the correction operation type determined by the correction operation type determining unit.

According to a tenth aspect of the present invention, there is provided the control apparatus for a robot arm according to any one of the first to ninth, further comprising a display unit that displays information as to the correction operation type based on the correction operation type determined by the correction operation type determining unit.

With such a structure, information as to a correction operation type can be displayed.

According to an 11th aspect of the present invention, there is provided a control method for a robot arm, the control method controlling an operation of the robot arm for an assembly task-performing robot to perform an assembly task of assembling an assembly-target object gripped by the robot arm with respect to a targeted object, comprising:

detecting by a force detecting unit a person force acting on the robot arm;

detecting by a target object force detecting unit a force applied to the assembly-target object by the robot arm;

determining by a correction operation type determining unit a correction operation type for correcting the operation, using information as to the operation that includes the position of the robot arm in the assembly task, information as to the person's force acting on the robot arm detected by the force detecting unit and acquired by an information acquiring unit, and the force applied to the target object detected by the target object force detecting unit; and correcting the operation by an operation correction unit by controlling the robot arm, in accordance with the person's force detected by the force detecting unit and acquired by the information acquiring unit, and the correction operation type determined by the correction operation type determining unit, during the assembly task of the robot arm previously determined.

With such a structure, it becomes possible to determine the correction type of the operation, to detect the person's force, so as to provide the operation in accordance with the person's force and the correction type, during the robot arm is performing the task, based on information as to the operation of the robot arm.

According to a 12th aspect of the present invention, there is provided an assembly robot comprising:

the robot arm; and the control apparatus for a robot arm according to any one of the first to ninth aspects which controls the robot arm.

According to a 13th aspect of the present invention, there is provided a control program for a robot arm for an assembly task-performing robot, the control program being for controlling an operation of the robot arm for the assembly task-performing robot to perform an assembly task of assembling an assembly-target object gripped by the robot arm with respect to a targeted object, the control program causing a computer to execute the steps of:

determining by a correction operation type determining unit a correction operation type for correcting the operation, using information as to the operation that includes a position of the robot arm in the assembly task, information as to the person's force acting on the robot arm detected by force detecting unit and acquired by an information acquiring unit, and a force detected by target object force detecting unit and applied to the target object by the robot arm; and correcting the operation by an operation correction unit by controlling the robot arm, in accordance with the person's force detected by the force detecting unit and acquired by the information acquiring unit, and the correction operation type determined by the correction operation type determining unit, during the assembly task of the robot arm previously determined.

According to a 14th aspect of the present invention, there is provided a control-purpose integrated electronic circuit for a robot arm for an assembly task-performing robot, the control-purpose integrated electronic circuit being for controlling an operation of the robot arm for the assembly task-performing robot to perform an assembly task of assembling an assembly-target object gripped by the robot arm with respect to a targeted object, and comprising:

a correction operation type determining unit that determines a correction operation type for correcting the operation, using information as to the operation that includes a position of the robot arm in the assembly task, information as to the person's force acting on the robot arm detected by force detecting unit and acquired by an information acquiring unit, and a force detected by target object force detecting unit and applied to the target object by the robot arm; and an operation correction unit that corrects the operation by controlling the robot arm, in accordance with the person's force detected by the force detecting unit and acquired by the information acquiring unit, and the correction operation type determined by the correction operation type determining unit during the assembly task of the robot arm previously determined.

In the following, with reference to the drawings, a detailed description will be given of embodiments of the present invention.

First Embodiment

First, a description will be given of the structure of an assembly robot 1 including a control apparatus for a robot arm according to a first embodiment of the present invention.

As shown in FIG. 1, as one example of the assembly robot 1, a description will be given of a robot arm 5 for an assembly robot that performs an assembly task, based on cellular manufacturing in a factory, of installing a flexible circuit board 74 in a flexible circuit board insert slot 75 of a device 6 such as a television set, a DVD recorder, or a mobile phone.

The robot arm 5 of the assembly robot 1 is installed on a wall surface 7a of a workbench 7. The base end of the robot arm 5 is shiftably supported by a rail 8 fixed to the wall surface 7a, such that the robot arm 5 can shift on the rail 8 in a lateral direction along the rail 8, e.g., in the horizontal direction, by a force of a hand 16 of a person 16A, or can automatically be shifted by a motor or the like. The fixation position of the base end of the robot arm 5 is not limited to the wall surface 7a of the workbench 7, and it may be installed at the ceiling or the like.

Provided at the side surface of the workbench 7 is a data input IF 26 such as a console 26A having a button 26a or the like disposed. Further, a display unit 14 as one example of display means is provided at the wall surface of the workbench 7.

The rail 8 is structured with a rail fixed portion 8a fixed to the wall surface 7a and a rail movable portion 8b, which includes a wheel (not shown) rotated in forward and reverse directions by a drive operation of a motor 65, so as to be shiftable relative to the rail fixed portion 8a. The base portion 34 having the base end of the robot arm 5 coupled thereto is coupled to the rail movable portion 8b. Thus, the base portion 34 of the robot arm 5 is structured to be shiftable with the rail movable portion 8b relative to the rail fixed portion 8a. Alternatively, this structure may be replaced by a structure in which the base portion 34 having the base end of the robot arm 5 coupled thereto is provided with a wheel rotated in forward and reverse directions by a drive operation of the motor 65, such that the base portion 34 shifts along the rail 8 fixed on the wall surface 7a.

At the tip of the robot arm 5, a hand 30 capable of opening and closing for gripping the flexible circuit board 74 is attached.

The assembly robot 1 is a robot which inserts the flexible circuit board 74 into the insert slot 75 of the device 6 fixedly placed on the workbench 7, and is structured with the robot arm 5 and a control apparatus controlling the operation of the robot arm 5.

The overview of the manipulation procedure of the assembly robot 1 will be given.

Figure 2A:
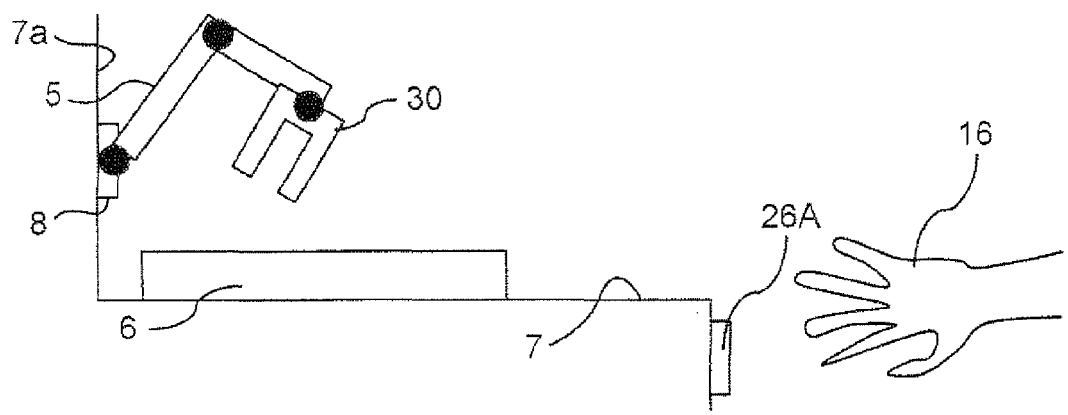
FIG. 2A is a view showing a manipulating state of the robot arm in a control apparatus for the robot arm according to the first embodiment of the present invention.
Figure 26:
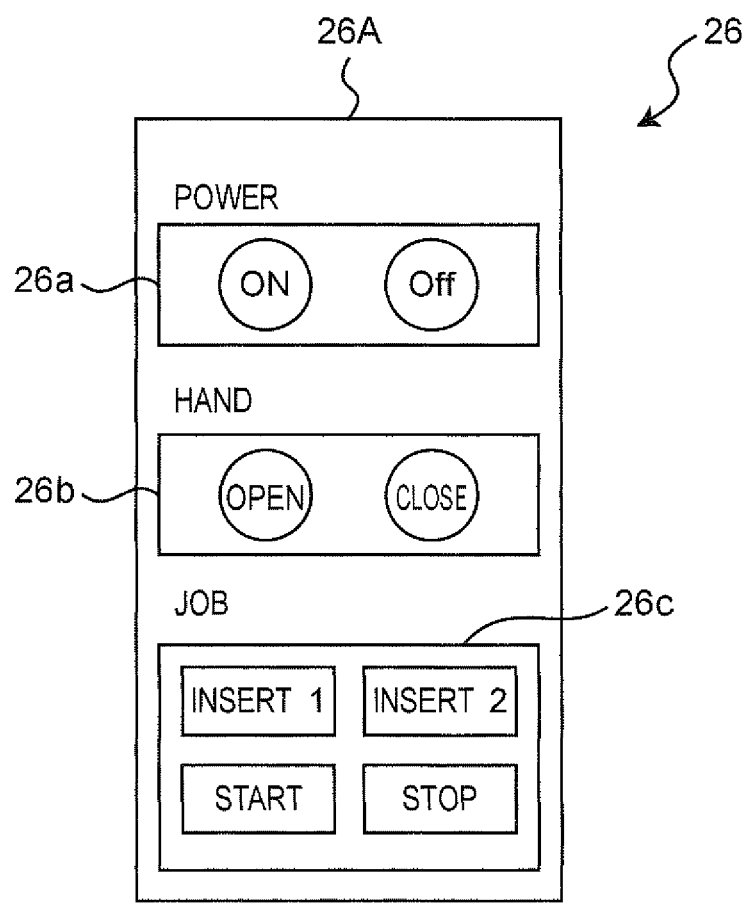
FIG. 26 is a view describing a data input IF of a peripheral apparatus in the robot arm control apparatus according to the first embodiment of the present invention.

First, as shown in FIG. 2A, a person 16 turns the power on through the data input IF 26 disposed at the side surface of the workbench 7 (e.g., by pressing "ON" of the power button 26a of the console 26A shown in FIG. 26).

Figure 2B:
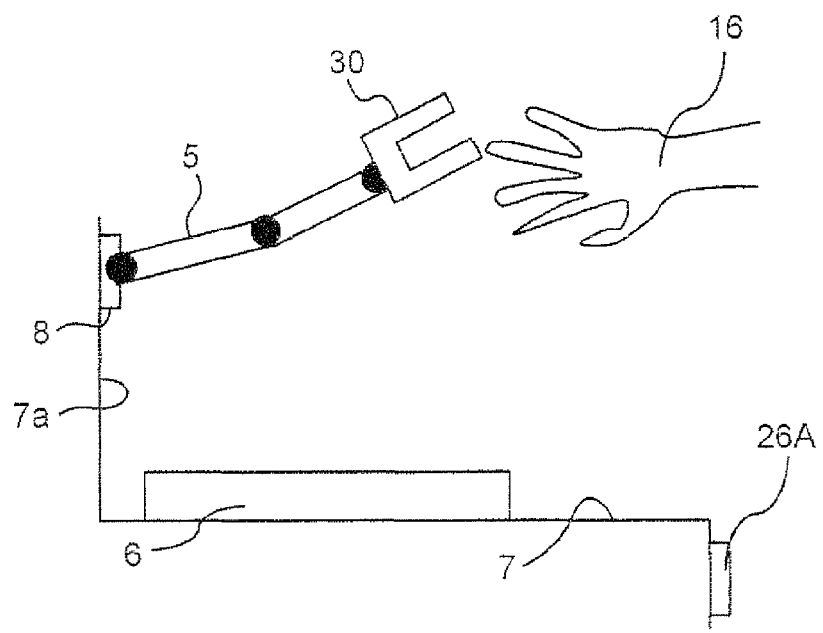
FIG. 2B is a view showing a manipulating state of the robot arm in the control apparatus for the robot arm according to the first embodiment of the present invention.

Next, the device 6 is installed on the workbench 7. Upon installation, as shown in FIG. 2B, the robot arm 5 can be shifted by the person's hand 16, so that the tip of the robot arm 5 is shifted to attain easier installation of the device 6 on the workbench 7 (the robot arm 5 can be shifted by the person's hand 16 to a position where it does not bother the installation of the device 6 on the workbench 7).

Next, the data input IF 26 disposed at the side surface of the workbench 7 (e.g., a start button of task switches 26c of the console 26A shown in FIG. 26) is pressed by the person's hand 16, whereby the assembly robot 1 actuates. Then, an optimum assembly operation is selected by an operation selecting unit 29, the description of which will be given later. Based on the selected operation, the assembly task by the robot arm 5 is started.

It is to be noted that, though it has been described that the console 26A as one example of the data input IF 26 is fixed at the side surface of the workbench 7, it may be a remote controller with which teleoperation can be performed.

When the robot arm 5 performs the assembly task, the circuit board of the flexible circuit board 74 itself or any desired portion such as a connector portion at the tip of the circuit board is gripped by the hand 30 of the robot arm 5.

Thereafter, in a state where the robot arm 5 is gripping the flexible circuit board 74 with the hand 30, the robot arm 5 is shifted by the person's hand 16 or is automatically shifted, whereby the connector portion of the flexible circuit board 74 faces the flexible circuit board insert slot 75 of the device 6, and the robot arm 5 inserts the connector portion of the flexible circuit board 74 into the insert slot 75. Thus, the flexible circuit board 74 is assembled into the device 6. Here, as necessary, control is exerted so as to correct the operation of the robot arm 5, e.g., by pushing the robot arm 5 with the person's hand 16.

Figure 18A:
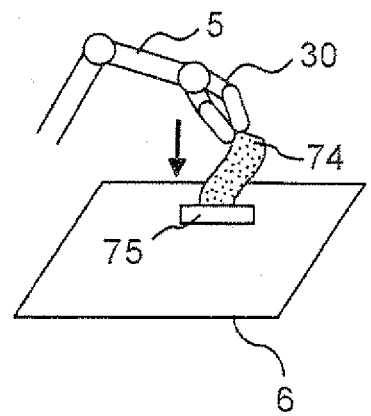
FIG. 18A is a view showing a manipulating state of the robot arm in the robot arm control apparatus according to the first embodiment of the present invention.
Figure 18B:
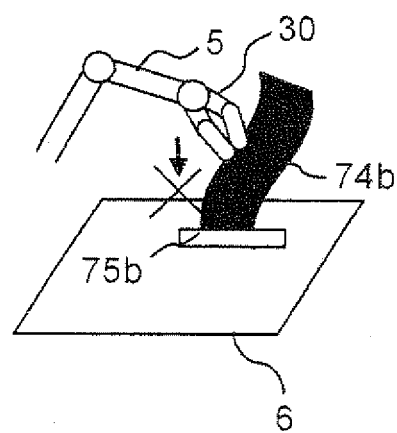
FIG. 18B is a view showing a manipulating state of the robot arm in the robot arm control apparatus according to the first embodiment of the present invention.
Figure 18C:
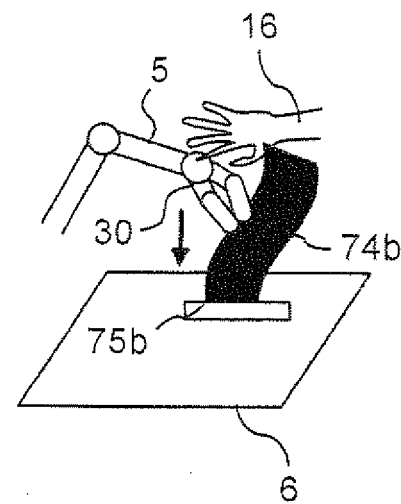
FIG. 18C is a view showing a manipulating state of the robot arm in the robot arm control apparatus according to the first embodiment of the present invention.
Figure 18D:
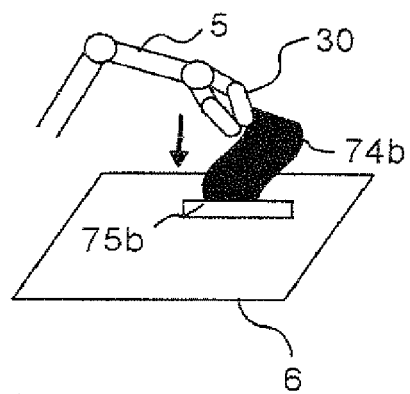
FIG. 18D is a view showing a manipulating state of the robot arm in the robot arm control apparatus according to the first embodiment of the present invention.

More specifically, as shown in FIG. 18B, in a case where an extent of force or position in connection with an insertion of the flexible circuit board 74 into the insert slot 75 is changed, due to a change in model of the flexible circuit board 74, the device 6 or the like, the person 16 checks the state of such a change, and executes a correction by pushing the robot arm 5 with the person's hand 16, as shown in FIG. 18C, such that the robot arm 5 exerts a greater force. In this manner, as shown in FIG. 18D, the insert operation can be performed with a greater extent of force. In the following, a detailed description will be given of the assembly task by such a robot arm 5.

Figure 3:
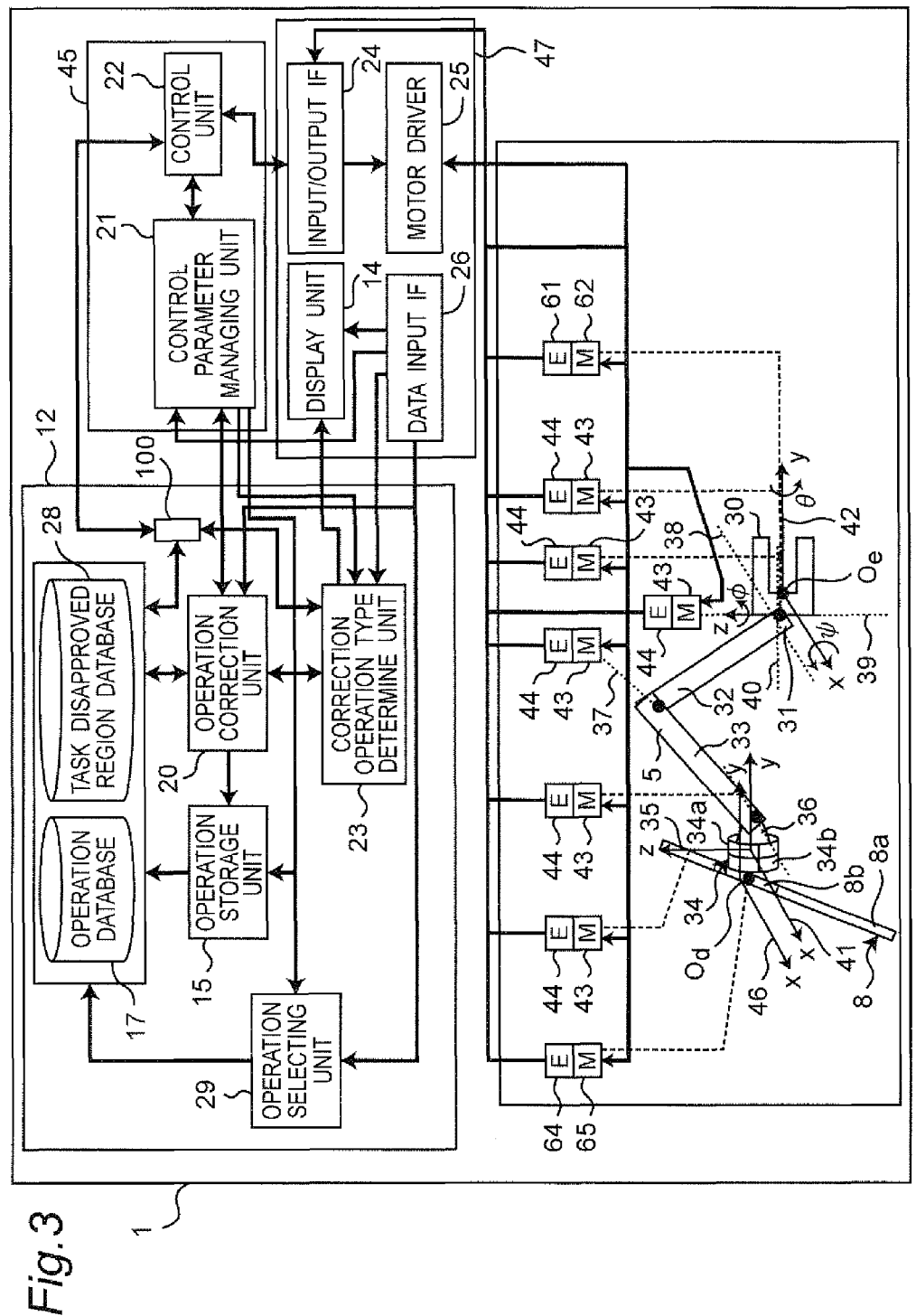
FIG. 3 is a view showing a detailed structure of the control apparatus for the robot arm according to the first embodiment of the present invention and the robot arm being a control target.

FIG. 3 is a view showing the constituents of the control apparatus structuring the assembly robot 1, in which the detailed structure of a control apparatus body unit 45, an operation generating apparatus 12 generating operations, the robot arm 5 being the control target, the rail 8, and a peripheral apparatus 47 are shown. The control apparatus of the assembly robot 1 is schematically structured with the control apparatus body unit 45, the operation generating apparatus 12, and the peripheral apparatus 47.

The control apparatus body unit 45, the operation generating apparatus 12, and the peripheral apparatus 47 are each structured with a general personal computer.

The control apparatus body unit 45 is structured to include: a control parameter managing unit 21 as one example of control parameter managing means connected to each of an operation correction unit 20 as one example of operation correction means of the operation generating apparatus 12, a correction operation type determining unit 23 as one example of correction operation type determining means, and the data input IF 26 of the peripheral apparatus 47; and a control unit (impedance control unit) 22 as one example of impedance control means connected to the control parameter managing unit 21 and an input/output IF 24 of the peripheral apparatus 47.

The operation generating apparatus 12 is structured to include an operation database 17, a task disapproved region database 28, the operation correction unit 20, the correction operation type determining unit 23, the operation storage unit 15, the operation selecting unit 29, and an information acquiring unit (one example of information acquiring means) 100. The operation storage unit 15 is connected to the operation database 17, the task disapproved region database 28, and the operation correction unit 20. The operation database 17 and the task disapproved region database 28 are both connected to the operation storage unit 15, the operation correction unit 20, and the operation selecting unit 29. Connected to the operation correction unit 20 are the operation database 17, the task disapproved region database 28, the operation storage unit 15, the control parameter managing unit 21 of the control apparatus body unit 45, the correction operation type determining unit 23, and the data input IF 26 of the peripheral apparatus 47. The correction operation type determining unit 23 is connected to the operation correction unit 20, the data input IF 26 of the peripheral apparatus 47, and the control parameter managing unit 21 of the control apparatus body unit 45. The operation selecting unit 29 is connected to the operation database 17, the task disapproved region database 28, and the data input IF 26. The information acquiring unit 100 is connected to the correction operation type determining unit 23, the operation database 17, the task disapproved region database 28, a force detecting unit (one example of force detecting means) 53 of the control unit 22 and a target object force detecting unit (one example of target object force detecting means) 78. Hence, the information acquiring unit 100 is capable acquiring information as to the operation of the robot arm 5 including the position of the robot arm 5 in performing the assembly task, information as to a person's force acting on the robot arm 5 detected by the force detecting unit 53, and information from the target object force detecting unit 78. The information acquired by the information acquiring unit 100 is input to the correction operation type determining unit 23. Based on the information as to the operation and the information as to the person's force each acquired by the information acquiring unit 100, as will be described later, the correction operation type determining unit 23 can determine a correction operation type for correcting the operation of the robot arm 5.

The peripheral apparatus 47 is structured to include: the data input IF 26 connected to the correction operation type determining unit 23, the operation correction unit 20, the control parameter managing unit 21 of the control apparatus body unit 45, the display unit 14, and the operation generating apparatus 12; the input/output IF 24 connected to an encoder 64 attached to the rotary shaft of a motor 65 of the rail movable portion 8b to detect an angle of rotation of the rotary shaft, an encoder 44 attached to the rotary shaft of a motor 43 of each of joint portions to detect an angle of rotation of the rotary shaft, and an encoder 61 attached to the rotary shaft of a hand drive-purpose motor 62 to detect an angle of rotation of the rotary shaft, the input/output IF 24 receiving inputs of the such pieces of angle information and being connected to the control unit 22; a motor driver 25 connected to the motor 65 of the rail movable portion 8b, the motor 43 of each of the joint portions of the robot arm 5, and the hand open/close drive-purpose motor 62; and the display unit 14 connected to the correction operation type determining unit 23.

The input/output IF 24 is structured to include elements connected to an expansion slot such as a PCI bus of a personal computer, for example, a D/A board, an A/D board, a counter board, and the like.

The operation generating apparatus 12, the control apparatus body unit 45, and the peripheral apparatus 47, each controlling the operations of the robot arm 5 and the rail movable portion 8b, perform their respective operations, whereby the joint angle information pieces, which are joint angle information pieces as to respective joint portions of the robot arm 5 and are output from the encoder 44, the description of which will be given later, are acquired by the control apparatus body unit 45 via the input/output IF 24. Then, the control apparatus body unit 45 calculates control command values for rotary operations of the joint portions of the robot arm 5 based on the acquired joint angle information pieces. Further, positional information as to the rail movable portion 8b being output from the encoder 64 of the motor 65 of the rail movable portion 8b is acquired by the control apparatus body unit 45 via the input/output IF 24. Then, the control apparatus body unit 45 calculates a control command value for the motor 65 of the rail movable portion 8b based on the acquired pieces of positional information.

The calculated control command values of the motors 43 of respective joint portions of the robot arm 5 are provided to the motor driver 25 via the input/output IF 24. In accordance with the control command values sent from the motor driver 25, the motors 43 of respective joint portions of the robot arm 5 are driven independently of one another.

Further, the calculated control command value of the rail movable portion 8b is provided to the motor driver 25 via the input/output IF 24. In accordance with the control command value sent from the motor driver 25, the motor 65 of the rail movable portion 8b is driven.

Still further, the hand 30 is structured to further include the hand drive-purpose motor 62 as one example of a hand driving device whose drive operation is controlled by the motor driver 25 and the encoder 61 that detects a rotation phase angle of the rotary shaft of the hand drive-purpose motor 62. Thus, for example, rotation of the rotary shaft of the motor 62 in the forward direction causes the hand 30 to open, while the flexible circuit board 74 is positioned at a position where it can be gripped by the hand 30; and rotation of the rotary shaft of the motor 62 in the reverse direction causes the hand 30 to close, and to grip the flexible circuit board 74 having been positioned where it can be gripped by the hand 30. In such a case, the hand 30 is opened and closed by causing the rotary shaft of the hand drive-purpose motor 62 to rotate in the forward and reverse directions, by having the rotary drive operation of the hand drive-purpose motor 62 controlled via the motor driver 25 by a control signal (open/close command signal) from a hand control unit 54 (shown in FIG. 7) of the control unit 22 of the control apparatus body unit 45, based on the angle of rotation of the rotary shaft of the motor 62 detected by the encoder 61.

The robot arm 5, which is a multi-link manipulator having six degrees of freedom, includes the hand 30, a fore-arm link 32 having at its tip a wrist portion 31 to which the hand 30 is attached, an upper-arm link 33 having its tip rotatably coupled to the base end of the fore-arm link 32, and a base portion 34 to which the base end of the upper-arm link 33 is rotatably coupled and supported thereon. The base portion 34 is coupled to the rail movable portion 8b. The wrist portion 31 has three rotation axes relating to a fourth joint portion 38, a fifth joint portion 39, and a sixth joint portion 40, such that the relative orientation of the hand 30 to the fore-arm link 32 can be changed. That is, in FIG. 3, the fourth joint portion 38 makes it possible to change the relative orientation about the lateral axis of the hand 30 to the wrist portion 31. The sixth joint portion 40 makes it possible to change the relative orientation about the lateral axis of the hand 30 to the wrist portion 31, the lateral axis being perpendicular to the lateral axis of the fourth joint portion 38 and to the longitudinal axis of the fifth joint portion 39. The other end of the fore-arm link 32 is allowed to rotate about a third joint portion 37 relative to the tip of the upper-arm link 33, that is, about the lateral axis parallel to the lateral axis of the fourth joint portion 38. The other end of the upper-arm link 33 is allowed to rotate about a second joint portion 36 relative to the base portion 34, that is, about the lateral axis parallel to the lateral axis of the fourth joint portion 38. Further, a top-side movable portion 34a of the base portion 34 is allowed to rotate about a first joint portion 35 relative to a bottom-side fixed portion 34b of the base portion 34, that is, about the longitudinal axis parallel to the longitudinal axis of the fifth joint portion 39. As a result, the robot arm 5 is allowed to rotate about each of the six axes in total, to structure the multi-link manipulator having six degrees of freedom.

Each of the joint portions structuring the rotation portions of the respective axes includes the motor 43 as one example of a rotary driver device, and the encoder 44 detecting a rotation phase angle (i.e., a joint angle) of the rotary shaft of the motor 43. The motor 43 is included in one of paired members (e.g., a rotation-side member and a support-side member supporting the rotation-side member) structuring each of the joint portions, and its drive operation is controlled by the motor driver 25, the description of which will be given later (the motor is actually disposed inside the one member of each joint portion of the robot arm 5). Further, the encoder 44 is disposed in the one member for detecting a rotation phase angle (i.e., a joint angle) of the rotary shaft of the motor 43 (the encoder 44 is actually disposed inside the one member of each joint portion of the robot arm 5). The rotary shaft of the motor 43 included in the one member is coupled to the other member to cause the rotary shaft to rotate in the forward and reverse directions, whereby the other member is allowed to rotate about each axis relative to the one member.

Figure 8:
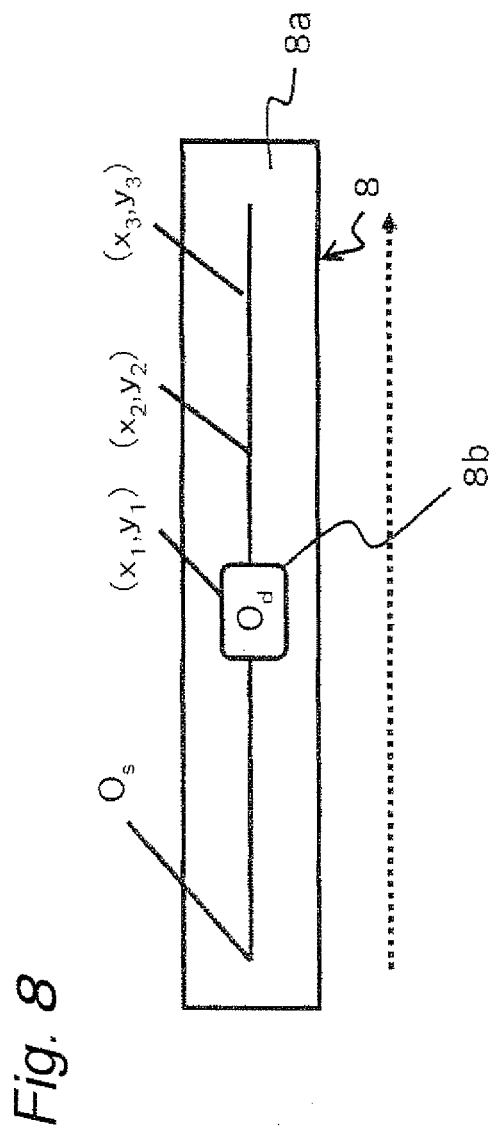
FIG. 8 is a view relating to a route of the control apparatus for the robot arm according to the first embodiment of the present invention.

Reference numeral 46 denotes a rail coordinate system $O_d$, which represents the relative positional relationship with reference to a point $O_s$ at an end of the rail 8 (see FIG. 8). Reference numeral 41 denotes a base portion coordinate system of the base portion 34 fixed to the rail movable portion 8b fixed to the rail 8, which represents the relative positional relationship with reference to the rail coordinate system $O_d$. A hand coordinate system 42 represents the relative positional relationship with reference to the base portion coordinate system 41.

Figure 12A:
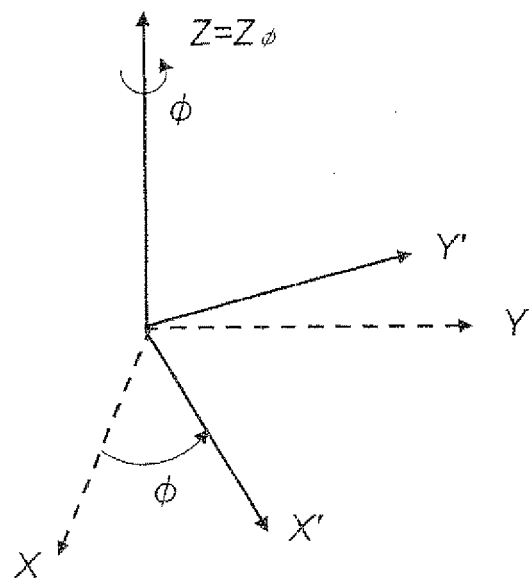
FIG. 12A is a view relating to a coordinate system in the robot arm control apparatus according to the first embodiment of the present invention.
Figure 12B:
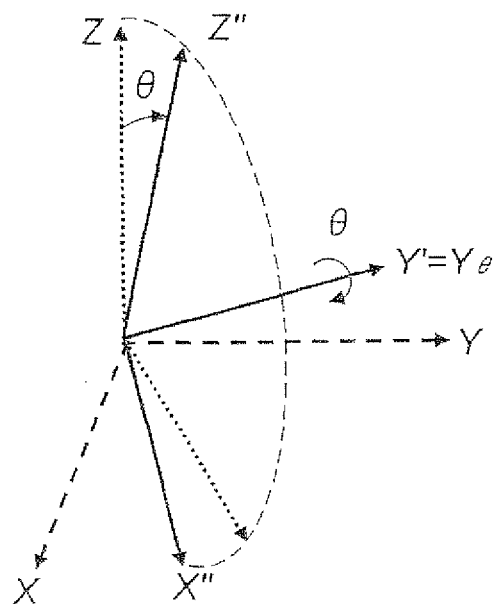
FIG. 12B is a view relating to the coordinate system in the robot arm control apparatus according to the first embodiment of the present invention.
Figure 12C:
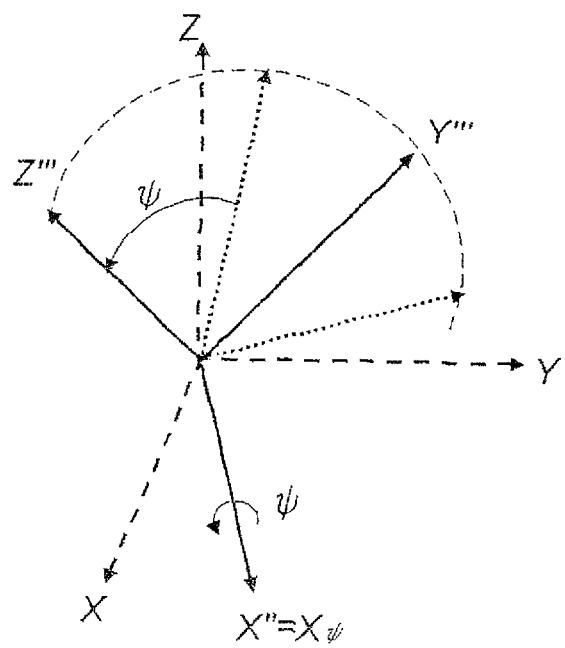
FIG. 12C is a view relating to the coordinate system in the robot arm control apparatus according to the first embodiment of the present invention.

The origin position $O_d$ (x, y) of the rail coordinate system 46 viewed from the point $O_s$ at the end of the rail 8 is defined as the position of the rail movable portion 8b (rail position). Further, a hand position and orientation vector is defined as a vector r=[x, y, z, $\phi$, $\theta$, $\psi$]$^T$, in which the origin position $O_e$ (x, y, z) of the hand coordinate system 42 viewed from the base portion coordinate system 41 is the hand position of the robot arm 5 (the position of the tip of the hand 30); and the orientation of the hand coordinate system 42 viewed from the base portion coordinate system 41 is the hand orientation of the robot arm 5 represented by ($\phi$, $\theta$, $\psi$) easing a roll angle, a pitch angle, and a yaw angle. With reference to FIGS. 12A to 12C, a description will be given of the roll angle, the pitch angle, and the yaw angle.

First, it is discussed a coordinate system in which the coordinate system is rotated by an angle $\phi$ using Z-axis of an absolute coordinate system 35 as the rotation axis (FIG. 12A). It is assumed that the coordinate axes here are [X', Y', Z].

Next, this coordinate system is rotated about Z-axis by an angle $\theta$ using Y' as the rotation axis (see FIG. 12B). It is assumed that the coordinate axes here are [X", Y', Z".

Finally, this coordinate system is rotated about X"-axis by an angle $\psi$ using X"-axis as the rotation axis (see FIG. 12C). It is assumed that the coordinate axes here are X", Y''', Z'''. It is assumed that the orientation of the coordinate system here is represented by the roll angle $\phi$, the pitch angle $\theta$, and the yaw angle $\psi$, and hence the orientation vector here is ($\phi$, $\theta$, $\psi$). It is assumed that, in a case where a coordinate system ($\phi$, $\theta$, $\psi$) of the orientation having its origin position translated to the origin position $O_e$ (x, y, z) of the hand coordinate system 42 agrees with the hand coordinate system 42, the orientation vector of the hand coordinate system 42 is ($\phi$, $\theta$, $\psi$).

In a case where the hand position and orientation of the robot arm 5 is to be controlled, the hand position and orientation vector r is caused to follow a hand position and orientation target vector $r_d$ generated by a desired trajectory generating unit 55, the description of which will be given later.

Reference numeral 26 denotes the data input IF (interface) through which a person (assembly worker) inputs commands such as start or end of an assembly task to the assembly robot 1, using an input device such as a button, a keyboard, a mouse, or a microphone.

The display unit 14 is a display apparatus installed in the workbench 7, for example, and it displays on itself operations of the robot or types of parameter to be corrected, the description of which will be given later.

The operation database 17 stores and retains information as to operations of the rail movable portion 8b and the robot arm 5 (e.g., an assembly operation), such as the position and orientation thereof at a certain time (information as to an operation). Here, the database includes, as the information as to an operation, at least one piece of information out of the following information pieces, each being corresponding to a task (e.g., an assembly task) performed by the robot arm 5: information as to a hand position orientation of the robot arm 5; information as to a force applied by the robot arm 5 to the device 6; speed information of the robot arm 5; and task disapproved region information which is information as to a region where no task is performed.

The operation database 17 will be detailed.

The operation database 17 is structured to store therein, for example, pieces of information as to the operation of the rail movable portion 8b and the robot arm 5 shown in FIG. 4, which are: task ID numbers identifying tasks; operation ID numbers identifying individual operations in each task; information as to the position of the rail movable portion 8b in the corresponding operation; information as to the hand position and orientation of the robot arm 5 in the corresponding operation; information as to a force applied by the robot arm 5 to the assembly task plane (e.g., an insert plane of the flexible circuit board insert slot 75 of the device 6) in the corresponding operation; information as to a flag indicative of which one of information pieces among a position parameter, an orientation parameter, and a force parameter, each of which is of the robot arm 5, is valid (a flag indicative of validity); information as to a time period during which respective operations are active; information as to the type of a parameter to be corrected, in correcting the operation information in the operation database 17 by the operation correction unit 20, the description of which will be given later; and progress information indicative of whether or not the operation is presently in operation.

The task ID number in the operation database 17 identifying the inserting task is information representing the task ID number allotted to each task for discerning tasks from one another, in a case where there are a plurality of types of assembly tasks (e.g., the inserting task).

The operation ID numbers identifying individual operations in each assembly task in the operation database 17 are information pieces representing the operation ID numbers allotted to respective assembly operations for discerning individual assembly operations in one assembly task from one another, in a case where one assembly task is structured with a plurality of assembly operations.

The information as to the position of the rail movable portion 8b in the operation database 17 represents the aforementioned information as to the rail position. That is, in a case where the origin position of the rail coordinate system 46 viewed from $O_s$ at the end of rail 8 is $O_d(x, y)$, and for example as shown in FIG. 8, where the assembly robot 1 travels from left to right on the rail fixed portion 8a to perform the assembly operation, a first rail position $(x_1, y_1)$, a second rail position $(x_2, y_2)$, and a third rail position $(x_3, y_3)$ of the rail movable portion 8b are stored.

The information as to the position of the rail movable portion 8b in the operation database 17 may previously be set in the operation database 17, or may be stored by directly gripping the robot arm 5 by the person's hand 16, and shifting the robot arm 5 in an impedance control mode, the description of which will be given later.

The information as to the hand position and orientation of the robot arm 5 in the operation database 17 represents the aforementioned hand position and orientation of the robot arm 5, and represented as $(x, y, z, \phi, \theta, \psi)$, based on the origin position $O_e$ and the orientation.

The information as to the position and orientation of the robot arm 5 and the information as to a time period in the operation database 17 are acquired and stored in the following manner. For example, as shown in FIG. 1, the robot arm 5 is directly gripped by the person's hand 16, and in the impedance control mode whose description will be given later, the robot arm 5 is shifted, such that the control unit 22 acquires information as to hand position and orientation of the robot arm 5 every certain time period (e.g., every 0.2 msec) (specifically, as will be described in the section in connection with the control unit 22, a forward kinematics calculation unit 58 converts a joint angle measured by the encoder 44 at each of the joint portions into the hand position and orientation, to acquire the information as to the hand position and orientation of the robot arm 5). The acquired information is stored by the operation storage unit 15, together with information as to time period, in the operation database 17. It is to be noted that the information as to the position and orientation of the robot arm 5 and the information as to a time period may previously be generated in the similar manner before shipment at the manufacturer, and may be stored in the operation database 17. Alternatively, such pieces of information may be acquired and stored in the following manner. The robot arm 5 is shifted, and an image of the environment (an environment including the robot arm 56 and the device 6) is picked up by an image pickup apparatus such as a camera (which is disposed above the robot arm 5, for example). The acquired image data (e.g., an image of the insert slot 75 of the device 6 included in the acquired environment information) is subjected to a model matching process against an image of a previously stored object (e.g., an image of the insert slot 75 of the device 6). The matched position is stored as the hand position of the robot arm 5 in the operation database 17, by the operation storage unit 15 via the data input IF 26, which is not specifically shown. The information as to a force applied by the robot arm 5 stored in the operation database 17 represents information as to the force applied to an object being the target of a task performed by the robot arm 5, in which the force applied by the robot arm 5 in each of the x, y, and z directions is represented as $f_x$, $f_y$, and $f_z$, respectively, and the force applied in each of the $\phi$, $\theta$, and $\psi$ directions is represented as $f_\phi$, $f_\theta$, and $f_\psi$, respectively. In the operation database 17, the force is represented as $(f_x, f_y, f_z, f_\phi, f_\theta, f_\psi)$. For example, in a case where $f_z=5[N]$, it represents that a task is performed with a force of 5N being applied in the z-axis direction. This is a parameter used in a case where, in performing an assembly task of inserting the flexible circuit board 74 into the insert slot 75 of the device 6, the insertion is carried out applying the force perpendicularly to the insert plane of the insert slot 75 of the device 6.

The flag indicative of which one of information pieces among a position parameter, an orientation parameter, and a force parameter, each of which is of the robot arm 5, is valid (the flag indicative of validity) in the operation database 17, that is, the flag information in the operation database 17 in FIG. 4, is a value that indicates which one of information pieces is valid among the information as to the position, the information as to the orientation, and the information as to the force, each of which is of the robot arm 5 under each corresponding operation ID. Specifically, it is represented by numerical values of 32 bits shown in FIG. 5. In FIG. 5, in a case where respective values of the position and orientation, and the force are valid as being represented by their respective bits, the values each assume "1"; whereas the values each assume "0" when invalid. For example, the 0th bit assumes "1" when the value of x-coordinate of the position is valid, and assumes "0" when invalid. The 1st bit assumes "1" when the value of y-coordinate of the position is valid, and assumes "0" when invalid. The 2nd bit assumes "1" when the value of z-coordinate of the position is valid, and assumes "0" when invalid. In succession thereto, the 3rd, 4th, and 5th bits indicate the validity of $\phi$, $\theta$, $\psi$ of the orientation. The 6th to 11th bits respectively indicate whether the respective force components of $f_x$, $f_y$, $f_z$, $f_\phi$, $f_\theta$, $f_\psi$, are valid or invalid. It is to be noted that, extra flag (32 bits) is prepared for future expansion, and 12th to 31st bits are not used and, accordingly, these unused bits assume "0" in the present example. However, it is possible that the 12th bit solely is a variable that can be stored. In FIG. 5, because the 0th and 1st bits assume "1" and the 8th bit assumes "1", it is indicated that only x, y information as to the position and $f_z$ information as to the force are valid among the operation information pieces, and that whatever values are stored for z, $\phi$, $\theta$, and $\psi$ information and force information other than $f_z$ among the operation information pieces, they are invalid.

The information as to the time period during which each operation is executed in the operation database 17, that is, the time period in the operation database 17 shown in FIG. 4, is the time period required for the assembly robot 1 to perform each operation, indicating that the operation stored with the corresponding operation 1D is operated by the assembly robot 1 taking the time period stored therein. This time period is not the absolute time, but represents the relative time period elapsed after the previous operation. That is, it represents a time period until the rail movable portion 8b and the robot arm 5 respectively shift to the position of the rail movable portion 8b and the position and orientation of the robot arm 5 indicated by the operation ID.

The information as to the type of a parameter to be corrected in the operation database 17, in correcting the operation information in the operation database 17 by the operation correction unit 20, that is, the correction parameter flag shown in FIG. 4, is information indicative of which parameter should be corrected in accordance with the type determined by the correction operation type determining unit 23, the description of which will be given later. Specifically, it is represented by numerical values of 32 bits shown in FIG. 6. In FIG. 6, in a case where respective values of the position and orientation, and the force are correctable as being represented by their respective bits, the value assumes "1"; whereas the value assumes "0" when uncorrectable. For example, the 0th bit assumes "1" when the value of x-coordinate of the position is correctable, and assumes "0" when uncorrectable. The 1st bit assumes "1" when the value of y-coordinate of the position is correctable, and assumes "0" when uncorrectable. The 2nd bit assumes "1" when correction of the value of z-coordinate of the position is possible, and assumes "0" when impossible. In succession thereto, the 3rd, 4th, and 5th bits indicate the correction feasibility of $\phi$, $\theta$, $\psi$ of the orientation. Similarly, the 6th to 11th bits respectively indicate the correction feasibility of the force. It is to be noted that, extra flag (32 bits) is prepared for future expansion, and 12th to 31st bits are not used and, accordingly, these unused bits assume "0" in the present example. However, it is possible that the 12th bit solely is a variable that can be stored.

The progress information in the operation database 17 indicative of whether or not the operation is presently in operation is information indicative of whether or not the operation is presently operated by the assembly robot 1. When it is in operation, "1" is recorded, and when not in operation, "0" is recorded. Specifically, the person selects via the data input IF 26 an assembly task desired to be performed, and the selected information is input from the data input IF 26 to the operation selecting unit 29. When the first assembly operation included in the selected task is started by the assembly robot 1, the operation selecting unit 29 stores "1" in the operation database 17 for the assembly operation presently in operation out of a plurality of assembly operations constituting the assembly task, and stores "0" in the operation database 17 for the assembly operation not in operation. It is to be noted that, as to the information as to whether or not it is in operation, a report about completion of the operation commanded by the control unit 22 is input via the operation correction unit 20 to the operation storage unit 15, which is then stored by the operation storage unit 15 in the task method database 17.

Figure 21A:
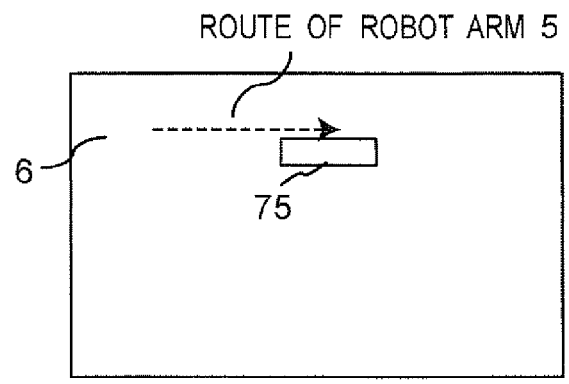
FIG. 21A is a view showing an operating state of the robot arm in the robot arm control apparatus according to the first embodiment of the present invention.
Figure 21B:
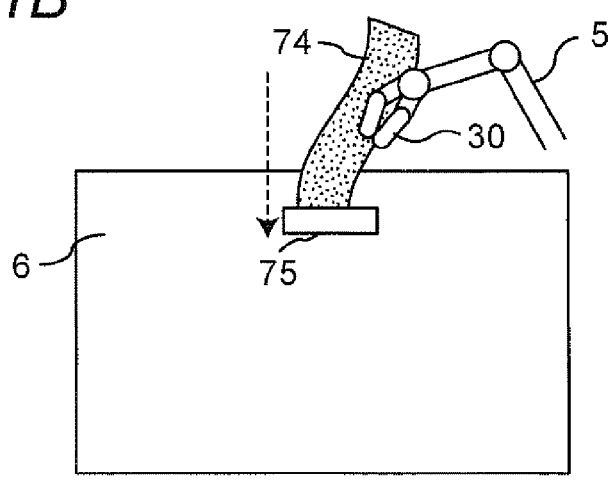
FIG. 21B is a view showing an operating state of the robot arm in the robot arm control apparatus according to the first embodiment of the present invention.

In FIG. 4, the operation IDs "1" to "8" are, as shown in FIG. 21A, operations in which the hand 30 of the robot arm 5 grips the flexible circuit board 74 and shifts above the device 6 to the insert slot 75 of the device 6. The operations "9" to "16" are, as shown in FIG. 21B, operations in which the robot arm 5 is used to insert the flexible circuit board 74 into the insert slot 75 of the device 6.

When the person 16 selects the optimum task via the data input IF 26 out of a task list (e.g., the task display such as "insert 1" and "insert 2" displayed on the bottom side of the center of the switch 26c shown in FIG. 26) in the operation database 17, the operation selecting unit 29 shown in FIG. 3 sets "1" to the progress information of the operation ID presently in operation included in the selected task, and stores the same in the operation database 17; and sets "0" to the other operations and stores the same in the operation database 17.

The task disapproved region database 28 stores information as to region in which a task (in the present example, the flexible circuit board inserting task) is not performed by the assembly robot 1, and the specific information is shown in FIG. 10. In FIG. 10, the position (x, y) of the task disapproved region represents the region where the person does not desire the assembly robot 1 to perform the task. For example, in a case where the hatched region is the task disapproved region RB in the task approved plane R shown in FIG. 11, the coordinates required for representing the region RB (in this example, coordinates of four corners of a rectangular region $(x_{c1}, y_{c1})$ $(x_{c2}, y_{c2})$, $(x_{c3}, y_{c3})$, $(x_{c4}, y_{c4})$) are stored. It is to be noted that the coordinates are expressed by the relative coordinates relative to the coordinates $O_s$ at the end of the rail 8, in the task route in the task region RA where the task is performed. The coordinates representing the task disapproved region RB are generated by the operation correction unit 20, the description of which will be given later, and stored in the task disapproved region database 28.

Figure 19A:
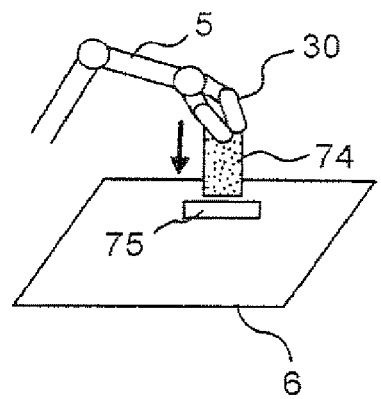
FIG. 19A is a view showing a manipulating state of the robot arm in the robot arm control apparatus according to the first embodiment of the present invention.
Figure 19B:
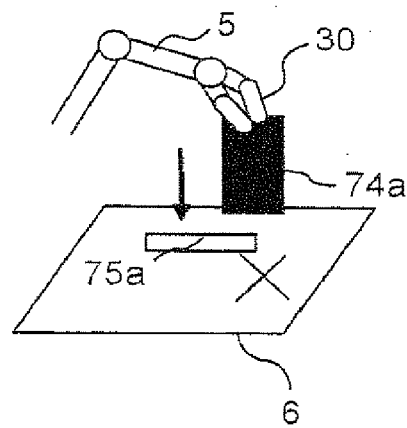
FIG. 19B is a view showing a manipulating state of the robot arm in the robot arm control apparatus according to the first embodiment of the present invention.
Figure 19C:
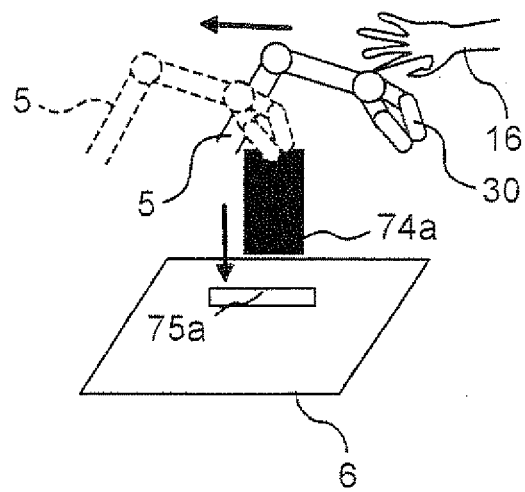
FIG. 19C is a view showing a manipulating state of the robot arm in the robot arm control apparatus according to the first embodiment of the present invention.
Figure 19D:
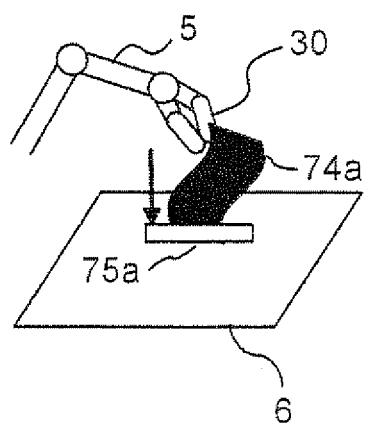
FIG. 19D is a view showing a manipulating state of the robot arm in the robot arm control apparatus according to the first embodiment of the present invention.

The correction operation type determining unit 23 determines the correction type which can be exerted, so as to allow the operation correction unit 20 to correct an operation, the description of which will be given later, based on a force applied by the person's hand 16 to the robot arm 5. For example, as shown in FIG. 19C, when the person applies a force in the lateral direction to the robot arm 5 with the hand 16, the position of the robot arm 5 is shifted in a direction parallel to the task plane (e.g., the insert plane of the insert slot 75 of the device 6) (e.g., the horizontal direction is meant by the direction parallel to the task plane, in a case where the task plane extends along the horizontal direction. In the following description, such a direction is simply referred to as the "horizontal direction", for ease of explanation.) This allows the task region RA to be translated. The correction operation type in this case is "shift task plane position". In a situation where the robot arm 5 is inserting the flexible circuit board 74 into the insert slot 75 of the device 6 as shown in FIG. 18A, when the person applies a downward force to the robot arm 5 (e.g., the hand 30) from above the robot arm 5 with the hand 16 as shown in FIG. 18C, the operation correction unit 20, the description of which will be given later, can increase the extent of force applied for insertion as shown in FIG. 19D. The correction operation type in this case is the "force applied extent". Thus, the correction operation type determining unit 23 can determine the correction type for the assembly operation based on the extent of the force applied to the robot arm 5 by the person's hand 16, the hand position of the robot arm 5, and the like. A detailed description thereof will be given later.

The operation correction unit 20 has a function of correcting the assembly operation information in the operation database 17 by the person applying a force to the robot arm 5 with the hand 16, while the assembly robot 1 is performing assembly operation based on the information pieces as to the position and orientation and as to the time period in the operation database 17. A detailed description thereof will be given later.

The operation storage unit 15 stores the operation information corrected by the operation correction unit 20 in the operation database 17 or in the task disapproved region database 28.

Next, the control parameter managing unit 21 will be detailed.

Based on an operation correction instruction from the operation correction unit 20, the control parameter managing unit 21 sets the following: changeover among an impedance control mode, a hybrid impedance control mode, a force control mode, a force hybrid impedance control mode, and a high-rigidity position control mode, all of which are of the robot arm 5; mechanical impedance set values in the respective control modes; hand position and orientation target correction outputs $r_{d\Delta}$, which are to be output from an impedance calculation unit 51 of the control unit 22 in the respective control modes; and operation information from the control unit 22 to the desired trajectory setting unit 55.

Further, the control parameter managing unit 21 generates a route in the task region RA omitting the task disapproved region RB in the task disapproved region database 28, from the position of the rail movable portion 8b (the origin position $O_d$ (x, y) of the rail coordinate system 46 viewed from coordinates $O_s$ at the end of the rail 8) stored in the operation database 17. Further, the control parameter managing unit 21 receives the information such as information as to the hand position of the robot arm 5 or as to the force from the control unit 22, the control parameter managing unit 21 reports such information to the operation correction unit 20. Still further, when an open/close command of the hand 30 is input via the data input IF 26, such input information from the data input IF 26 is input to the hand control unit 54 of the control unit 22 via the control parameter managing unit 21, and the control parameter managing unit 21 issues an open/close command of the hand 30 to the hand control unit 54.

The position control mode is a mode in which the robot arm 5 operates based on a hand position and orientation target vector command of the desired trajectory generating unit 55, the description of which will be given later.

The impedance control mode is a mode in which the robot arm 5 operates in accordance with a force applied to the robot arm 5 by the person or the like.

The hybrid impedance control mode is a mode in which the robot arm 5 operates, while the robot arm 5 is in operation in the position control mode, in accordance with a force applied to the robot arm 5 by the person or the like (an impedance control mode), and it is a mode in which the position control mode and the impedance control mode are executed in parallel. For example, it is a mode in which, midway during the assembly task of inserting the flexible circuit board 74 into the insert slot 75 of the device 6, the robot arm 5 is directly held by the person's hand 16 as shown in FIG. 18O so as to make a correction, such as to translate the task region RA.

The force control mode is a control mode in which the robot arm 5 operates while pressing a target object (e.g., the flexible circuit board 74) gripped with the hand 30 against the task plane (e.g., the insert plane of the insert slot 75 of the device 6) with a force previously given to the control unit 22. It is a control mode used for a task plane component of the robot arm 5 in a situation where, for example, the robot arm 5 inserts the flexible circuit board 74 into the insert slot 75 applying a certain force to the insert slot 75 of the device 6.

The force hybrid impedance control mode is a control mode to switch between the hybrid impedance control mode and the impedance control mode for each of the six-axis directions, and further, to cause an operation to be performed in the force control mode in which the operation is performed exerting the specified force. It is to be noted that the impedance control mode cannot be set in the direction in which the force control mode is set (the force control mode and the impedance control mode are in a mutually exclusive relationship).

When the assembly operation is performed, an appropriate control mode out of these control modes is set in the following manner for each of the direction and orientation of the robot arm 5 to cause the robot arm 5 to operate.

For example, in a case where, as shown in FIG. 18A, the assembly robot 1 inserts the flexible circuit board 74 gripped with the hand 30 into the insert slot 75 applying a specified force to the insert slot 75 of the device 6 in the insert direction perpendicular to the insert plane of the insert slot 75 of the device 6 being one example of the task plane (in FIG. 18A, because the insert plane of the insert slot 75 extends along the horizontal plane, the insert direction is perpendicular to the horizontal plane and is downward), the force hybrid impedance control mode is set. Specifically, for the six axes of (x, y, z, $\phi$, $\theta$, $\psi$), the following control modes are respectively set. That is, what is set is the force hybrid impedance control mode in which: (x, y) components are operated in the hybrid impedance control mode; ($\phi$, $\theta$, $\psi$) components are operated in the impedance control mode; and the z-axis component is operated in the force control mode. In this manner, by setting the hybrid impedance control mode to the direction parallel to the insert plane of the insert slot 75 of the device 6, the following is achieved: midway during an operation in the position control mode, by switching to the hybrid impedance control mode upon the person's manipulation, it becomes possible to shift the robot arm 5 in accordance with a force applied to the robot arm 5 by a person or the like. Further, by setting the impedance control mode to ($\phi$, $\theta$, $\psi$) components, it becomes possible to change the orientation of the robot arm 5 in accordance with the force applied to the robot arm 5 in a stopped state from the person or the like. Still further, by setting the force control mode for the z-axis component, it becomes possible for an operation to be performed pressing with a specified force.

A high-rigidity position control mode is a mode in which the position control mode during an assembly task is further enhanced in rigidity, and is achieved by increasing the gain in the positional error compensation unit 56, the description of which will be given later. In this mode, the robot arm 5 is not easily shifted by a force being applied to the robot arm 5 by the person's hand 16, whereby the force detecting unit 53 can detect the force applied by the person's hand 16 based on a change amount of the hand position of the robot arm 5.

The setting parameters of the mechanical impedance set values include inertia M, viscosity D, and rigidity K. The setting of the respective parameters of the mechanical impedance set values are carried out based on the following evaluation equations, by using correction values.

$$M = KM \times (\text{a correction value}) \quad \text{equation (1)}$$

$$D = KD \times (\text{a correction value}) \quad \text{equation (2)}$$

$$K = KK \times (\text{a correction value}) \quad \text{equation (3)}$$

In the foregoing equations (1) to (3), KM, MD, and KK are gains, each of which is a certain constant value.

The control parameter managing unit 21 outputs the inertia M, the viscosity D, and the rigidity K, which are the mechanical impedance parameters calculated based on the equations (1) to (3), respectively, to the control unit 22.

According to the equations (1) to (3), for example, as shown in FIG. 19C, in a case where the person desires to make a correction so as to shift the region of the task plane (e.g., the task plane to which the inserting task of inserting the flexible circuit board 75 into the insert slot 75 is performed), and if the position and orientation components other than those of x-axis and y-axis easily move, then it becomes difficult to execute the correction work. Therefore, the control parameter managing unit 21 sets the correction values of high values (specifically, about ten times as high as the correction values) for only the position and orientation components other than those of x-axis and y-axis, whereby the viscosity D and the rigidity K are set to be higher. Thus, resistance or rigidity is generated in the motion of the robot arm 5, and it becomes not easy to move with respect to the position and orientation components other than those of x-axis and y-axis.

Alternatively, another method is to null by the control parameter managing unit 21 the values other than those of x-axis and y-axis out of the components of the hand position and orientation target correction output $r_{dΔ}$ output from the impedance calculation unit 51, the description of which will be given later. Thus, no shift can be caused by a force of the person's hand 16 as to any components other than those of x-axis and y-axis, and therefore it becomes possible to prevent any erroneous manipulation.

Further, it is necessary for the control parameter managing unit 21 to report to the operation correction unit 20 about the hand position and orientation of the robot arm 5 and the information as to the force applied by the person (the information as to the person's force acting on the robot arm 5). Accordingly, the control parameter managing unit 21 receives the hand position of the robot arm 5 and the information as to the force from the control unit 22, and reports about the same to the operation selecting unit 29, the operation storage unit 15, and the operation correction unit 20. Further, the control parameter managing unit 21 reports to the control unit 22 about the operation information as to the position and orientation, the time period and the like having been input from the operation correction unit 20.

Figure 7:
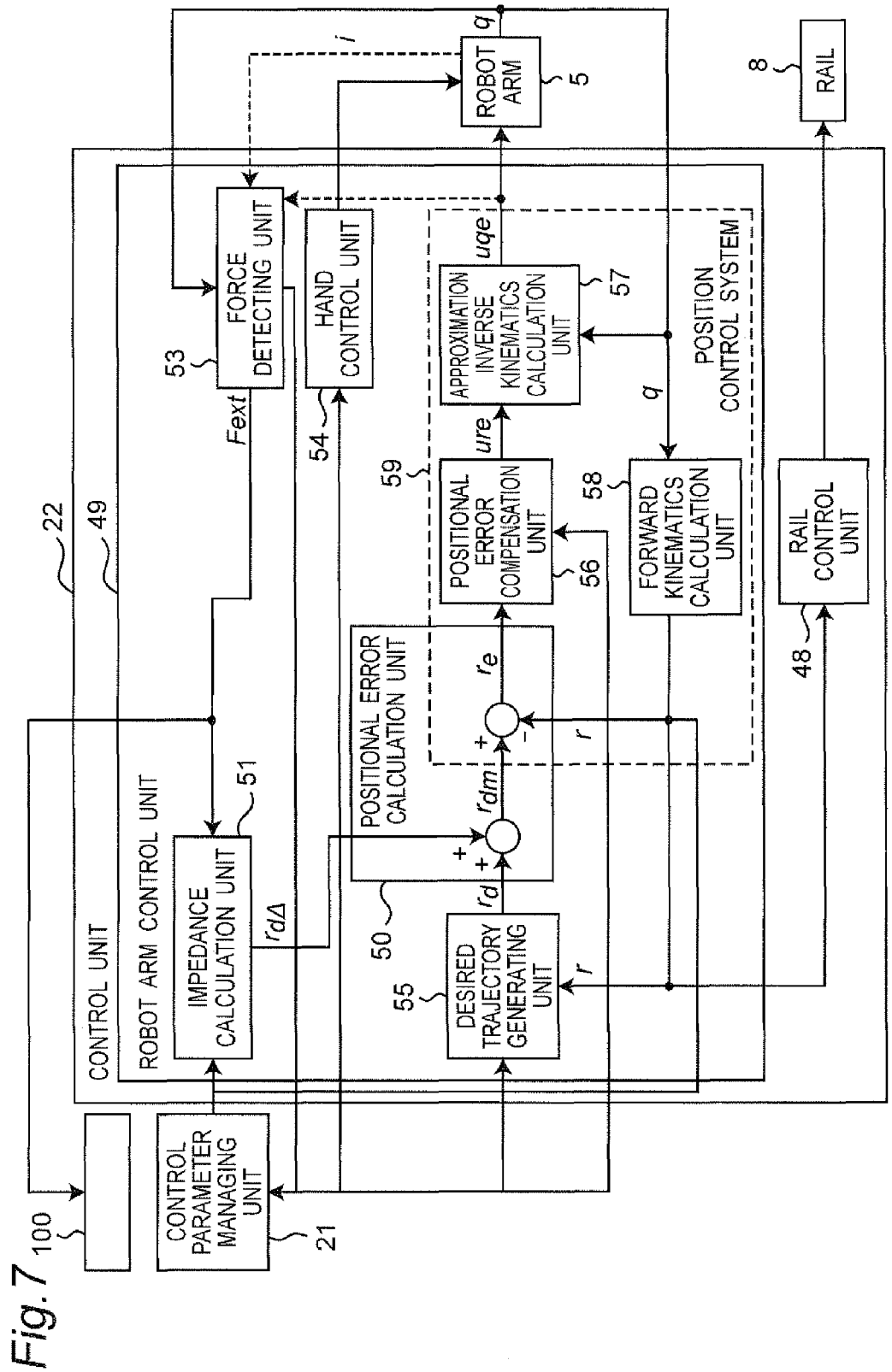
FIG. 7 is a block diagram showing the structure of a control unit of the control apparatus for the robot arm according to the first embodiment of the present invention.

FIG. 7 shows a block diagram of the control unit 22. The control unit 22 operates in the control mode set by the control parameter managing unit 21, and in accordance with the control mode, controls the mechanical impedance value of the robot arm 5 such that it assumes the mechanical impedance set value of the robot arm 5 having been set based on the set values of the inertia M, the viscosity D, and the rigidity K. Further, the control unit 22 controls, in a case of the inserting task, such that the flexible circuit board 74 is pressed against the insert plane of the insert slot 75 with a specified force. Further, the control unit 22 controls the rail movable portion 8b so as to shift the robot arm 5 to a specified position on the rail fixed portion 8a.

Next, with reference to FIG. 7, the control unit 22 will be detailed.

The control unit 22 is structured to include a robot arm control unit 49 controlling the drive operation of the motor 43 of each of the joint portions of the robot arm 5, and a rail control unit 48 controlling the drive operation of the motor 65 of the rail movable portion 8b. The robot arm control unit 49 is structured to include a positional error calculation unit 50, an impedance calculation unit 51, the force detecting unit 53 as one example of force detecting means, the hand control unit 54, a desired trajectory generating unit 55, a positional error compensation unit 56, an approximation inverse kinematics calculation unit 57, and the forward kinematics calculation unit 58. The positional error compensation unit 56, the approximation inverse kinematics calculation unit 57, and the forward kinematics calculation unit 58 constitute a position control system 59.

Next, the robot arm control unit 49 will be detailed.

From the robot arm 5, a present value (a joint angle vector) vector $q = [q_1, q_2, q_3, q_4, q_5, q_6]^T$ of each of the joint angles as measured by the encoder 44 of the joint axis of each of the joint portions is output, and taken into the control unit 22 via the input/output IF 24. Here, $q_1, q_2, q_3, q_4, q_5,$ and $q_6$ are joint angles of the first joint portion 35, the second joint portion 36, the third joint portion 37, the fourth joint portion 38, the fifth joint portion 39, and the sixth joint portion 40.

The desired trajectory generating unit 55 receives an input of the assembly operation from the control parameter managing unit 21, and outputs a hand position and orientation target vector $r_d$, a hand force vector $f_d$, and a flag indicative of which parameter is valid for each direction (a flag indicative of validity), for achieving a targeted operation of the robot arm 5. In connection with the targeted operation of the robot arm 5, in accordance with the targeted assembly task, information as to position and orientation ($r_{d0}, r_{d1}, r_{d2}, \ldots$) for each point of time ($t=0, t=t_1, t=t_2, \ldots$) and information as to force ($f_{d0}, f_{d1}, f_{d2}, \ldots$) are provided to the desired trajectory generating unit 55 from the operation correction unit 20 via the control parameter managing unit 21.

The desired trajectory generating unit 55 interpolates the trajectories and forces at respective points using polynomial interpolation, to generate the hand position and orientation target vector $r_d$ and the force vector $f_d$.

In response to the hand open/close command received from the control parameter managing unit 21, the hand control unit 54 issues a command to the hand drive-purpose motor 62 of the robot arm 5 to drive the hand drive-purpose motor 62 so as to open and close the hand 30.

The force detecting unit 53 functions as one example of force detecting means, and detects an external force applied to the robot arm 5 by any contact between the person or the like and the robot arm 5. The force detecting unit 53 takes in, via the input/output IF 24, a current value $i = [i_1, i_2, i_3, i_4, i_5, i_6]^T$ of current flowing through each of the motors 43 that respectively drive the joint portions of the robot arm 5, the current value i being measured by a current sensor of the motor driver 47. The force detecting unit 53 also takes in, via the input/output IF 24, a present value q of the joint angle of each of the joint portions, and a joint angle error compensation output $u_{qe}$ from the approximation inverse kinematics calculation unit 57, the description of which will be given later. The force detecting unit 53 functions as an observer, and calculates a torque $\tau_{ext}$ which is generated in each of the joint portions by an external force applied to the robot arm 5, based on the current value i, the present value q of each joint angle, and the joint angle error compensation output $u_{qe}$. Then, the force detecting unit 53 converts the torque to an equivalent hand external force $F_{ext}$ of the hand of the robot arm 5 based on $F_{ext}=J_v(q)^{-T}\tau_{ext}-[0, 0, mg]^T$, to output the equivalent hand external force $F_{ext}$. Here, $J_v(g)$ is a Jacobian matrix that satisfies the following equation:

$$v=J_v(q)\dot{q}$$

where $v=[v_x, v_y, v_z, \omega_x, \omega_y, \omega_z]^T$; in which $(v_x, v_y, v_z)$ is a translation speed of the hand of the robot arm 5 in the hand coordinate system 42; and $(\omega_x, \omega_y, \omega_z)$ is an angular velocity of the hand of the robot arm 5 in the hand coordinate system 42. Further, m is the weight of the flexible circuit board 74 gripped by the hand 30 of the robot arm 5, and g is the gravitational acceleration. Though the value of weight m of the flexible circuit board 74 may be input by the person to the force detecting unit 53 via the data input IF 26 before causing the hand 30 to grip the flexible circuit board 74, the weight m may be a preset value, because normally the value of weight m of the flexible circuit board 74 is not subjected to change very often.

The impedance calculation unit 51 is a unit that functions to achieve the control of a mechanical impedance value of the robot arm 5 to the mechanical impedance set value of the robot arm 5.

When the impedance control mode is specified, the impedance calculation unit 51 outputs the hand position and orientation target correction output $r_{d\Delta}$. When being switched to the force hybrid impedance control mode, in a case where there exists a force component that is specified as valid by the flag (the flag indicative of validity), the impedance calculation unit 51 calculates the hand position and orientation target correction output $r_{d\Delta}$ for achieving control for the mechanical impedance value of the robot arm 5 to approximate the mechanical impedance set value of the robot arm 5 based on the following equation (4) using the inertia M, the viscosity D, the rigidity K, each being the impedance parameter having been set by the control parameter managing unit 21, the present value q of each joint angle, the external force $F_{ext}$ detected by the force detecting unit 53, and $f_d$ output from the desired trajectory generating unit 55, and the impedance calculation unit 51 outputs the result.

The hand position and orientation target correction output $r_{d\Delta}$ is added by the positional error calculation unit 50 to the hand position and orientation target vector $r_d$ output from the desired trajectory generating unit 55. Thus, a hand position and orientation correction target vector $r_{dm}$ is generated by the positional error calculation unit 50. For example, in a case where the insertion is to be carried out with application of a force in solely the z-axis direction, while the other components should move in the position control mode, the positional error calculation unit 50 sets 0 to all the components of the hand position and orientation target correction output $r_{d\Delta}$ other than the z component.

$$r_{d\Delta} = (s^2\hat{M} + s\hat{D} + \hat{K})^{-1}(F_{ext} - f_d) \quad \text{equation (4)}$$

where $$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad \text{equation (5)}$$

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad \text{equation (6)}$$

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad \text{equation (7)}$$

and s is the Laplace operator.

The positional error calculation unit 50 further obtains an error $r_e$ between the hand position and orientation correction target vector $r_{dm}$ and the hand position and orientation vector r calculated by the forward kinematics calculation unit 58, the description of which will be given later, and outputs the obtained error $r_e$ to the positional error compensation unit 56.

From the encoder 44 of the joint axis of each of the joint portions of the robot arm 5 to the forward kinematics calculation unit 58, the joint angle vector q being the present value q of each joint angle as measured by the encoder 44 is input via the input/output IF 24. The forward kinematics calculation unit 58 performs geometrical calculation to convert the joint angle vector q of the robot arm 5 to the hand position and orientation vector r. The hand position and orientation vector r calculated by the forward kinematics calculation unit 58 is output to the positional error calculation unit 50, the impedance calculation unit 51, and the desired trajectory generating unit 55.

The positional error compensation unit 56 outputs a position error compensation output $u_{re}$ to the approximation inverse kinematics calculation unit 57, based on the error $r_e$ obtained by the positional error calculation unit 50.

Specifically, the position error compensation output $u_{re}$ is calculated by the following equation:

$$u_{re} = K_P r_e + K_I \int_0^t r_e \, dt' + K_D \frac{dr_e}{dt}$$

where $K_P$ is a proportional gain matrix; $K_I$ is an integral gain matrix; and $K_D$ is a differential gain matrix, each being a diagonal matrix whose diagonal components are constituted by the gain for the components of the hand position vector $r_e=[x, y, z, \phi, \theta, \psi]^T$.

Further, the positional error compensation unit 56 sets each of the proportional gain matrix $K_P$, the integral gain matrix $K_I$, and the differential gain matrix $K_D$ to a preset greater value, when the high-rigidity position control mode is set. As used herein, the high rigidity refers to an enhanced rigidity as compared to the normal position control. Specifically, a greater value as compared to the normal position control mode is set. For example, by setting a value approximately twice as great as that of the normal position control mode, the rigidity can approximately be doubled at a maximum.

In this manner, the high-rigidity position control can be achieved. It is to be noted that, by changing the gain for each component, control can be exerted such that, for example, operations can be performed with high rigidity as to z-axis direction solely, while having the other directions governed by the normal position control.

The approximation inverse kinematics calculation unit 57 performs approximation calculation of inverse kinematics based on approximate equation $u_{out}=J_r(q)^{-1}u_{in}$, using the position error compensation output $u_{re}$ received from the positional error compensation unit 56 and the joint angle vector q measured by the robot arm 5. Here, $J_r(q)$ is a Jacobian matrix that satisfies the following relationship:

$$\dot{r} \to J_r(q)\dot{q}$$

where $u_{in}$ is the input to the approximation inverse kinematics calculation unit 57; and $u_{out}$ is the output from the approximation inverse kinematics calculation unit 57. Assuming that the input $u_{in}$ is a joint angle error $q_e$, a conversion equation from the hand position orientation error $r_e$ to the joint angle error $q_e$, as expressed by $q_e=J_r(q)^{-1}r_e$, is obtained.

Accordingly, when the position error compensation output $u_{re}$ is input from the positional error compensation unit 56 to the approximation inverse kinematics calculation unit 57, as an output of the approximation inverse kinematics calculation unit 57, the approximation inverse kinematics calculation unit 57 outputs the joint angle error compensation output $u_{qe}$ for compensating for the joint angle error $q_e$ to the motor driver 25 of the robot arm 5 via the input/output IF 24.

The joint angle error compensation output $u_{qe}$ is provided to the motor driver 25 of the robot arm 5 via the D/A board of the input/output IF 24 as a voltage command value, whereby the motors 43 rotate respective joint axes in forward and reverse directions, and the robot arm 5 operates.

Based on the positional information of the rail movable portion 8b received from the desired trajectory generating unit 55, the rail control unit 48 exerts control over the drive operation of the motor 65 of the rail movable portion 8b, such that the robot arm 5 shifts with the rail movable portion 8b on the rail fixed portion 8a. Specifically, the rotation in forward and reverse directions of the motor 65 of the rail movable portion 8b is controlled by the rail control unit 48, such that the rail movable portion 8b to which the robot arm 5 is coupled is shiftable rightward and leftward on the rail fixed portion 8a.

Figure 16:
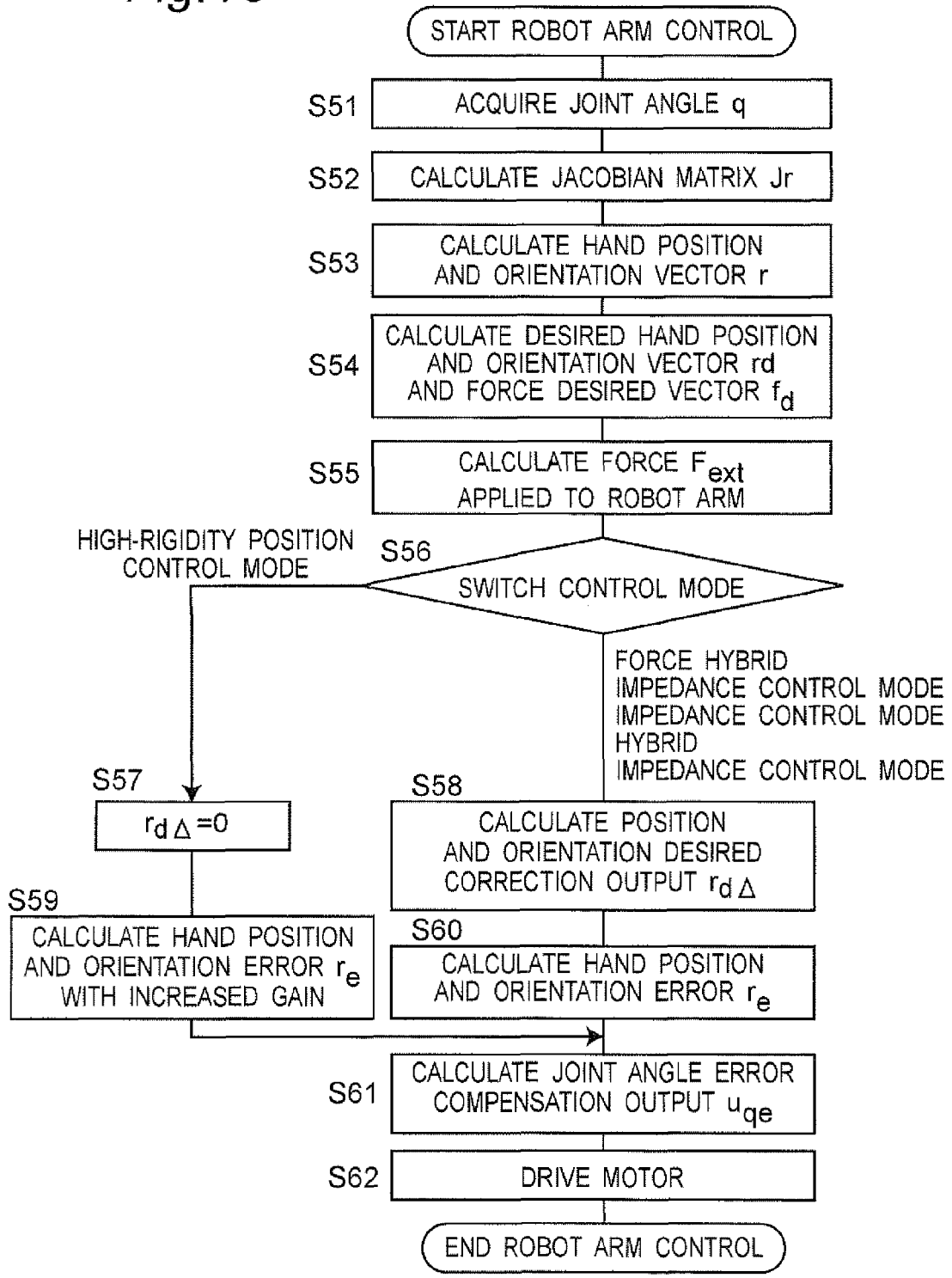
FIG. 16 is a flowchart representing operation steps of the control unit for the robot arm control apparatus according to the first embodiment of the present invention.

In the following, with reference to the flowchart of FIG. 16, a description will be given of actual operation steps of the robot arm control program of the robot arm 5.

The joint angle data (a joint variable vector or the joint angle vector q) measured by the encoder 44 of each of the joint portions of the robot arm 5 is taken in by the control apparatus body unit 45 (step S51).

Subsequently, the inverse kinematics calculation unit 57 performs calculations such as Jacobian matrix $J_r$ and the like, which is required for performing the kinematics calculation of the robot arm 5 (step S52).

Subsequently, the forward kinematics calculation unit 58 calculates the present hand position and orientation vector r of the robot arm 5, based on the joint angle data (joint angle vector q) from the robot arm 5 (step S53).

Subsequently, the desired trajectory calculation unit 55 calculates the robot arm 5's hand position and orientation target vector $r_d$ and the force target vector $f_d$, based on the operation information transmitted from the operation correction unit 20 (step S54).

Subsequently, the force detecting unit 53 calculates the equivalent hand external force $F_{ext}$ at the hand of the robot arm 5, based on the drive current value i of the motor 43, the joint angle data (the joint angle vector q), and the joint angle error compensation output $u_{qe}$ (step S55).

Subsequently, in step S56, the control mode set by the control parameter managing unit 21 is set. When the high-rigidity position control mode solely is set, the process proceeds to step S57. On the other hand, when the force hybrid impedance control mode, the impedance control mode, or the hybrid impedance control mode is set, the process proceeds to step S58. In step S57 (the process performed by the impedance calculation unit 51), in a case where the high-rigidity position control mode is set by the control parameter managing unit 21, the impedance calculation unit 51 sets the hand position and orientation target correction output $r_{d\Delta}$ to 0 vector. Thereafter, the process proceeds to step S59.

In the case where the force hybrid impedance control mode, the impedance control mode, or the hybrid impedance control mode is set by the control parameter managing unit 21, the impedance calculation unit 51 calculates the hand position and orientation target correction output $r_{d\Delta}$, based on the inertia M, the viscosity D, and the rigidity K being the mechanical impedance parameters set by the control parameter managing unit 21, the joint angle data (the joint angle vector q), and the equivalent hand external force $F_{ext}$ applied to the robot arm 5 calculated by the force detecting unit 53 (step S58).

Subsequently, the positional error calculation unit 50 calculates the hand position and orientation error $r_e$ which is the difference between the hand position and orientation correction target vector $r_{dm}$ being the sum of the hand position and orientation target vector $r_d$ and the hand position and orientation target correction output $r_{d\Delta}$, and the present hand position and orientation vector r (steps S59 and S60). In step S60, a specific example of the positional error compensation unit 56 may be a PID compensator. By appropriately adjusting three gains, namely, the proportional gain, the differential gain and the integral gain, each of which is a diagonal matrix of constants, the control is exerted such that the position error converges to 0. In step S59, by increasing each gain to a certain value, the high-rigidity position control is achieved.

In step S61 subsequent to step S59 or step S60, the approximation inverse kinematics calculation unit 57 converts the position error compensation output $u_{re}$ from a value as to the error of the hand position and orientation into a joint angle error compensation output $u_{qe}$ being a value as to the error of the joint angle, by multiplying an inverse matrix of the Jacobian matrix $J_r$ calculated in step S52 by the approximation inverse kinematics calculation unit 57.

Subsequent to step S61, the approximation inverse kinematics calculation unit 57 provides the joint angle error compensation output $u_{qe}$ to the motor driver 25 via the input/output IF 24, to thereby change the amount of current flowing through each motor 43. This causes rotary motion in each of the joint axes of the robot arm 5 (step S62).

By repeatedly executing the foregoing steps S51 to S62 as a controlling calculation loop, control of the operations of the robot arm 5 can be achieved, that is, the operation of exerting control so as to set the mechanical impedance values of the robot arm 5 to the aforementioned appropriately set set values can be achieved.

Next, the correction operation type determining unit 23 and the operation correction unit 20 will be detailed.

The correction operation type determining unit 23 determines, by the operation correction unit 20, the correction type that can be exerted by applying a force to the robot arm 5 with the person's hand 16, to correct the assembly operation. There are six types of correction as follows.

The first correction type is "shift task plane position". Specifically, when the flexible circuit board 74a whose size or rigidity has been changed due to model change is to be inserted into the insert slot 75 of the device 6 using the operation information according to which an operation is performed as shown in FIG. 19A, there may be a case in which the flexible circuit board 74a is caught by the insert slot 75a and the connector portion of the flexible circuit board 74a cannot be inserted into the insert slot 75a, as shown in FIG. 19B. In such a case, as shown in FIG. 19O, while the robot arm 5 is inserting the flexible circuit board 74a into the insert slot 75 of the device 6 in the position control mode, when a force is applied in the lateral direction to the robot arm 5 with the person's hand 16 as shown in FIG. 19C, the operation correction unit 20 allows the robot arm 5 to shift its position in the horizontal direction relative to the task plane (e.g., the insert plane of the insert slot 75 of the device 6) of the robot arm 5 as shown in FIG. 19D, whereby the robot arm 5 can translate relative to the insert plane of the insert slot 75 of the device 6.

The second correction type is "force applied extent" when the flexible circuit board 74 is inserted. This is valid when the force bit is "1" in the flag (the flag indicative of validity) of the operation presently in operation (the progress information in the operation database 17 is "1"). While the robot arm 5 is performing an inserting task of the flexible circuit board 74b into the insert slot 75b as shown in FIG. 18B, when a force is applied downward from above to the robot arm 5 with the person's hand 16 as shown in FIG. 18C, the operation correction unit 20 can correct the extent of applied force to be greater, as shown in FIG. 18D; conversely, when a force is applied upward from below to the robot arm 5 with the person's hand 16, the operation correction unit 20 can correct the extent of applied force to be smaller.

Figure 22A:
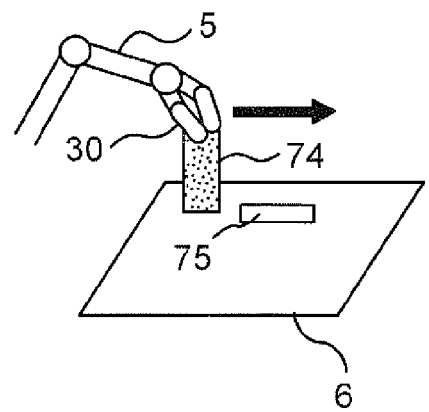
FIG. 22A is a view showing a manipulating state of the robot arm in the robot arm control apparatus according to the first embodiment of the present invention.
Figure 22B:
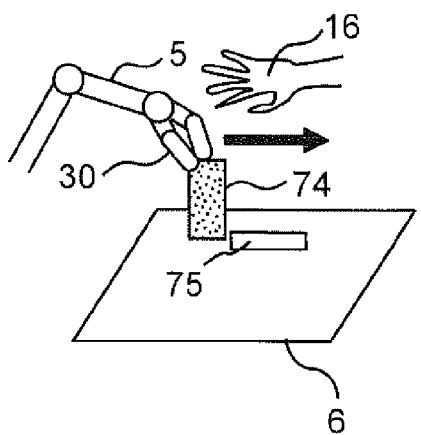
FIG. 22B is a view showing a manipulating state of the robot arm in the robot arm control apparatus according to the first embodiment of the present invention.
Figure 22C:
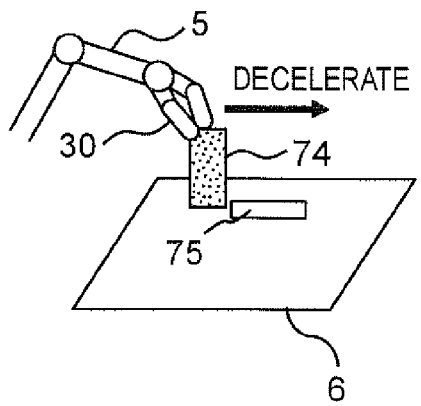
FIG. 22C is a view showing a manipulating state of the robot arm in the robot arm control apparatus according to the first embodiment of the present invention.

The third correction type is the "speed" of the hand of the robot arm 5. While the robot arm 5 gripping the flexible circuit board 74 is shifting toward the insert slot 75 of the device 6 as shown in FIG. 22A, when a force is applied in the direction opposite to the traveling direction of the robot arm to the robot arm 5 with the person's hand 16 as shown in FIG. 22B, the operation correction unit 20 can decelerate the speed of the robot arm 5 when the robot arm 5 shifts, as shown in FIG. 22C. Conversely, when a farce is applied to the robot arm 5 in the traveling direction of the robot arm 5 with the person's hand 16 while the robot arm 5 is shifting, the operation correction unit 20 can accelerate the speed of the robot arm 5 when the robot arm 5 shifts.

Figure 20A:
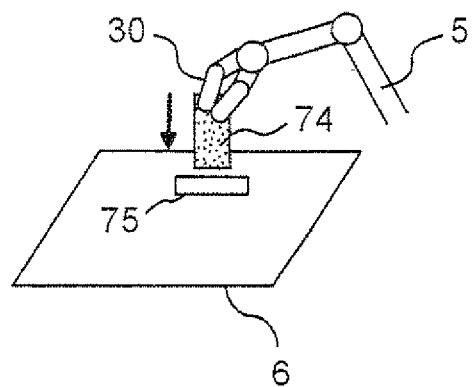
FIG. 20A is a view showing a manipulating state of the robot arm in the robot arm control apparatus according to the first embodiment of the present invention.

The fourth correction type is "direction (orientation) change". In a case where the operation information according to which an operation is performed as shown in FIGS. 20A and 20C (the latter is a drawing showing FIG. 20A viewed from above) is used and the orientation of the insert slot 75 of the device 6 shown in FIG. 20A is changed as an insert slot 75c shown in FIG. 20.3 due to model change, as shown in FIG. 20.3, when the robot arm 5 gripping the flexible circuit board 74 performs insertion in a similar manner as that performed to the insert slot 75 of the device 6 shown in FIG. 20A, the flexible circuit board 74 is caught by the insert slot 75c and the flexible circuit board 74 cannot be inserted into the insert slot 75c. In such a case, as shown in FIG. 20D, when a force is applied to the robot arm 5 (in particular, to the hand 30 or the portion near the hand) with the person's hand 16 so as to change the orientation of the robot arm 5 (in particular, the hand 30 gripping the flexible circuit board 74) while the robot arm 5 is performing the inserting task of the flexible circuit board 74, the operation correction unit 20 can change, as shown in FIG. 20E, the orientation of the robot arm 5 (in particular, the hand 30 gripping the flexible circuit board 74), to thereby change the traveling direction of the robot arm 5 (in particular, the hand 30) so as to agree with the insert slot 75a. This can be achieved by changing the orientation ($\phi$, $\theta$, $\psi$) of the hand of the robot arm 5.

Figure 23:
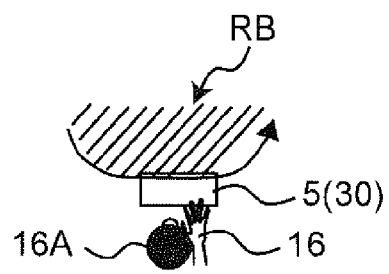
FIG. 23 is a view showing a manipulating state of the robot arm in the robot arm control apparatus according to the first embodiment of the present invention.

The fifth correction type is "task undesired region". When the robot arm 5 (e.g., the hand 30) is gripped by the hand 16 of the person 16A as shown in FIG. 23, and the robot arm 5 (e.g., hand 30) is shifted with a force being applied to the robot arm 5 along the contour of a task undesired region RB, the operation correction unit 20 can set the task undesired region RB as shown in FIG. 23.

Figure 24A:
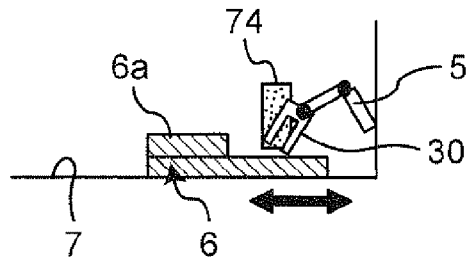
FIG. 24A is a view showing a manipulating state of the robot arm in the robot arm control apparatus according to the first embodiment of the present invention.
Figure 24B:
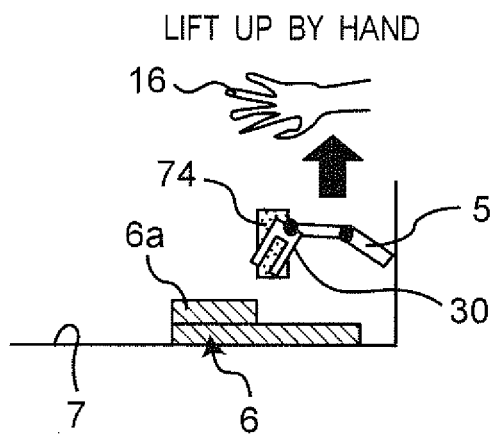
FIG. 24B is a view showing a manipulating state of the robot arm in the robot arm control apparatus according to the first embodiment of the present invention.
Figure 24C:
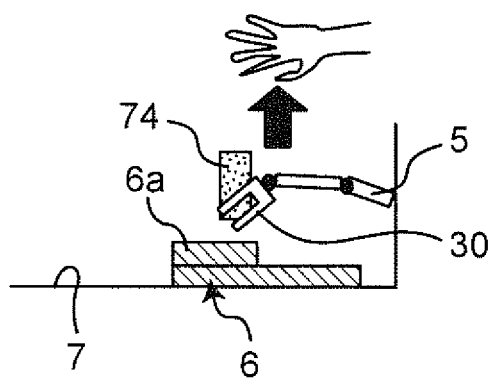
FIG. 24C is a view showing a manipulating state of the robot arm in the robot arm control apparatus according to the first embodiment of the present invention.

The sixth correction type is the "shift in direction perpendicular to task plane". As shown in FIG. 24A, while the robot arm 5 is performing the inserting task of the flexible circuit board 74 into the insert slot 75 of the device 6, when an upward force is applied to the robot arm 5 by the person's hand 16 to shift the robot arm 5 upward as shown in FIG. 24B, the operation correction unit 20 allows the inserting task of the flexible circuit board 74 to be carried out at, for example, a projecting portion 6a of the device 6 which projects upward, as shown in FIG. 24C.

The correction operation type determining unit 23 determines one correction type out of the six correction types. Specifically, one correction type is selected out of the six correction types via the data input IF 26 such as a button, or the correction operation type determining unit 23 estimates the type, based on the relationship information among the force applied to the robot arm 5 by the person's hand 16 detected by the force detecting unit 53 and acquired by the information acquiring unit 100, the force applied to the robot arm 5 having stored in the operation database 17 and acquire by the information acquiring unit 100, and the correction type (e.g., the relationship information among the direction of the force being applied, the magnitude of the force being applied, and the correction type).

In the following, with reference to the flowchart of FIG. 14, a detailed description will be given of a specific correction type estimation process of the correction type estimation method.

In a state where the power button 26a of the assembly robot 1 turned "ON", in a case where no force is applied to the robot arm 5 by being gripped by the person's hand 16, the robot arm 5 does not move. When a force is applied to the robot arm 5 by the person's hand 16, the robot arm 5 can be shifted in any desired direction in the impedance control mode (the mode in which the robot arm 5 is shifted in the direction in which the force of the person's hand 16 is detected under the impedance control). In this case, the force detecting unit 53 of the control unit 22 detects the force acting on the robot arm 5, and the information as to the force detected by the force detecting unit 53 is input to the correction operation type determining unit 23 via the information acquiring unit 100 (step S71).

Subsequently, in step S72, the correction operation type determining unit 23 determines whether or not all the components (the six components of $f_x$, $f_y$, $f_z$, $f_\phi$, $f_\theta$, $f_\psi$) of the force detected by the force detecting unit 53 and acquired by the information acquiring unit 100 are equal to or less than a certain threshold values (specifically, ($f_{dx}$, $f_{dy}$, $f_{dz}$, $f_{d\phi}$, $f_{d\theta}$, $f_{d\psi}$) of the ID "1" in FIG. 17). When the correction operation type determining unit 23 determines that all the components (the six components of $f_x$, $f_y$, $f_z$, $f_\phi$, $f_\theta$, $f_\psi$) of the force detected by the force detecting unit 53 and acquired by the information acquiring unit 100 are equal to or less than the certain threshold values, the robot arm 5 does not move, and no correction is made (step S88), and the correction type estimation process of the corrected operation type estimation method ends. The control mode in this case is the impedance control mode.

In step S72, when the correction operation type determining unit 23 determines that any component of the force detected by the force detecting unit 53 and acquired by the information acquiring unit 100 (any component out of the six components of $f_x$, $f_y$, $f_z$, $f_\phi$, $f_\theta$, $f_\psi$) exceeds the certain threshold values (specifically, ($f_{dx}$, $f_{dy}$, $f_{dz}$, $f_{d\phi}$, $f_{d\theta}$, $f_{d\psi}$) of the ID "1" in FIG. 17)), the process proceeds to step S73.

In step S73, the correction operation type determining unit 23 further determines whether the assembly robot 1 at present is in operation in terms of the operation database 17, based on the information acquired via the information acquiring unit 100. Specifically, when the correction operation type determining unit 23 determines that no task is selected by the operation selecting unit 29, and that the progress information is "0" for every task ID in the operation database 17 (a state where no task is started), the correction operation type determining unit 23 determines that it is not in operation in terms of the operation database 17, and the process proceeds to step S76. When the correction operation type determining unit 23 determines that the operation selecting unit 29 has selected the assembly task and the assembly has started, and that the progress information is "1", the correction operation type determining unit 23 determines that it is in operation in terms of the operation database 17, and the process proceeds to step S74.

Figure 15:
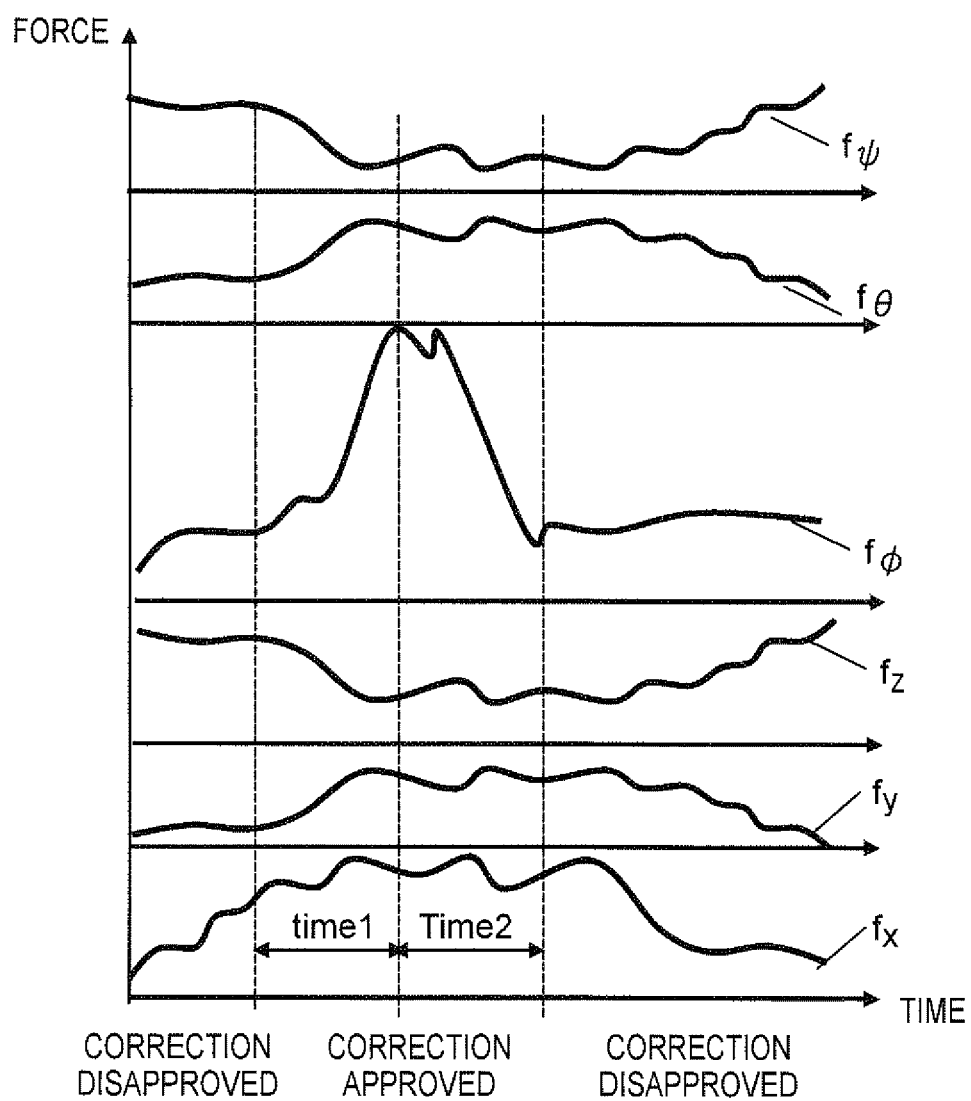
FIG. 15 is a graph showing the relationship between a force applied by a person and the corresponding time in the robot arm control apparatus according to the first embodiment of the present invention.

In step S74, when the robot arm 5 is gripped by the person's hand 16 and applied with a force in a direction toward which the operation of the robot arm 5 is desired to be corrected, the force detecting unit 53 detects the force applied to the robot arm 5; the correction operation type determining unit 23 measures a displacement amount for a certain time period for each force ($f_x$, $f_y$, $f_z$, $f_\phi$, $f_\theta$, $f_\psi$) applied by the person's hand 16 detected by the force detecting unit 53 and acquired via the information acquiring unit 100; and the correction operation type determining unit 23 measures which displacement amount, i.e., that of the position components ($f_x$, $f_y$, $f_z$) or that of the orientation components ($f_\phi$, $f_\theta$, $f_\psi$), is greater. Specifically, as shown in FIG. 15, the correction operation type determining unit 23 measures the force in the time sequence for each of ($f_x$, $f_y$, $f_z$, $f_\phi$, $f_\theta$, $f_\psi$); the correction operation type determining unit 23 measures an extent of displacement of the force for a certain time period (e.g., time 1); and the correction operation type determining unit 23 measures the component whose displacement is the greatest. In this example, because the displacement of $f_\phi$ is the greatest, the correction operation type determining unit 23 determines that a greater force is applied in terms of the orientation components than in terms of the position components. Then, the process proceeds to step S79.

In step S74, when the correction operation type determining unit 23 determines that the displacement amount of orientation is greater than the displacement amount of position, the correction operation type determining unit 23 determines that the correction type is the "direction (orientation) change", and the correction type estimation process ends (step S79). The control mode at this time is the control mode identical to that before the correction type is determined (i.e., the force hybrid impedance control mode).

On the other hand, in step S74, when the correction operation type determining unit 23 determines that the displacement amount of position is equal to or more than the displacement amount of orientation, the correction operation type determining unit 23 further determines whether a force component in the direction perpendicular to the task plane (e.g., the insert plane of the insert slot 75 of the device 6) (for example, the force component in the direction perpendicular to the task plane is $f_z$, in a case where the connector portion of the flexible circuit board 75 is inserted into the device 6 which is placed such that the insert slot 75 of the device 6 becomes parallel to the ground (e.g., a placement plane for the device 6) or, as a part of the assembly task, in a case where it is a polishing task of polishing a polishing target plane of the device 6 which is placed so as to be in parallel to the ground (e.g., placement plane for the device 6)) is equal to or more than a certain threshold value (specifically, $f_{dz}$ of ID "1" in FIG. 17) (step S75).

In step S75, when the correction operation type determining unit 23 determines that the force component in the direction perpendicular to the task plane (e.g., the insert plane of the insert slot 75 of the device 6) is smaller than the certain threshold value, the correction operation type determining unit 23 further determines whether the force component (e.g., one of or both of $f_x$ and $f_y$, in a case where the flexible circuit board 74 is inserted into the device 6 being set in parallel to the workbench 7) in the direction (the direction extending along the task plane) parallel to the task plane (e.g., the insert plane of the insert slot 75 of the device 6) is equal to or more than a certain threshold value (specifically, $f_{dx}$ and $f_{dy}$ of ID "1" in FIG. 17) (step S80).

In step S80, when the correction operation type determining unit 23 determines that the force component, in the direction (the direction extending along the task plane) parallel to the task plane (e.g., the insert plane of the insert slot 75 of the device 6) is less than the certain threshold value (specifically, $f_x$ and $f_y$ of ID "1" in FIG. 17), it is determined that there is no correction (no type), and the correction type estimation process ends (step S81). When there is no correction, the task is performed having correction aborted.

In step S80, when the correction operation type determining unit 23 determines that the force component in the direction (the direction extending along the task plane) parallel to the task plane (e.g., the insert plane of the insert slot 75 of the device 6) is equal to or more than the certain threshold value, the process proceeds to step S83.

In step S83, when the correction operation type determining unit 23 further determines that the shift amount of the robot arm 5 in the direction (the direction extending along the task plane) parallel to the task plane (e.g., the insert plane of the insert slot 75 of the device 6) calculated by the correction operation type determining unit 23 is equal to or more than a certain threshold value (specifically, $g_x$ and $g_y$ of ID "2" in FIG. 17), the correction operation type determining unit 23 determines the type "shift task plane position" as the correction type, and the correction type estimation process ends (step S84). It is to be noted that, when the correction operation type determining unit 23 calculates the shift amount in the direction parallel to the task plane (e.g., the insert plane of the insert slot 75 of the device 6), it is performed in the following manner specifically: the correction operation type determining unit 23 receives from the control unit 22, via the control parameter managing unit 21 or the information acquiring unit 100, the hand position of the robot arm 5 before manipulated by the person and the hand position during manipulation, and the correction operation type determining unit 23 subtracts the hand position before manipulation from the hand position during manipulation, to obtain the result as the shift amount. Further, when the correction operation type determining unit 23 calculates the shift amount perpendicular to the task plane, it is performed in the following manner specifically: the correction operation type determining unit 23 receives from the control unit 22, via the control parameter managing unit 21 or the information acquiring unit 100, the z component of the hand position of the robot arm 5 before manipulated by the person and the z component of the hand position during manipulation, and the correction operation type determining unit 23 subtracts the z component of the hand position before manipulation from the z component of the hand position during manipulation, to obtain the result as the shift amount.

In step S83, when the correction operation type determining unit 23 determines that the shift amount in the direction parallel to the task plane (e.g., the insert plane of the insert slot 75 of the device 6) is less than the certain threshold value, the type "speed" in the direction parallel to the task plane (e.g., the insert plane of the insert slot 75 of the device 6) is determined as the correction type, and the correction type estimation process ends (step S85).

On the other hand, in step S75, when the correction operation type determining unit 23 determines that the force perpendicular to the task plane (e.g., the insert plane of the insert slot 75 of the device 6) is equal to or more than the certain threshold value, the correction operation type determining unit 23 further determines whether or not the shift amount of the robot arm 5 in the direction perpendicular to the task plane (e.g., the insert plane of the insert slot 75 of the device 6) calculated by the correction operation type determining unit 23 is greater than a certain threshold value (specifically, $g_z$ of ID "2" in FIG. 17) (step S82).

In step S82, when the correction operation type determining unit 23 determines that the shift amount in the direction perpendicular to the task plane (e.g., the insert plane of the insert slot 75 of the device 6) is greater than the certain threshold value, the correction operation type determining unit 23 determines the type "shift in direction perpendicular to task plane" as the correction type, and the correction type estimation process ends (step S87).

On the other hand, in step S82, when the correction operation type determining unit 23 determines that the shift amount in the direction perpendicular to the task plane (e.g., the insert plane of the insert slot 75 of the device 6) is equal to or less than the threshold value, "force correction" is determined as the correction type (step S86), and the correction type estimation process ends.

On the other hand, in step S73, when the correction operation type determining unit 23 determines that it is not in operation in terms of the operation database 17, the process proceeds to step S76. In step S76, the correction operation type determining unit 23 further determines whether or not the force applied to the robot arm 5 by the person's hand 16 is parallel to the task plane (e.g., the insert plane of the insert slot 75 of the device 6), and that a shift amount in the horizontal direction for a certain time period is equal to or more than a threshold value (specifically, $g_x$ and $g_y$ of ID "2" in FIG. 17).

In step S76, when the correction operation type determining unit 23 determines that the force applied to the robot arm 5 by the person's hand 16 is parallel to the task plane (e.g., the insert plane of the insert slot 75 of the device 6) and that the shift amount in the horizontal direction for a certain time period is equal to or more than the certain threshold value, the type "task undesired region" is determined as the correction type (step S78), and the correction type estimation process ends. On the other hand, in step S76, when the correction operation type determining unit 23 determines that the force applied to the robot arm 5 by the person's hand 16 is not parallel to the task plane (e.g., the insert plane of the insert slot 75 of the device 6) (e.g., when it is perpendicular thereto), or when the shift amount in the horizontal direction is less than the certain threshold value even though the force is parallel to the task plane (e.g., the insert plane of the insert slot 75 of the device 6), the "no correction" is determined as to the correction type (step S77), and the correction type estimation process ends.

According to the procedure described in the foregoing, the correction type can be switched by the correction operation type determining unit 23, without the necessity of using the data input IF 26 such as a button.

The operation correction unit 20 is a function of correcting the operation information in the operation database 17 upon application of a force to the robot arm 5 by the person's hand 16, while being operated based on the position and orientation and the time in the operation database 17.

In the following, a description will be given of the function of the operation correction unit 20.

When the data input IF 26 (e.g., the power button 26*a* of the console 26A) disposed at the workbench 7 of the assembly robot 1 is powered on by the person's hand 16, the operation correction unit 20 issues a command to the control parameter managing unit 21 to operate in the impedance control mode.

Next, a desired assembly task is selected from the task list in the operation database 17 by the operation selecting unit 29 through use of the person's hand 16, and start of an assembly operation is instructed. The operation correction unit 20 sets the control mode of the rail movable portion 8*b* and the robot arm 5, based on the operation information (specifically, the position of the rail movable portion 8*b* and the position and orientation and time period of the robot arm 5) identified by the selected task ID from the operation database 17. In the present example, because the task ID "3" shown in FIG. 4 is selected, the operation correction unit 20 sets the hybrid impedance control mode the mode in which, while in operation in the position control mode, the robot arm 5 actuates in accordance with a force applied from the person or the like to the robot arm 5) to each of the position and orientation of the robot arm 5 having the flag whose bit represents "1", of the flag (the flag indicative of validity) corresponding to the operation ID "1" in the operation database 17, and issues a command to the control parameter managing unit 21. When the operation correction unit 20 issues the command to the control parameter managing unit 21, as shown in FIG. 21A, the robot arm 5 gripping the flexible circuit board 75 with the hand 30 shifts toward the insert slot 75. Commands are successively issued to the control parameter managing unit 21 based on the operation information pieces following the operation ID "1". The operation ID "9" causes a command to be issued to the control parameter managing unit 21, commanding to operate in the force hybrid impedance control mode.

In a case of the force hybrid impedance control mode, the operation correction unit 20 sets the hybrid impedance control mode (the mode in which, while in operation in the position control mode, the robot arm 5 actuates in accordance with a force applied from the person or the like to the robot arm 5) to each of the position and orientation of the robot arm 5 having the flag whose bit represents "1", and sets the force control mode to any component having the force flag whose bit represents "1" (the flag indicative of validity), of the flag (the flag indicative of validity) corresponding to the operation ID in the operation database 17. The operation correction unit 20 sets the impedance control mode to those components to which none of the hybrid impedance control mode and the force control mode is set out of the six components of position and orientation.

For example, the operation ID "9" of the task ID "3" in FIG. 4 represents the task of inserting the flexible circuit board 74 into the insert slot 75. The flag corresponding to the operation ID "9" is "1" for only the 1st, the 2nd, and the 8th bits. Therefore, the operation correction unit 20 sets the hybrid impedance control mode to the x-axis component and the y-axis component; the operation correction unit 20 sets the force control mode to the z-axis component; and the operation correction unit 20 sets the impedance control mode to the orientation components.

The control parameter managing unit 21 receives a command from the operation correction unit 20. That is, when the operation correction unit 20 issues a command to the control parameter managing unit 21 to perform the assembly task in the force hybrid impedance control mode or the force hybrid impedance control mode, as shown in FIGS. 21A and 21B, after the robot arm 5 has shifted toward the insert slot 75, the robot arm 5 starts the task of inserting the flexible circuit board 74 into the insert slot 75.

Next, a description will be given of an exemplary case in which, in accordance with any specification change of the flexible circuit board 74 or the insert slot 75 due to model change or the like, the person checks the situation or the like and desires to cause the robot arm 5 to translate slightly further in the lateral direction to perform the task, as shown in FIG. 19C. As shown in FIG. 19C, the robot arm 5 is directly gripped by the person's hand 16, and a force is applied to the robot arm 5 in parallel to the task plane (e.g., the insert plane of the insert slot 75 of the device 6), such that the robot arm 5 translates relative to the task plane (e.g., the insert plane of the insert slot 75 of the device 6).

Figure 14:
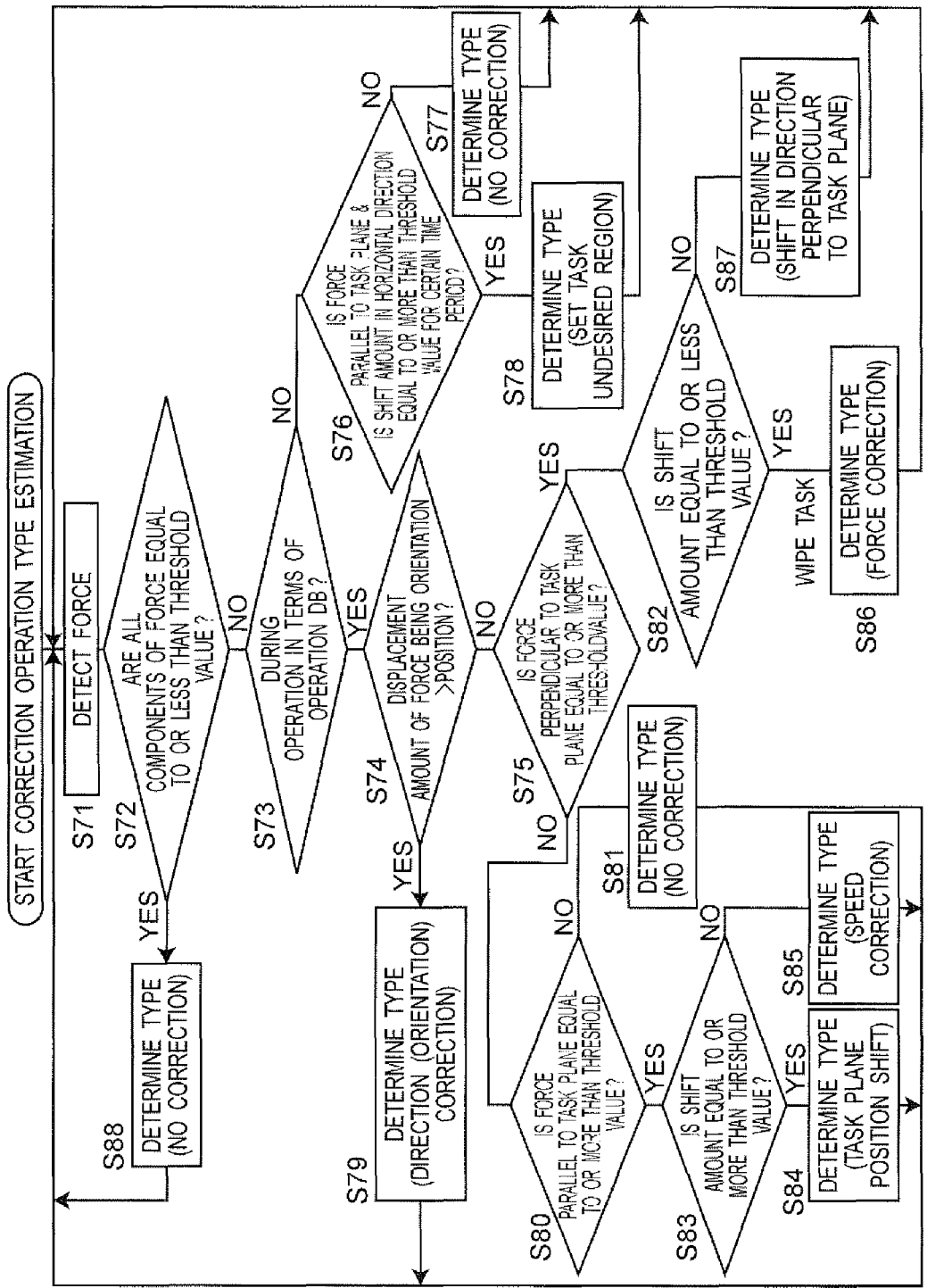
FIG. 14 is a flowchart representing operation steps of the correction operation type determining unit in the robot arm control apparatus according to the first embodiment of the present invention.

The correction operation type determining unit 23 estimates and determines the correction type according to the correction type estimation process shown in the flowchart of FIG. 14, based on the force applied to the robot arm 5 by the person's hand 16 and the information stored in the operation database 17, each acquired by the information acquiring unit 100. Here, the force is applied by the person's hand 16 to the robot arm 5 in the direction parallel to the task plane (e.g., the insert plane of the insert slot 75 of the device 6), to shift the robot arm 5 by a value equal to or more than the certain threshold value. Therefore, in step S84, the correction operation type determining unit 23 determines the type "shift task plane position" as the correction type.

In a case where the task is the one whose task ID is "3" and the operation ID is "9" in FIG. 4, while the robot arm 5 is being shifted in the position control mode, the x-axis component and the y-axis component are in the force hybrid impedance control mode, so that the force detecting unit 53 detects the force applied to the robot arm 5 by the person's hand 16 in the impedance control mode, whereby the robot arm 5 is shifted as to x-axis direction and the y-axis direction in the direction in which the force has been applied to the robot arm 5 by the person's hand 16. Thus, the insertion position of the flexible circuit board 75 can be corrected as shown in FIG. 19D.

It is to be noted that, in the present example, it is desired to correct the operation as to the x-axis direction and as to the y-axis direction only. Therefore, at the timing where the correction operation type determining unit 23 determines the correction type, the correction operation type determining unit 23 sets "1" for the 0th and 1st bits of the correction parameter flag shown in FIG. 6 and sets "0" for the other bits, and the correction operation type determining unit 23 issues a command to the control parameter managing unit 21. Thus, it becomes possible to set so as to prevent shifting in any directions other than the x-axis and the y-axis. Further, the correction operation type determining unit 23 changes the mechanical impedance set value in the impedance control mode and issues a command to the control parameter managing unit 21. This makes it possible to reduce the rigidity in the x-axis direction and the y-axis direction so as to be lower than the rigidity of the other directions, such that the robot arm 5 is easily moved by the person's hand 16 in the x-axis direction and the y-axis direction; and makes it possible to increase the rigidity of any directions other than the x-axis direction and the y-axis direction, such that the robot arm 5 is not easily moved by the person's hand 16 in any directions other than the x-axis direction and the y-axis direction. This prevents the z-axis component of the robot arm 5 from being erroneously corrected, in a case where only the x-axis component and the y-axis component of the robot arm 5 are desired to be corrected. Further, while a correction of the robot arm 5 is being made as to the x-axis direction and the y-axis direction, the correction operation type determining unit 23 can weaken or reduce the force as to the z-axis component applied to the task plane (e.g., the insert plane of the insert slot 75 of the device 6) as compared to (specifically, about half as great as) that applied in the operation before the correction is made. Alternatively, the correction operation type determining unit 23 can issue a command to the control parameter managing unit 21 to stop the force control. Specifically, the correction operation type determining unit 23 sets "0" for the 6th to 17th bits of the flag in the operation database 17. This prevents the force from being applied to the robot arm 5 while the correction is made to shift the robot arm 5 in the x-axis direction and the y-axis direction, which may otherwise cause damage to the device 6.

As described above, in a case where the robot arm 5 is gripped by the person's hand 16 and applied with a force in the direction parallel to the task plane (e.g., the insert plane of the insert slot 75 of the device 6), so as to be shifted by $\Delta x$ and $\Delta y$ in the x-axis direction and the y-axis direction, the value $\Delta x$ and the value $\Delta y$ are transmitted to the operation correction unit 20 via the control unit 22 and the control parameter managing unit 21.

The operation correction unit 20 obtains corrected operation information by subtracting $\Delta x$ from every x-coordinate value of the operation information of the selected task ID, and further subtracting $\Delta y$ from every y-coordinate value, and transmits the result to the control parameter managing unit 21. The control parameter managing unit 21 instructs the control unit 22 to cause the robot arm 5 to operate at the coordinates corrected by $\Delta x$ and $\Delta y$. Thus, the corrected operation as shown in FIG. 19D can be achieved. Next, the operation storage unit 15 stores the operation information subtracted by $\Delta x$ and $\Delta y$ in the operation database 17.

Next, as shown in FIG. 24B, for example, when an inserting task is to be performed at the projecting portion 6a provided to the device 6 while a task is performed above the device 6, the robot arm 5 is directly gripped by the person's hand 16, to apply a force to the robot arm 5 perpendicularly to the task plane (e.g., the insert plane of the insert slot 75 of the device 6), such that the robot arm 5 shifts upward, i.e., in the direction perpendicular to the task plane (e.g., the insert plane of the insert slot 75 of the device 6).

The correction operation type determining unit 23 estimates and determines the correction type according to the correction type estimation process shown in the flowchart of FIG. 14, based on the force applied to the robot arm 5 by the person's hand 16 and the information in the operation database 17 each acquired by the information acquiring unit 100. Here, the force is applied by the person's hand 16 to the robot arm 5 in the direction perpendicular to the task plane (e.g., the insert plane of the insert slot 75 of the device 6), to shift the robot arm 5 by a value equal to or more than the certain threshold value. Therefore, in step S87, the correction operation type determining unit 23 determines the type "shift in direction perpendicular to task plane" as the correction type.

The force hybrid impedance control mode or the hybrid impedance control mode makes it possible to detect, while the robot arm 5 is being shifted in the position control mode, the force of the person's hand 16 by the force detecting unit 53 in the impedance control mode so as to allow the robot arm 5 to shift in the z-axis direction which is the direction in which the force has been applied to the robot arm 5 by the person's hand 16. Thus, the insertion position can be corrected as to the z-axis direction as shown in FIG. 24C.

It is to be noted that, in the present example, it is desired to correct the operation as to the z-axis direction only. Therefore, at the timing where the correction operation type determining unit 23 determines the correction type, the correction operation type determining unit 23 sets "1" for the 2nd bit shown in FIG. 6, and sets "0" for the other bits, and the correction operation type determining unit 23 issues a command to the control parameter managing unit 21. Thus, it becomes possible to set so as to prevent shifting in any directions other than the z-axis direction. Further, the correction operation type determining unit 23 changes the mechanical impedance set value in the impedance control mode and issues a command to the control parameter managing unit 21. This makes it possible to reduce the rigidity in the z-axis direction so as to be lower than the rigidity of the other directions, such that the robot arm 5 is easily moved by the person's hand 16 in the z-axis direction; and makes it possible to increase the rigidity of any directions other than the z-axis direction, such that the robot arm 5 is not easily moved by the person's hand 16 in any directions other than the z-axis direction.

Further, when a correction of the operation as to the z-axis direction of the robot arm 5 is to be made, the correction operation type determining unit 23 can weaken or reduce the force as to the z-axis component applied to the task plane (e.g., the insert plane of the insert slot 75 of the device 6) as compared to (specifically, about half as great as) that applied in the operation before the correction is made. Alternatively, the correction operation type determining unit 23 can issue a command to the control parameter managing unit 21 to stop the force control. Specifically, the correction operation type determining unit 23 sets "0" for the 6th to 17th bits of the flag in the operation database 17. This prevents the force from being applied to the robot arm 5 while the robot arm 5 is shifted in the z-axis direction, which may otherwise cause damage to the device 6.

As described above, in a case where the robot arm 5 is gripped by the person's hand 16 and applied with a force in the direction perpendicular to the task plane (e.g., the insert plane of the insert slot 75 of the device 6), so as to be shifted by $\Delta z$ in the z-axis direction, the value $\Delta z$ is transmitted to the operation correction unit 20 via the control unit 22 and the control parameter managing unit 21.

The operation correction unit 20 obtains corrected operation information by subtracting $\Delta z$ from every z-coordinate value of the operation information identified by the selected task ID, and transmits the result to the control parameter managing unit 21. The control parameter managing unit 21 instructs the control unit 22 to cause the robot arm 5 to operate at the coordinates corrected by $\Delta z$. Thus, the corrected operation as shown in FIG. 24C can be achieved. Next, the operation storage unit 15 stores the operation information subtracted by $\Delta z$ in the operation database 17.

Figure 20B:
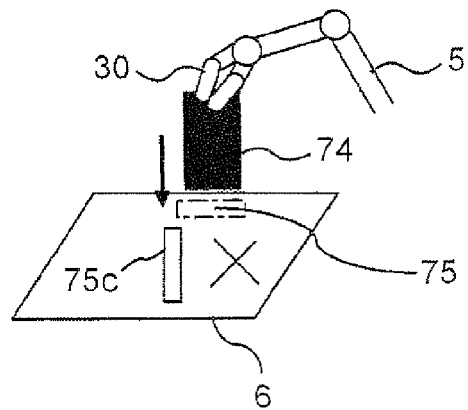
FIG. 20B is a view showing a manipulating state of the robot arm in the robot arm control apparatus according to the first embodiment of the present invention.
Figure 20C:
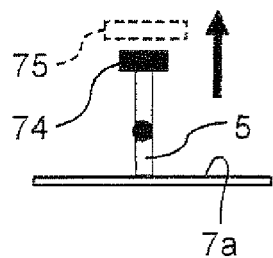
FIG. 20C is a view showing a manipulating state of the robot arm in the robot arm control apparatus according to the first embodiment of the present invention (a view corresponding to FIG. 20A viewed from above)
Figure 20D:
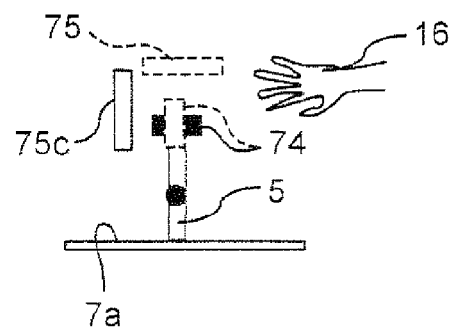
FIG. 20D is a view showing a manipulating state of the robot arm in the robot arm control apparatus according to the first embodiment of the present invention.
Figure 20E:
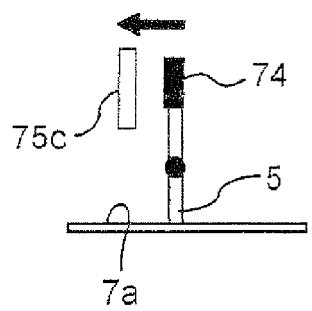
FIG. 20E is a view showing a manipulating state of the robot arm in the robot arm control apparatus according to the first embodiment of the present invention.

As shown in FIG. 20B, for example, when the orientation of the robot arm 5 is to be changed, as shown in FIG. 20D, the robot arm 5 is directly gripped by the person's hand 16, and the robot arm 5 is shifted in the change-desired direction.

The correction operation type determining unit 23 estimates and determines the correction type according to the correction type estimation process shown in the flowchart shown in FIG. 14, based on the force applied to the robot arm 5 by the person's hand 16 and the information in the operation database 17 each acquired by the information acquiring unit 100. Here, the force is applied to the robot arm 5 by the person's hand 16 in the change-desired direction. Therefore, in step S79, the correction operation type determining unit 23 determines type "direction (orientation) change" as the correction type.

The hybrid impedance control mode or the force hybrid impedance control mode makes it possible to detect, while the robot arm 5 is being shifted in the position control mode, the force applied to the robot arm 5 by the person's hand 16 by the force detecting unit 53 in the impedance control mode so as to allow the robot arm 5 to rotate in the $\phi$-axis direction which is the direction in which the force has been applied to the robot arm 5 by the person's hand 16. Thus, the insertion direction can be corrected as shown in FIG. 20E.

It is to be noted that, in the present example, it is desired to correct the operation as to $\phi$-axis direction only. Therefore, at the timing where the correction operation type determining unit 23 determines the correction type, the correction operation type determining unit 23 sets "1" for the 3rd bit of the correction parameter flag shown in FIG. 6, and sets "0" for the other bits, and the correction operation type determining unit 23 issues a command to the control parameter managing unit 21. Thus, the correction operation type determining unit 23 can set so as to prevent shifting in any directions other than the $\phi$-axis direction. Further, the correction operation type determining unit 23 changes the mechanical impedance set value in the impedance control mode and issues a command to the control parameter managing unit 21. This makes it possible to reduce the rigidity of the $\phi$-axis direction to be lower than the rigidity of the other directions, such that the robot arm 5 is easily moved by the person's hand 16 in the $\phi$-axis direction; and makes it possible to increase the rigidity of any directions other than the $\phi$-axis direction, such that the robot arm 5 is not easily moved by the person's hand 16 in any directions other than the $\phi$-axis direction.

Further, while a correction of the robot arm 5 as to $\phi$-axis direction is being made, the correction operation type determining unit 23 can weaken or reduce the force as to the z-axis component applied to the task plane (e.g., the insert plane of the insert slot 75 of the device 6) as compared to (specifically, about half as great as) that applied in the operation before the correction is made. Alternatively, the correction operation type determining unit 23 can issue a command to the control parameter managing unit 21 to stop the force control. Specifically, the correction operation type determining unit 23 sets "0" for the 6th to 17th bits of the flag in the operation database 17. This prevents the force from being applied to the robot arm 5 while being shifted in the $\phi$-axis direction, which may otherwise cause damage to the device 6.

As described above, in a case where the robot arm 5 is gripped by the person's hand 16 and applied with a force in the direction perpendicular to the task plane (e.g., the insert plane of the insert slot 75 of the device 6), so as to be rotated in the $\phi$-axis direction by $\Delta\phi$, the value $\Delta\phi$ is transmitted to the operation correction unit 20 via the control unit 22 and the control parameter managing unit 21.

The operation correction unit 20 obtains corrected operation information by subtracting $\Delta\phi$ from every $\phi$-coordinate value of the operation information identified by the selected task ID, and transmits the result to the control parameter managing unit 21. The control parameter managing unit 21 instructs the control unit 22 to cause the robot arm 5 to operate at the coordinates corrected by $\Delta\phi$. Thus, the corrected operation as shown in FIG. 20E can be achieved. Next, the operation storage unit 15 stores the operation information subtracted by Δϕ in the operation database 17.

According to the procedure described in the foregoing, in a state where the robot arm 5 is in operation in the hybrid impedance control mode or the force hybrid impedance control mode, a force applied to the robot arm 5 by the person's hand 16 allows the operation correction unit 20 to correct the generated position for each direction, with reference to the position and orientation and time in the operation database 17.

Next, as shown in FIG. 18C, when a force to the task plane (e.g., the insert plane of the insert slot 75 of the device 6) in performing the assembly task is to be changed, the robot arm 5 is directly gripped by the person's hand 16, and a force is applied to the robot arm 5 in a direction perpendicular to the task plane (e.g., the insert plane of the insert slot 75 of the device 6).

The correction operation type determining unit 23 estimates and determines the correction type according to the correction type estimation process shown in the flowchart of FIG. 14, based on the force applied to the robot arm 5 by the person's hand 16 and the information stored in the operation database 17 each acquired by the information acquiring unit 100. Here, the force is applied to the robot arm 5 by the person's hand 16 in the direction perpendicular to the task plane (e.g., the insert plane of the insert slot 75 of the device 6), but the robot arm 5 is not shifted by an amount equal to or more than the certain threshold value. Therefore, in step S86, the correction operation type determining unit 23 determines the type "force correction" as the correction type.

At the timing where the correction operation type determining unit 23 determines the correction type to be the "force correction", the correction operation type determining unit 23 issues a command to the control parameter managing unit 21 to operate in the high-rigidity position control mode, from the force hybrid impedance control mode. In issuing the command from the correction operation type determining unit 23 to the control parameter managing unit 21, the correction operation type determining unit 23 in the high-rigidity position control mode can set high rigidity for each direction when controlling the positions. Therefore, for example, as to the flag of the operation whose task ID is "3" and the operation ID is "9" in the operation database 17 in FIG. 4, "1" is set for the 0th, 1st, and 8th bits. Therefore, the operation is performed in the force control mode as to the z-axis direction, and is performed in the hybrid impedance control mode as to the other directions. Accordingly, the correction operation type determining unit 23 issues a command to the control parameter managing unit 21 to operate in the high-rigidity position control mode as to the z-axis direction only, and to operate in the hybrid impedance control mode as to the other directions.

Next, as shown in FIG. 18C, when it is desired to change the inserting force to be greater (a greater force) by directly gripping the robot arm 5 by the person's hand 16 while the robot arm 5 is operating to perform the inserting task of the flexible circuit board 74, a force is applied downward to the robot arm 5 by the person's hand 16 toward the task plane (e.g., the insert plane of the insert slot 75 of the device 6). The high-rigidity position control mode is a mode with further higher rigidity than the position control mode being set for each direction under the hybrid impedance control mode when performing the assembly task. The high-rigidity position control mode can be achieved by increasing the gain in the positional error compensation unit 56 (specifically, about twice as great as that in the position control mode when the assembly task is performed). In the high-rigidity position control mode, when a force is applied to the robot arm 5 by the person's hand 16, the robot arm 5 cannot easily be shifted, and the force detecting unit 53 can detect the force applied to the robot arm 5 by the person's hand 16. The force detected by the force detecting unit 53 of the control unit 22 is reported to the operation correction unit 20. The force reported to the operation correction unit 20 is stored by the operation storage unit 15 in the operation database 17. This makes it possible to correct the operation to perform insertion more forcibly (with a greater force). When the person desires to finish correcting, the person stops applying the force to the robot arm 5 by gripping the robot arm 5. In such a case where a force is not applied to the robot arm 5 by the person's hand 16, every component of the force becomes equal to or less than the threshold value, in step S72 in FIG. 14. Therefore, the correction operation type determining unit 23 determines "no correction" as the correction type (step S88 in FIG. 14). Upon receipt of the "no correction" information at the operation correction unit 20, the correction operation type determining unit 23 issues a command to the control parameter managing unit 21 to exert control in the hybrid impedance control mode, from the high-rigidity position control mode. Thus, the task is performed according to the operation database 17 after the correction is made.

According to the procedure described in the foregoing, in a state where the robot arm 5 is in operation in the hybrid impedance control mode, a force applied by the person's hand 16 allows the operation correction unit 20 to make a correction such that insertion is performed with the corrected force, with reference to the force information in the operation database 17.

Next, as shown in FIG. 22B, when a speed of shift of the robot arm 5 is to be changed, the robot arm 5 is directly gripped by the person's hand 16; and in a case where it is desired to accelerate, a force is applied to the robot arm 5 by the person's hand 16 in the direction identical to the traveling direction of the robot arm 5 for performing insertion; whereas in a case where it is desired to decelerate, a force is applied to the robot arm 5 by the person's hand 16 in the direction opposite to the traveling direction of the robot arm 5 for performing insertion. Here, the force is applied to the robot arm 5 by the person's hand 16 such that the speed of the hand position of the robot arm 5 may be changed, but the position should not be moved by an amount equal to or more than the certain threshold value.

The correction operation type determining unit 23 estimates and determines the correction type according to the correction type estimation process shown in the flowchart of FIG. 14, based on the force applied to the robot arm 5 by the person's hand 16 and the information stored in the operation database 17 each acquired by the information acquiring unit 100. Here, the force is applied to the robot arm 5 by the person's hand 16 in the direction parallel to the task plane (e.g., the insert plane of the insert slot 75 of the device 6), but the robot arm 5 is not shifted by an amount equal to or more than the certain threshold value. Therefore, in step S85 in FIG. 14, the correction operation type determining unit 23 determines the type "speed" in the direction parallel to the task plane (e.g., the insert plane of the insert slot 75 of the device 6), as the correction type.

In the hybrid impedance control mode, while the robot arm 5 is being shifted in the position control mode, the force detecting unit 53 detects the force applied to the robot arm 5 by the person's hand 16 and the robot arm 5 is shifted as to the x-axis direction and the y-axis direction in the direction in which the force has been applied to the robot arm 5 by the person's hand 16, in the impedance control mode. Assuming that the time period it takes for the robot arm 5 to shift, e.g., from the position $(x_1, y_2, z_1)$ identified by the task ID and the operation ID in the operation database 17 to the robot arm 5's position $(x_2, y_2, z_2)$ identified by the next operation ID is $t_1$, when the speed of the robot arm 5 is changed by a force of the person's hand 16 (see FIG. 22B), that is, when the time period it takes to shift from the position $(x_1, y_2, z_1)$ to the position $(x_2, y_2, z_2)$ is changed from $t_1$ to $t_2$, the value time period $t_2$ is transmitted to the operation correction unit 20 via the control unit 22 and the control parameter managing unit 21. The operation correction unit 20 changes the time period $t_1$ to the time period $t_2$ for the operation information identified by the selected task ID, and transmits the same to the control parameter managing unit 21. The control parameter managing unit 21 instructs the control unit 22 to operate with the $t_2$ which is the corrected time period. Thus, the corrected operation as shown in FIG. 22C is achieved. Next, the operation storage unit 15 stores the time period $t_2$ in the operation database 17.

According to the procedure described in the foregoing, in a state where the robot arm 5 is in operation in the force hybrid impedance control mode, a force applied to the robot arm 5 by the person's hand 16 allows the operation correction unit 20 to correct the operation speed of the robot arm 5, with reference to the information pieces of the position and orientation and the time period in the operation database 17.

A description will be given of, as shown in FIG. 23, an exemplary case in which the task undesired region RB is set to the assembly robot 1 through use of the robot arm 5.

When the data input IF 26 (e.g., the power button 26a of the console 26A) disposed at the top portion of the assembly robot 1 is powered on by the person's hand 16, the operation correction unit 20 issues a command to the control parameter managing unit 21 to operate in the impedance control mode. In a state where no task is selected by the operation selecting unit 29, as shown in FIG. 23, the hand 16 of the person 16A directly grips the robot arm 5 (e.g., the hand 30) to shift the robot arm 5 in the direction parallel to the task plane (e.g., the top plane of the workbench 7 where the device 6 is placed), to thereby shift the robot arm 5 (e.g., the hand 30) along the contour of the task undesired region RB. FIG. 25A shows the task plane (e.g., the top plane of the workbench 7 where the device 6 is placed) as viewed from above. In a case where the task undesired region RB is the hatched region, the person's hand 16 shifts the robot arm 5 (e.g., the hand 30) along the contour of the task undesired region RB, as indicated by arrows. Here, a mark 63 is applied to the center tip on the top plane of the hand of the robot arm 5 (the hand 30) (see FIGS. 25A and 25B), and the robot arm 5 is shifted having the mark 63 point in the direction where a task performance is undesired.

In a case where: the correction operation type determining unit 23 executes the correction type estimation process shown in FIG. 14 and determines that it is not in operation in terms of the operation database 17 (steps S72, S73, and S76); and the force applied to the robot arm 5 by the person's hand 16 is parallel to the task plane (e.g., the top plane of the workbench 7 where the device 6 is placed) and the shift amount in the horizontal direction for a certain time period is equal to or more than the certain threshold value, in step S78, the type "task undesired region" is determined as the correction type.

In the impedance control mode, the force detecting unit 53 detects the force applied to the robot arm 5 by the person's hand 16, and the robot arm 5 is shifted by the person's hand 16 as to the x-axis direction and the y-axis direction in the direction in which the force has been applied to the robot arm 5. Thus, as shown in FIG. 25A, the robot arm 5 (e.g., the hand 30) is shifted in order of the position $(x_1, y_1)$, the position $(x_2,$ $y_2)$, the position $(x_3, y_3)$, and the position $(x_4, y_4)$. Here, these pieces of positional information are transmitted to the operation correction unit 20 via the control unit 22 and the control parameter managing unit 21. Upon receipt of the command, the operation correction unit 20 allows the operation storage unit 15 to store the pieces of positional information as the information as to the task disapproved region RB in the task disapproved region database 28. The four positions' being the information as to the apexes of the task disapproved region RB makes it possible to, for example, acquire hand positions of the robot arm 5 shifted by the person at certain intervals, to generate a region by connecting the coordinates of the acquired hand positions, and to regard it as the task disapproved region RB. Further, it is also possible to add a function for determining the shape to be taken by the region. For example, in a case where it is set as "rectangular", when the shift direction is changed by an angle of approximately 90 degrees, the position is stored as the apex information. In a case where it is set as "random", the hand positions of the robot arm 5 shifted by the person at certain intervals are acquired, to generate a region by connecting the coordinates of the acquire hand positions, and to regard it as the task disapproved region RB.

It is to be noted that, in the present example, it is desired to correct the operation of the robot arm 5 as to the x-axis direction and the y-axis direction only. Therefore, at the timing where the correction operation type determining unit 23 determines the correction type, the correction operation type determining unit 23 sets "1" for the 0th and 1st bits of the correction parameter flag shown in FIG. 6, and sets "0" for the other bits, and the correction operation type determining unit 23 issues a command to the control parameter managing unit 21. Thus, it becomes possible to set so as to prevent the robot arm 5 from shifting in any axial directions other than the x-axis direction and the y-axis direction. Further, the correction operation type determining unit 23 changes the mechanical impedance set value in the impedance control mode and issues a command to the control parameter managing unit 21. This makes it possible to reduce the rigidity of the x-axis direction and the y-axis direction, such that the robot arm 5 is easily moved by the person's hand 16 in the x-axis direction and the y-axis direction; and makes it possible to increase the rigidity of any axial directions other than the x-axis direction and the y-axis direction, such that the robot arm 5 is not easily moved by the person's hand 16 in any axial directions other than the x-axis direction and the y-axis direction.

According to the procedure described in the foregoing, a force applied by the person's hand 16 allows the operation correction unit 20 to set the task undesired region.

Figure 9:
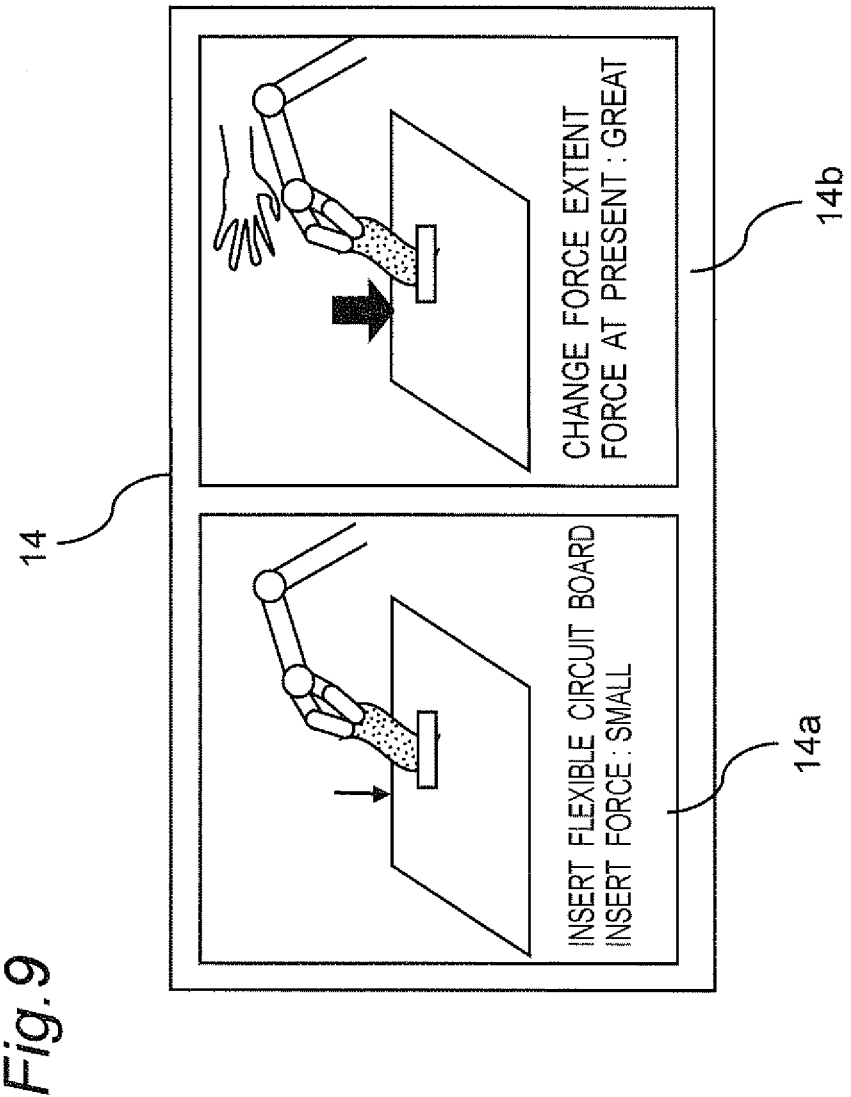
FIG. 9 is a view describing a display unit of a peripheral apparatus according to the first embodiment of the present invention.

As shown in FIG. 9, the display unit 14 displays any item on its screen which is divided into two right and left windows 14a and 14b. On the left window 14a, the assembly operation of the robot arm 5 described in the operation database 17 is displayed as videos, photographs, or text. Further, on the right window 14b, the information as to the correction type estimated by the correction operation type determining unit 23 is displayed as videos, photographs, or text. In the present example shown in FIG. 9, when an operation of correcting the extent of force to be applied by applying a force to the robot arm 5 by the person's hand 16 perpendicularly to the task plane (e.g., the insert plane of the insert slot 75 of the device 6) is performed, at the timing where the correction operation type determining unit 23 determines the type "force correction" as the correction type, the video in which the correction of the force is being made, and the magnitude of the force at present are displayed on the right window 14b.

It is to be noted that, though the videos, the photographs, or the text is presented in the present example, voices or the like explaining the operation may be produced.

Figure 13:
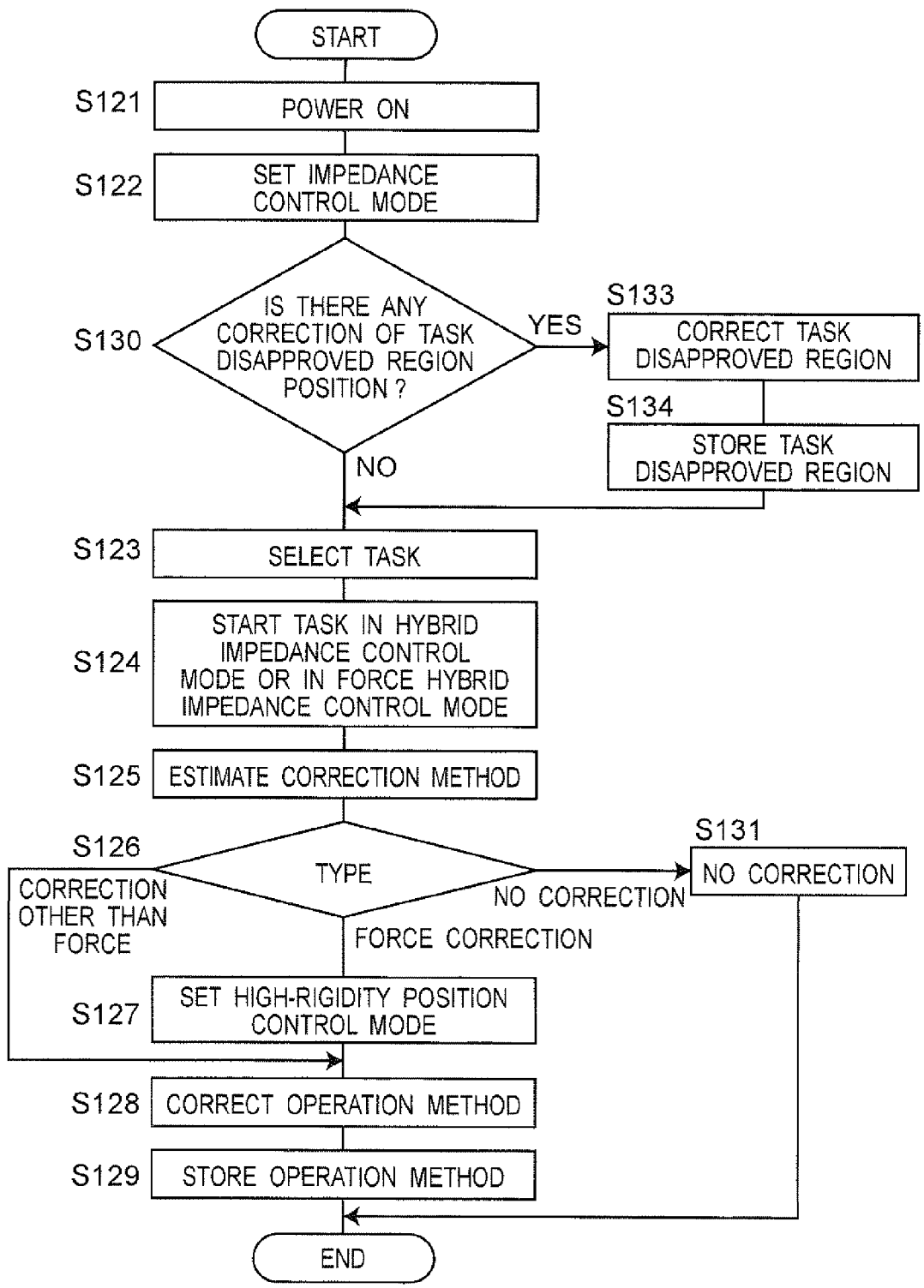
FIG. 13 is a flowchart representing operation steps of an operation correction unit, a correction operation type determining unit, an operation selecting unit, an operation storage unit, an operation database, and a control parameter managing unit, each in the robot arm control apparatus according to the first embodiment of the present invention.

With reference to the flowchart of FIG. 13, a description will be given of operation steps of the operation correction unit 20, the correction operation type determining unit 23, the operation selecting unit 29, the operation storage unit 15, the operation database 17, and the control parameter managing unit 21 (that is, an assembly task and assembly operation setting process that is executed from when the assembly robot 1 starts driving until when an assembly task starts).

The assembly robot 1 is powered on via the data input IF 26 by the person's hand 16 (step S121).

Subsequently, the operation correction unit 20 issues a command to the control parameter managing unit 21 to control in the impedance control mode (step S122).

Next, the correction operation type determining unit 23 determines whether it is a correction of the task disapproved region RB (step S130). When the correction operation type determining unit 23 determines that it is the correction of the task disapproved region RB, the operation correction unit 20 makes the correction (step S133), and the operation storage unit 15 stores the correction information in the operation database 17 (step S134). Thereafter, the process proceeds to step S123.

On the other hand, when the correction operation type determining unit 23 determines that it is not the correction of the task disapproved region RB in step S130, or after step S134 is executed, the process proceeds to step S123. In step S123, the operation selecting unit 29 allows the person to select one task from the assembly task list displayed on the display unit 14 via the data input IF 26, and sets the selected present task in the progress information in the operation database 17 (step S123).

Subsequently, the operation correction unit 20 issues a command to the control parameter managing unit 21 to operate in the force hybrid impedance control mode; the robot arm 5 is guided by the person's hand 16 to the task plane of the device 6 or the like (e.g., the insert plane of the insert slot 75 of the device 6); via the data input IF 26 (e.g., the start button of the switch 26c), the mode is switched to the hybrid impedance control mode or the force hybrid impedance control mode; and task start is commanded (step S124).

Subsequently, when the person applies a force in the direction toward which a correction is desired, the correction operation type determining unit 23 estimates and determines the correction operation type (step S125).

Subsequently, in step S125, when the correction operation type determining unit 23 determines the correction type of the force applied to the task plane (e.g., the insert plane of the insert slot 75 of the device 6) as the correction type, the operation correction unit 20 issues a command to the control parameter managing unit 21 to operate in the high-rigidity position control mode relative to the direction perpendicular to the task plane (e.g., the insert plane of the insert slot 75 of the device 6) (steps S126 and S127).

Subsequently, by the person's hand 16 gripping the robot arm 5 to apply the force to the robot arm 5 with the person's hand 16 in the direction in which the correction is desired, the operation correction unit 20 corrects the operation information (step S128).

On the other hand, in step S125, when a correction type other than type of the force applied to the task plane (e.g., the insert plane of the insert slot 75 of the device 6) is determined as the correction type, the control mode is not changed from the force impedance control mode, and by the person's hand 16 applying the force to the robot arm 5 in the direction in which the correction is desired, the operation correction unit 20 corrects the operation information (steps S126 and S128).

Subsequently, the operation storage unit 15 stores the operation information corrected in step S128 in the operation database 17. Then, the assembly task and assembly operation setting process sequence ends (step S129).

On the other hand, in step S125, when the correction operation type determining unit 23 determines "no correction" as the correction type, the assembly task and assembly operation setting process sequence ends (steps S126 and S131).

After the assembly task and assembly operation setting process ends, based on the assembly task and the assembly operation being set, the assembly robot 1 performs the assembly task.

Through the foregoing operation steps S121 and S122, S130, S123 and S124, and S133 to S134, the assembly task performed by the robot arm 5 is achieved by correcting, during an operation performed in the hybrid impedance control mode or the force hybrid impedance control, the assembly operation in the hybrid impedance control mode or the high rigidity position control.

Further, the correction operation type determining unit 23 makes it possible to automatically switch and correct a plurality of operations simply by application of a force to the robot arm 5 by the person's hand 16, without the necessity of using buttons or the like.

Still further, provision of the control parameter managing unit 21 and the control unit 22 makes it possible to set the mechanical impedance value of the robot arm 5 as appropriate in accordance with the correction operation type, so as to change the mechanical impedance value and exerting the control in accordance with the direction of the robot arm 5 to be corrected, and to weaken or stop the force applied while the correction is made. Therefore, it becomes possible to prevent the device 6 from being damaged during a correction being made to an operation.

Further, in the first embodiment, the correction operation type determining unit 23 estimates the correction type based on the force applied to the robot arm 5 by the person's hand 16 and the information in the operation database 17 each acquired by the information acquiring unit 100, and immediately thereafter the operation correction unit 20 makes a correction of the operation. However, for the purpose of preventing the person from accidentally applying a force to the robot arm 5 with the hand 16, which otherwise causes an unintended correction type to be selected, the correction may be started after a lapse of a certain time period after the estimation by the correction operation type determining unit 23 is made. In this case, until the correction is started, the person can manipulate as many times as desired until the intended correction type is selected.

Still further, in the first embodiment, each of or any arbitrary part of the operation selecting unit 29, the operation storage unit 15, the operation correction unit 20, the correction operation type determining unit 23, the control parameter managing unit 21, and the control unit 22 can be structured as software. Hence, for example, each of the steps can be executed by readably storing, as a computer program including the steps structuring the control operation of the first embodiment or the following embodiment described in the present specification, in a recording medium such as a storage device (hard disk or the like), and have the computer program installed in the temporary storage device (a semiconductor memory or the like) of a computer, and have it executed through use of a CPU.

Second Embodiment

An assembly robot 1 including a control apparatus for a robot arm according to a second embodiment of the present invention is similar to the first embodiment as to the basic structure of the control apparatus for the robot arm. Therefore, the description as to the common constituents is not repeated herein, and the difference from the first embodiment solely will be detailed in the following.

In the second embodiment, as in the first embodiment, the description will be given of an exemplary case in which, as shown in FIG. 1, a flexible circuit board 74 is installed in a flexible circuit board insert slot 75 of a device 6 such as a television set, or a DVD recorder, in a factory employing cellular manufacturing.

Figure 27:
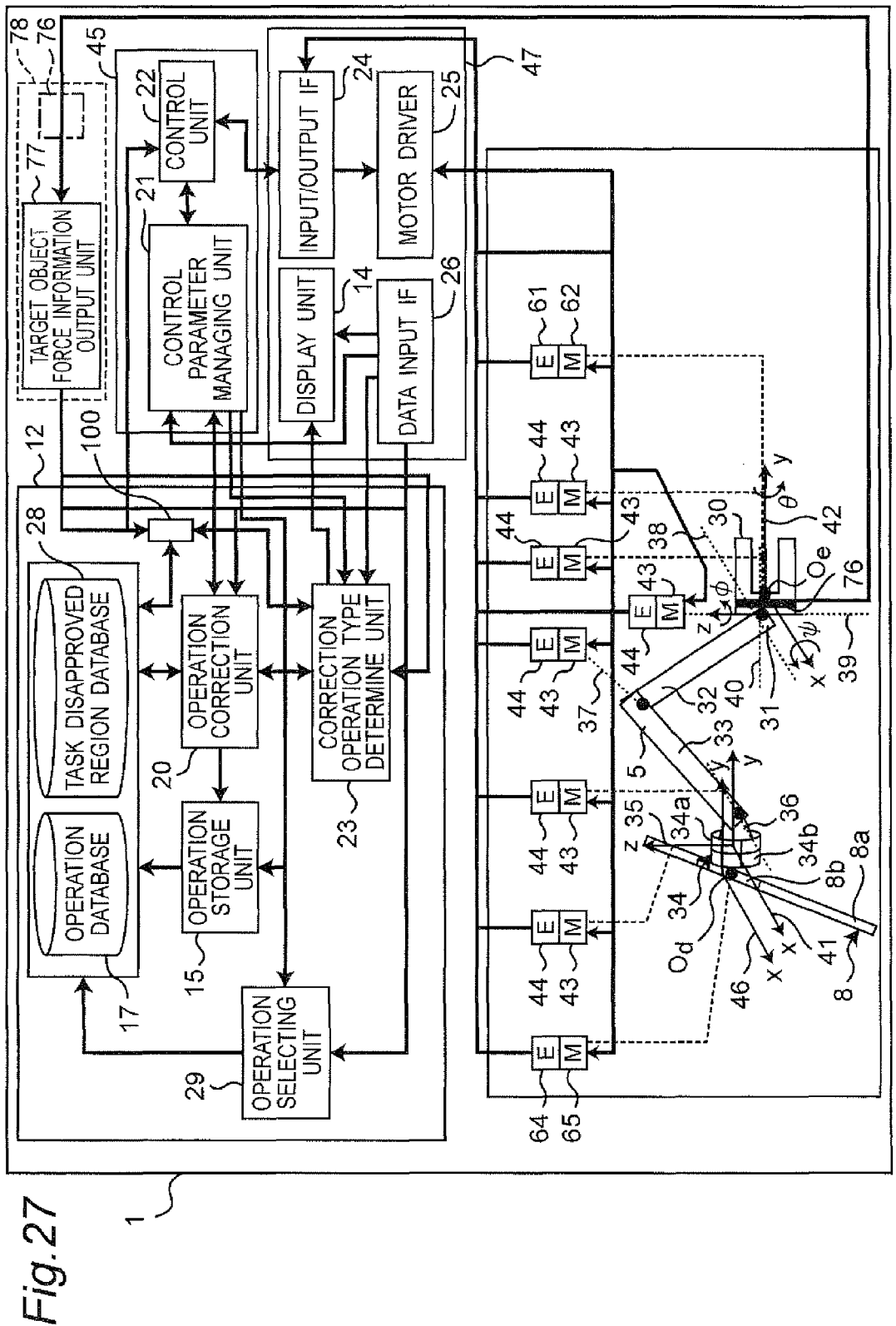
FIG. 27 is a view showing a detailed structure of a control apparatus structuring an assembly robot and a robot arm being a control target, in the robot arm control apparatus according to a second embodiment of the present invention.

The structure of the assembly robot 1 is shown in FIG. 27.

The robot arm 5 other than the control apparatus body unit 45, the peripheral apparatus 47, the task load region database 28, the operation storage unit 15, the operation selecting unit 29, and a target object force detecting unit 78 functioning as one example of target object force detecting means (as shown in FIG. 27, it is structured with a target object force detecting mechanism 76 and a target object force information output unit 77. However, for ease of understanding, the target object force detecting mechanism 76 is shown to be located near the target object force information output unit 77 by a phantom line, although it is different from its actual disposition position corresponding to the position of the hand 30.) is the same as that according to the first embodiment and, therefore, the description thereof is not repeated.

Figure 28A:
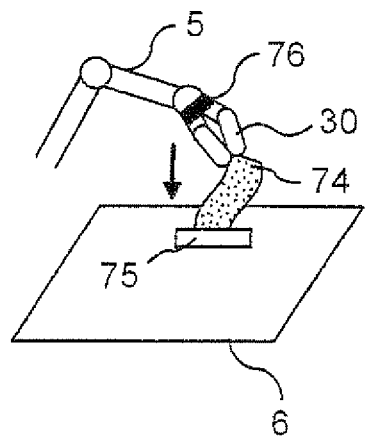
FIG. 28A is a view showing a manipulating state of the robot arm in the robot arm control apparatus according to the embodiment of the present invention.
Figure 28B:
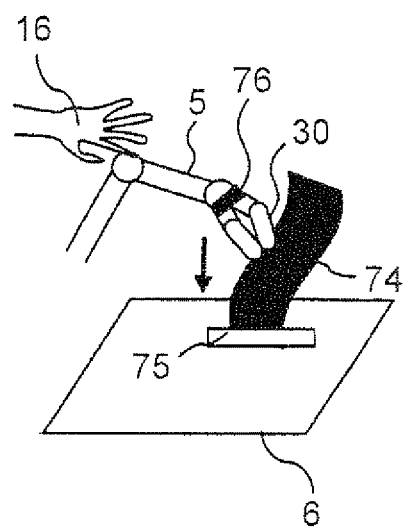
FIG. 28B is a view showing a manipulating state of the robot arm in the robot arm control apparatus according to the embodiment of the present invention.
Figure 28C:
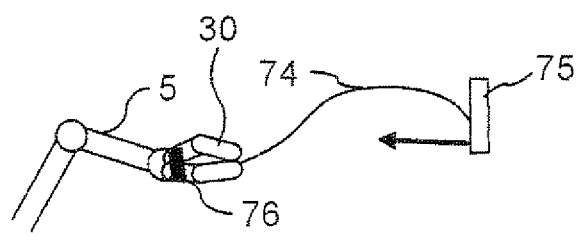
FIG. 28C is a view showing a manipulating state of the robot arm in the robot arm control apparatus according to the embodiment of the present invention.

The target object force detecting mechanism 76 is structured with, for example, a mechanism of six-axis force sensor, and is disposed near the hand 30 of the robot arm 5. The target object force detecting mechanism 76 is a mechanism that detects a force applied to the flexible circuit board 74 as shown in FIG. 28C when the robot arm 5 inserts the flexible circuit board 74 into the insert slot 75 as shown in FIG. 28A, and when a person teaches the robot arm 5 to insert the flexible circuit board 74 into the insert slot 75 by manipulating the robot arm 5 by gripping the robot arm 5 with the person's hand 16 as shown in FIG. 28S. The target object force information output unit 77 outputs six-axis force values detected by the target object force detecting mechanism 76 to each of the operation correction unit 20, the correction operation type determining unit 23, and the information acquiring unit 100. The information acquiring unit 100 is capable of acquiring information as to the operation of the robot arm 5 including the position of the robot arm 5 in the assembly task, information as to a person's force acting on the robot arm 5 detected by the force detecting unit 53, and information as to a force applied to the flexible circuit board 74 detected by the target object force detecting unit 78 (which is detected by the target object force detecting mechanism 76 and output from the target object force information output unit 77). The information acquired by the information acquiring unit 100 is input to the correction operation type determining unit 23. Based on the information as to the operation and the information as to the person's force each acquired by the information acquiring unit 100, the correction operation type determining unit 23 can determine the correction operation type for correcting the operation of the robot arm 5.

In the first embodiment, the force detecting unit 53 detects both the force applied by the person, and the force acting on the flexible circuit board 74, which is one example of a target object. On the other hand, in the second embodiment, the force acting on the flexible circuit board 74 being one example of a target object is detected by the target object force detecting mechanism 76, and the force applied by the person is detected by the force detecting unit 53.

FIG. 29 shows one example of the operation database 17. All the items are identical to those in the first embodiment.

Figure 31:
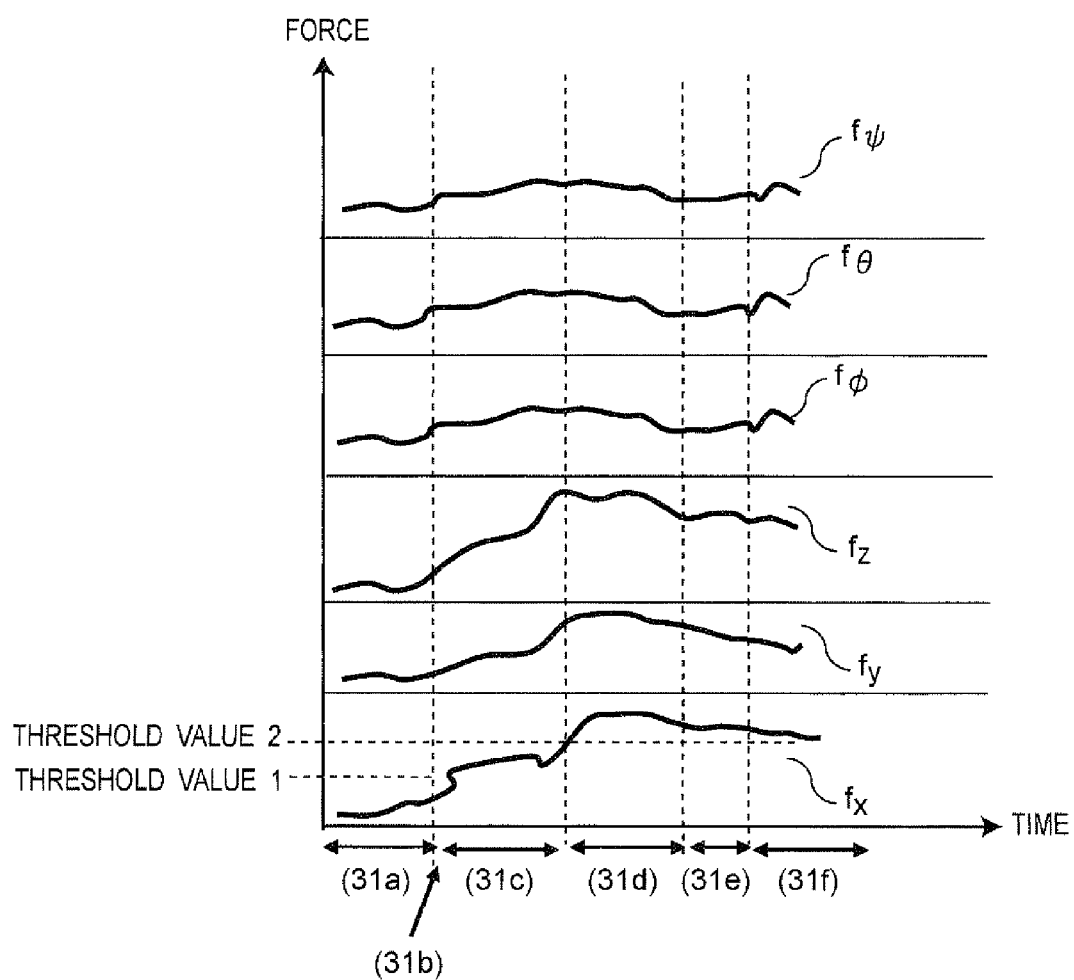
FIG. 31 is a graph showing the relationship between a force applied to a target object and the corresponding time in the robot arm control apparatus according to the embodiment of the present invention.

The task of the task ID "4" will be detailed. FIG. 31 is a graph indicating the force applied to the flexible circuit board 74 in time sequence.

The task ID "4" represents an inserting task performed by the robot arm 5 to insert the flexible circuit board 74 into the insert slot 75. Specifically, it is shown in FIGS. 30A to 30F (FIGS. 30G to 30N are each an enlarged view around the insert slot 75).

Figure 30A:
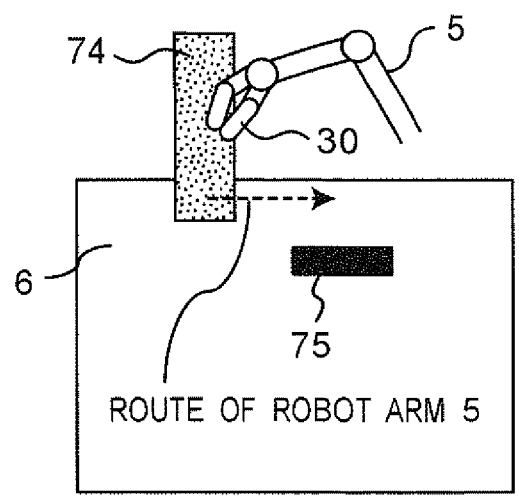
FIG. 30A is a view showing an operating state of the robot arm in the robot arm control apparatus according to the embodiment of the present invention.

First, operation IDs "1" to "7" of the task ID "4" each represent an operation in which, as shown in FIG. 30A, the robot arm 5 gripping the flexible circuit board 74 with the hand 30 is shifting toward the insert slot 75 (the value of the force applied to the flexible circuit board 74 detected by the target object force detecting mechanism 76 is in a state of "31*a*" in FIG. 31).

Figure 30B:
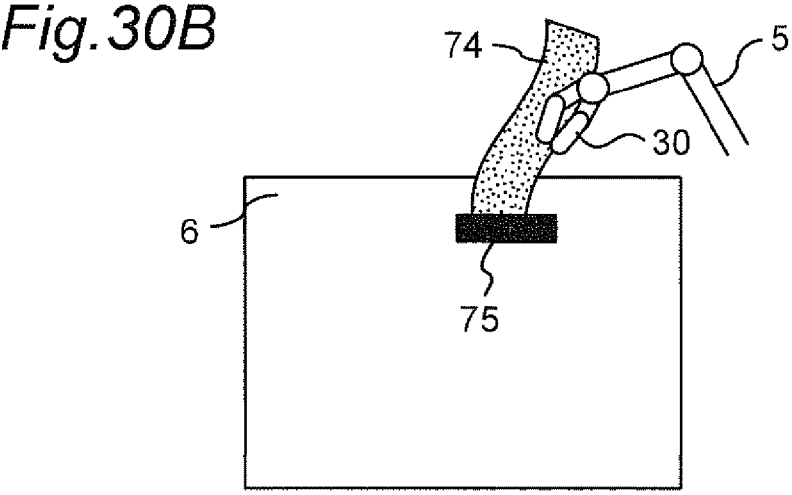
FIG. 30B is a view showing an operating state of the robot arm in the robot arm control apparatus according to the embodiment of the present invention.
Figure 30C:
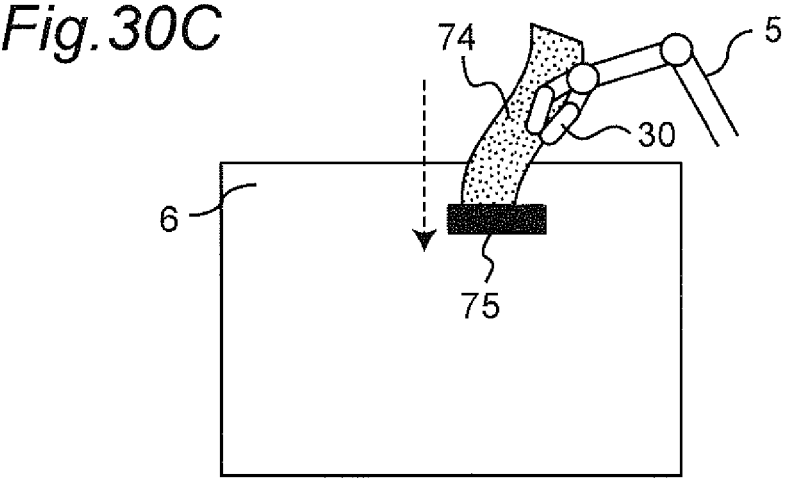
FIG. 30C is a view showing an operating state of the robot arm in the robot arm control apparatus according to the embodiment of the present invention.
Figure 30D:
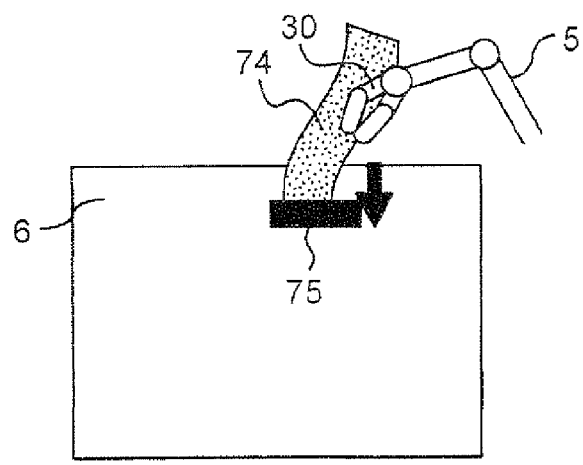
FIG. 30D is a view showing an operating state of the robot arm in the robot arm control apparatus according to the embodiment of the present invention.
Figure 30E:
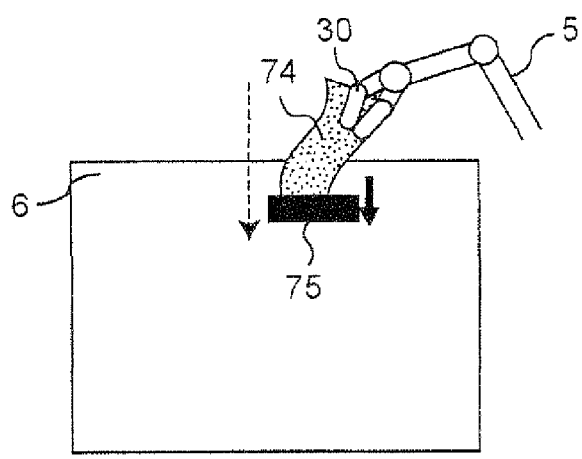
FIG. 30E is a view showing an operating state of the robot arm in the robot arm control apparatus according to the embodiment of the present invention.
Figure 30F:
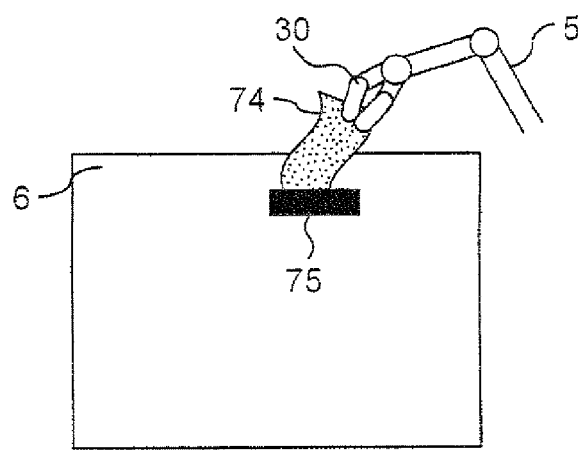
FIG. 30F is a view showing an operating state of the robot arm in the robot arm control apparatus according to the embodiment of the present invention.
Figure 30G:
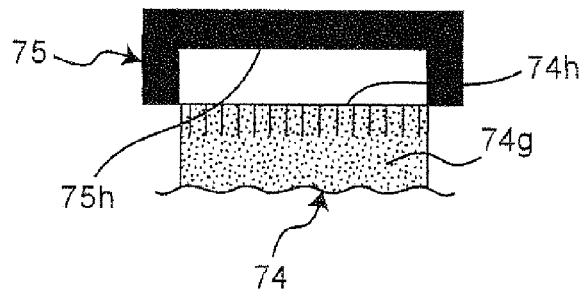
FIG. 30G is a view showing an operating state of the robot arm in the robot arm control apparatus according to the embodiment of the present invention (an enlarged view of an inserted portion of an insert slot shown in FIG. 30B)

Next, an operation ID "8" of the task ID "4" represents an operation at a time point, as shown in FIGS. 30B and 30G (FIG. 30G is an enlarged view of the inserted portion of the insert slot 75), where a connector portion 74*g* of the flexible circuit board 74 is brought into contact with the insert slot 75 (the value of the force applied to the flexible circuit board 74 detected by the target object force detecting mechanism 76 is in a state of "31*b*" in FIG. 31).

Figure 30H:
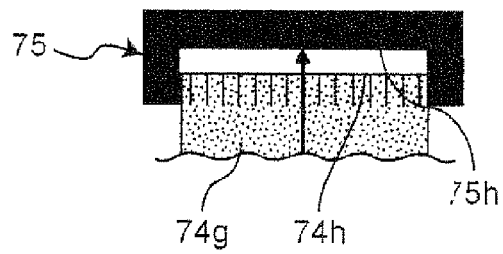
FIG. 30H is a view showing an operating state of the robot arm in the robot arm control apparatus according to the embodiment of the present invention (an enlarged view of an inserted portion of an insert slot shown in FIG. 30C)

Next, an operation ID "9" of the task ID "4" represents an operation in which, as shown in FIGS. 30C and 30H (FIG. 30H is an enlarged view of the inserted portion of the insert slot 75), the robot arm 5 is shifting toward a tip portion 75*h* of the insert slot 75 until a tip portion 74*h* of the connector portion 74*g* of the flexible circuit board 74 is brought into contact therewith. It is to be noted that, it represents a state where the connector portion 74*g* of the flexible circuit board 74 is not stuck into the insert slot 75 (in a state where the tip portion of the connector portion 74*g* of the flexible circuit board 74 is not entering the insert slot 75 even in a slightest amount) (the value of the force applied to the flexible circuit board 74 detected by the target object force detecting mechanism 76 is in a state of "31*c*" in FIG. 31).

Figure 30I:
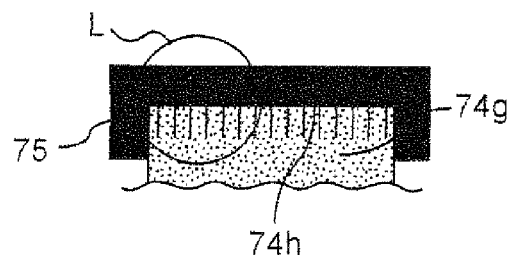
FIG. 30I is a view showing an operating state of the robot arm in the robot arm control apparatus according to the embodiment of the present invention (an enlarged view of an inserted portion of an insert slot shown in FIG. 30D)
Figure 30J:
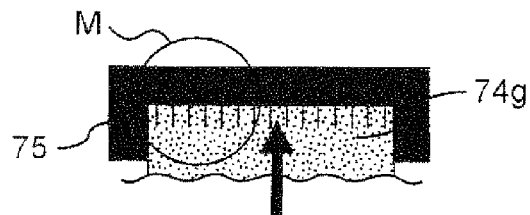
FIG. 30J is a view showing an operating state of the robot arm in the robot arm control apparatus according to the embodiment of the present invention (an enlarged view of an inserted portion of an insert slot shown in FIG. 30E)
Figure 30K:
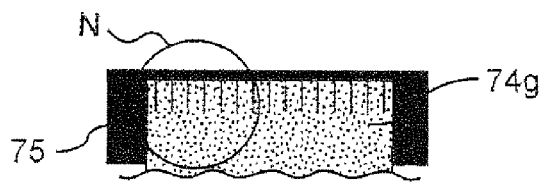
FIG. 30K is a view showing an operating state of the robot arm in the robot arm control apparatus according to the embodiment of the present invention (an enlarged view of an inserted portion of an insert slot shown in FIG. 30F)
Figure 30L:
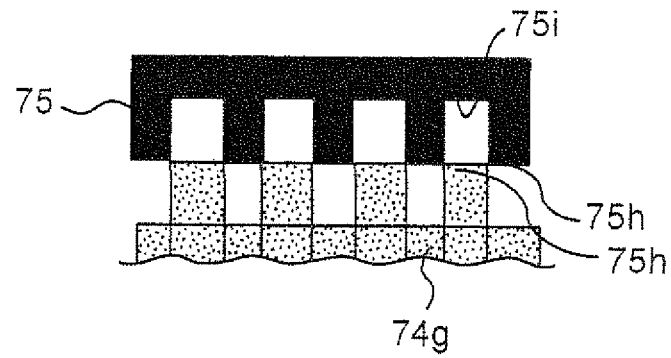
FIG. 30L is a view showing an operating state of the robot arm in the robot arm control apparatus according to the embodiment of the present invention, and is an enlarged view around an insert slot (an enlarged view of a circle L shown in FIG. 30I)

Next, an operation ID "10" of the task ID "4" represents an operation in which, as shown by the operation in FIGS. 30D, 30I, and 30L (FIGS. 30I and 30L are each an enlarged view of the inserted portion of the insert slot 75), the tip portion 75*h* of the insert slot 75 and the tip portion 74*h* of the flexible circuit board 74 are brought into contact with each other (the value of the force applied to the flexible circuit board 74 detected by the target object force detecting mechanism 76 is in a state of "31*d*" in FIG. 31).

Figure 30M:
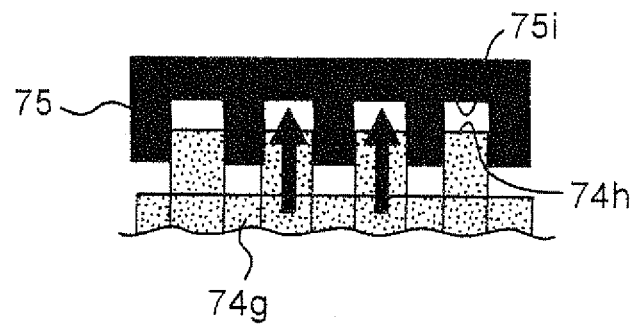
FIG. 30M is a view showing an operating state of the robot arm in the robot arm control apparatus according to the embodiment of the present invention, and is an enlarged view around an insert slot (an enlarged view of a circle M shown in FIG. 30J)

Next, operation IDs "11" and "12" of the task ID "4" each represent an operation in which, as shown in FIGS. 30E, 30J, and 30M (FIGS. 30J and 30M are each an enlarged view of the inserted portion of the insert slot 75), the tip portion 74*h* of the flexible circuit board 74 is stuck into a recess 75*i* of the insert slot 75, and the tip portion 74*h* is in the course of being further inserted into the recess 75*i* (the value of the force applied to the flexible circuit board 74 detected by the target object force detecting mechanism 76 is in a state of "31*e*" in FIG. 31).

Figure 30N:
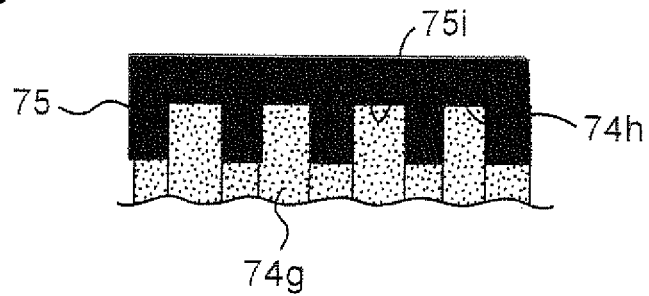
FIG. 30N is a view showing an operating state of the robot arm in the robot arm control apparatus according to the embodiment of the present invention, and is an enlarged view around an insert slot (an enlarged view of a circle N shown in FIG. 30K)

Next, operation IDs "13" and "14" of the task ID "4" each represent a state in which, as shown in FIGS. 37F, 30K, and 30N (FIGS. 30K and 30N are each an enlarged view of the inserted portion of the insert slot 75), insertion of the flexible circuit board 74 into the insert slot 75 has been completed (a state where the tip portion 74*h* has completely been inserted into the recess 75*i*) (the value of the force applied to the flexible circuit board 74 detected by the target object force detecting mechanism 76 is in a state of "31*f*" in FIG. 31).

Similarly to the first embodiment, the correction operation type determining unit 23 determines the correction type that can be exerted, so as to allow the operation correction unit 20 to correct an operation, based on a force applied by the person's hand 16 to the robot arm 5. There are four correction types as follows.

Figure 33A:
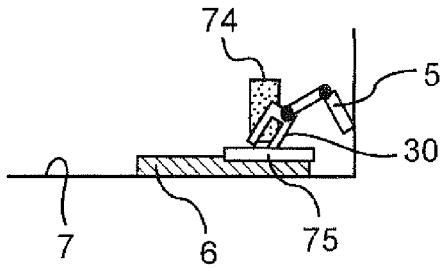
FIG. 33A is a view showing a manipulating state of the robot arm in the robot arm control apparatus according to the embodiment of the present invention.
Figure 33B:
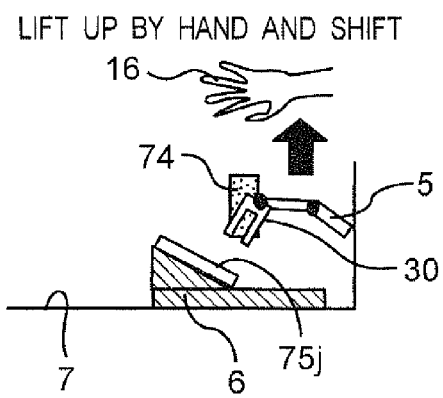
FIG. 33B is a view showing a manipulating state of the robot arm in the robot arm control apparatus according to the embodiment of the present invention.
Figure 33C:
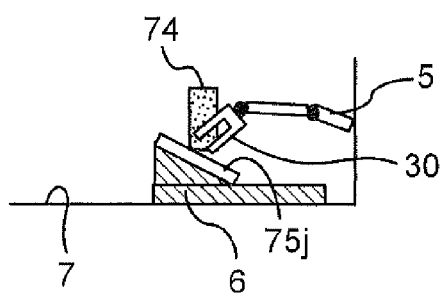
FIG. 33C is a view showing a manipulating state of the robot arm in the robot arm control apparatus according to the embodiment of the present invention.

The first correction type is "position and orientation correction". Specifically, when the position or orientation of the insert slot 75 shown in FIG. 33A is changed as an insert slot 75*j* shown in FIG. 38B due to model change of the device 6, the flexible circuit board 74 is caught by the insert slot 75*j* and cannot be inserted, as shown in FIG. 333. In such a case, as shown in FIG. 33B, while the robot arm 5 is performing an inserting task of the flexible circuit board 74 into the insert slot 75*j*, when a force is applied by the person's hand 16 so as to change the position or orientation of the robot arm 5, the operation correction unit 20 can change the position and orientation of the robot arm 5 as shown in FIG. 33C, and can change the traveling direction of the robot arm 5 so as to agree with the insert slot 75*j*. This can be achieved by changing the orientation (x, y, z, $\phi$, $\theta$, $\psi$) of the hand of the robot arm 5.

The second correction type is the "speed" of the hand of the robot arm 5. Similarly to the first embodiment, while the robot arm 5 gripping the flexible circuit board 74 is shifting toward the insert slot 75 of the device 6 as shown in FIG. 22A, when a force is applied in the direction opposite to the traveling direction of the robot arm 5 to the robot arm 5 with the person's hand 16 as shown in FIG. 22C, the operation correction unit 20 can decelerate the speed of the robot arm 5 when the robot arm 5 shifts, as shown in FIG. 22C. Conversely, when a force is applied to the robot arm 5 in the traveling direction of the robot arm 5 with the person's hand 16 while the robot arm 5 is shifting, the operation correction unit 20 can accelerate the speed of the robot arm 5 when the robot arm 5 shifts.

The third correction type is "force applied extent" when the flexible circuit board 74 is inserted. This is valid when the force bit is "1" in the flag (the flag indicative of validity) of the operation presently in operation (the progress information in the operation database 17 is "1"). Similarly to the first embodiment, while the robot arm 5 is performing an inserting task of the flexible circuit board 74 into the insert slot 75*b* as shown in FIG. 18B, when a force is applied downward from above to the robot arm 5 with the person's hand 16 as shown in FIG. 18C, the operation correction unit 20 can correct the extent of applied force to be greater, as shown in FIG. 18D; conversely, when a force is applied upward from below to the robot arm 5 with the person's hand 16, the operation correction unit 20 can correct the extent of applied force to be smaller.

The fourth correction type is "task undesired region". Similarly to the first embodiment, when the robot arm 5 (e.g., the hand 30) is gripped by the hand 16 of the person 16A as shown in FIG. 23, and the robot arm 5 (e.g., hand 30) is shifted with a force being applied to the robot arm 5 along the contour of a task undesired region RB, the operation correction unit 20 can set the task undesired region RB as shown in FIG. 23.

The correction operation type determining unit 23 determines one correction type out of the four correction types. Specifically, one correction type is selected out of the four correction types via the data input IF 26 such as a button, or the correction operation type determining unit 23 estimates the type, based on the relationship information between the force applied to the robot arm 5 by the person's hand 16 detected by the force detecting unit 53 and acquired by the information acquiring unit 100 and the correction type (e.g., the relationship information among the direction of the force being applied, the magnitude of the force being applied, and the correction type), and the force applied to a target object such as the flexible circuit board 74 detected by the target object force detecting mechanism 76 and acquired by the information acquiring unit 100 via the target object force information output unit 77.

In the following, with reference to the flowchart of FIG. 32, a detailed description will be given of a specific correction type estimation process of the correction type estimation method.

In a state where the power button 26*a* of the assembly robot 1 turned "ON", in a case where no force is applied to the robot arm 5 by being gripped by the person's hand 16, the robot arm 5 does not move. When a force is applied to the robot arm 5 by the person's hand 16, the robot arm 5 can be shifted in any desired direction in the impedance control mode (the mode in which the robot arm 5 is shifted in the direction in which the force of the person's hand 16 is detected under the impedance control). In this case, the force detecting unit 53 of the control unit 22 detects the force acting on the robot arm 5, and the information as to the force detected by the force detecting unit 53 is input to the correction operation type determining unit 23 via the information acquiring unit 100 (step S1).

Subsequently, in step S2, the correction operation type determining unit 23 determines whether or not all the components (the six components of $f_x$, $f_y$, $f_z$, $f_\phi$, $f_\theta$, $f_\psi$) of the force detected by the force detecting unit 53 and acquired by the information acquiring unit 100 are equal to or less than certain threshold values. Specific threshold values are previously stored as in FIG. 17 based on the rigidity of the flexible circuit board 74: when the ID of the flexible circuit board 74 (the flexible circuit board ID) is "1", the threshold values are ($f_{dx1}$, $f_{dy1}$, $f_{dz1}$, $f_{d\phi1}$, $f_{d\theta1}$, $f_{d\psi1}$) of the ID "1" in FIG. 17. When the correction operation type determining unit 23 determines that all the components (the six components of $f_x$, $f_y$, $f_z$, $f_\phi$, $f_\theta$, $f_\psi$) of the force detected by the force detecting unit 53 and acquired by the information acquiring unit 100 are equal to or less than the threshold values, the robot arm 5 does not move, and no correction is made (step S3), and the correction type estimation process of the corrected operation type estimation method ends. The control mode in this case is the impedance control mode.

In step S2, when the correction operation type determining unit 23 determines that any component of the force detected by the force detecting unit 53 and acquired by the information acquiring unit 100 (any component out of the six components of $f_x$, $f_y$, $f_z$, $f_\phi$, $f_\theta$, $f_\psi$) exceeds the certain threshold values (specifically, in a case where the flexible circuit board ID is "1", ($f_{dx1}$, $f_{dy1}$, $f_{dz1}$, $f_{d\phi1}$, $f_{d\theta1}$, $f_{d\psi1}$) of the ID "1" in FIG. 17), the process proceeds to step S4.

In step S4, the correction operation type determining unit 23 further determines whether the assembly robot 1 at present is in operation in terms of the operation database 17, based on the information acquired via the information acquiring unit 100. Specifically, when the correction operation type determining unit 23 determines that no task is selected by the operation selecting unit 29, and that the progress information is "0" for every task ID in the operation database 17 (a state where no task is started), the correction operation type determining unit 23 determines that it is not in operation in terms of the operation database 17, and the process proceeds to step S6. When the correction operation type determining unit 23 determines that the operation selecting unit 29 has selected and started the assembly task, and that the progress information is "1", the correction operation type determining unit 23 determines that it is in operation in terms of the operation database 17, and the process proceeds to step S5.

In step S5, the target object force detecting unit 76 detects a force applied to the flexible circuit board 74 as one example of a target object, and information as to the force applied to the target object detected by the target object force detecting unit 76 is input to the correction operation type determining unit 23 via the information acquiring unit 100.

In step S9, the correction operation type determining unit 23 determines whether or not the force (ft$_x$, ft$_y$, ft$_z$, ft$_\phi$, ft$_\theta$, ft$_\psi$) applied to the flexible circuit board 74 and detected by the target object force detecting unit 76 is continuously equal to or more than a certain "threshold value 1" (specifically, when the flexible circuit board ID is "1", (ft$_{dox1}$, ft$_{doy1}$, ft$_{doz1}$, ft$_{do\phi1}$, ft$_{do\theta1}$, ft$_{do\psi1}$) of the ID "3" in FIG. 17, and "threshold value 1" in FIG. 31) for a certain time period (e.g., 1 sec). When the correction operation type determining unit 23 determines that the force (ft$_x$, ft$_y$, ft$_z$, ft$_\phi$, ft$_\theta$, ft$_\psi$) applied to the target object detected by the target object force detecting unit 76 is less than the certain "threshold value 1" (i.e., in a case where it corresponds to (31a) being the case it is less than "threshold value 1" in FIG. 31), the process proceeds to step S11 (however, it must be equal to or more than the force determined in step S2). In step S9, when the force (ft$_x$, ft$_y$, ft$_z$, ft$_\phi$, ft$_\theta$, ft$_\psi$) applied to the target object detected by the target object force detecting unit 76 is equal to or more than the certain "threshold value 1" (i.e., in a case where it corresponds to (31c) in FIG. 31), the process proceeds to step S10. The reason for determining whether the force is continuously equal to or more than a certain threshold value ("threshold value 1") for a certain time period (e.g., 1 sec) in step S9 is to determine whether or not the force is intendedly applied by the person. The detection of a force being equal to or more than the threshold value for just a moment is considered a noise. It is considered that, when a force is applied by the person intendedly, the force cannot last just for a moment, but it should last for approximately one second or more. Thus, whether or not a force is applied by the person intendedly is determined.

In step S11, when the correction operation type determining unit 23 determines that the shift amount of the robot arm 5 calculated by the correction operation type determining unit 23 is equal to or more than a certain threshold value (specifically, when the flexible circuit board ID is "1", g$_{x1}$, g$_{y1}$, g$_{z1}$, g$_{\phi1}$, g$_{\theta1}$, g$_{\psi1}$ of ID "2" in FIG. 17), the correction operation type determining unit 23 determines the type "position and orientation correction" as the correction type, and the correction type estimation process ends (step S14). It is to be noted that, when the correction operation type determining unit 23 calculates the shift amount of the robot arm 5, it can specifically be obtained as follows: the control unit 22 inputs, via the control parameter managing unit 21 or the information acquiring unit 100, the hand position of the robot arm 5 before manipulation by the person and the hand position during manipulation to the correction operation type determining unit 23, so that the correction operation type determining unit 23 can subtract the hand position before manipulation from the hand position during manipulation, to obtain the result as the shift amount.

On the other hand, in step S11, when the correction operation type determining unit 23 determines that the shift amount of the robot arm 5 is less than the certain threshold value, the type "speed" is determined as the correction type, and the correction type estimation process ends (step S15).

In step S10, the target object force detecting unit 76 detects the force applied to the flexible circuit board 74, and the correction operation type determining unit 23 determines whether or not the force (ft$_x$, ft$_y$, ft$_z$, ft$_\phi$, ft$_\theta$, ft$_\psi$) applied to the target object, having been detected by the target object force detecting unit 76 and acquired by the information acquiring unit 100 via the target object force information output unit 77 is continuously equal to more than a certain "threshold value 2" (specifically, when the flexible circuit board ID is "1", (ft$_{dox21}$, ft$_{doy21}$, ft$_{doz21}$, ft$_{do\phi21}$, ft$_{do\theta21}$, ft$_{do\psi21}$) of the ID "4" in FIG. 17, and "threshold value 2" in FIG. 31) for a certain time period (e.g., 1 sec). When the correction operation type determining unit 23 determines that the force (ft$_x$, ft$_y$, ft$_z$, ft$_\phi$, ft$_\theta$, ft$_\psi$) applied to the target object detected by the target object force detecting unit 76 is less than the certain "threshold value 2" (i.e., in a case where it corresponds to (31c) of the case being less than the threshold value 2 in FIG. 31), the process proceeds to step S16. When the correction operation type determining unit 23 determines that the force (ft$_x$, ft$_y$, ft$_z$, ft$_\phi$, ft$_\theta$, ft$_\psi$) applied to the target object detected by the target object force detecting unit 76 is equal to or more than the certain "threshold value 2" (i.e., in a case where it corresponds to (31d) in FIG. 31), the type "force correction" is determined as the correction type, and the correction type estimation process ends (step S12). The reason for determining whether the force is continuously equal to or more than a certain threshold value ("threshold value 2") for a certain time period (e.g., 1 sec) in step S10 is to determine whether or not the force is intendedly applied by the person. The detection of a force being equal to or more than the threshold value for just a moment is considered a noise. It is considered that, when a force is applied by the person intendedly, the force cannot last just for a moment, but it should last for approximately one second or more. Thus, whether or not a force is applied by the person intendedly is determined.

In step S16, when the correction operation type determining unit 23 determines that the shift amount of the position of the hand of the robot arm 5 calculated by the correction operation type determining unit 23 is equal to or more than a certain threshold value (specifically, when the flexible circuit board ID is "1", g$_{x1}$, g$_{y1}$, g$_{z1}$, g$_{\phi1}$, g$_{\theta1}$, g$_{\psi1}$ of ID "2" in FIG. 17), the correction operation type determining unit 23 determines the type "position and orientation correction" as the correction type, and the correction type estimation process ends (step S18).

In step S16, when the correction operation type determining unit 23 determines that the shift amount of the robot arm 5 is less than the certain threshold value, the type "force correction" is determined as the correction type, and the correction type estimation process ends (step S17).

On the other hand, in step S4, when the correction operation type determining unit 23 determines that it is not in operation in terms of the operation database 17, the process proceeds to step S6. In step 36, the correction operation type determining unit 23 determines whether or not a shift amount of the robot arm 5 for a certain time period is equal to or more than a certain threshold value.

In step S6, when the correction operation type determining unit 23 determines that the shift amount of the robot arm 5 for a certain time period is equal to or more than the certain threshold value, the type "task undesired region" is determined as the correction type (step S8), and the correction type estimation process ends.

In step S6, when the correction operation type determining unit 23 determines that the shift amount of the robot arm 5 for a certain time period is less than the certain threshold value, "no correction" is determined as the correction type, and the correction type estimation process ends (step S7).

According to the procedure described in the foregoing, the correction operation type determining unit 23 can switch the correction type without the necessity of using the data input IF 26 such as a button.

Similarly to the first embodiment, the operation correction unit 20 is a function of correcting the operation information in the operation database 17 by applying a force to the robot arm 5 with the person's hand 16, while in operation based on the position and orientation and time in the operation database 17.

In the following, a description will be given of the function of the operation correction unit 20.

When the data input IF 26 (e.g., the power button 26a of the console 26A) disposed at the workbench 7 of the assembly robot 1 is powered on by the person's hand 16, the operation correction unit 20 issues a command to the control parameter managing unit 21 to operate in the impedance control mode.

Next, a desired assembly task is selected from the task list in the operation database 17 by the operation selecting unit 29 through use of the person's hand 16, and start of an assembly operation is instructed. The operation correction unit 20 sets the control mode of the rail movable portion 8b and the robot arm 5, based on the operation information (specifically, the position of the rail movable portion 8b and the position and orientation and time period of the robot arm 5) identified by the selected task ID from the operation database 17. In the present example, because the task ID "4" shown in FIG. 29 is selected, the operation correction unit 20 sets the hybrid impedance control mode (the mode in which, while in operation in the position control mode, the robot arm 5 actuates in accordance with a force applied from the person or the like to the robot arm 5) to each of the position and orientation of the robot arm 5 having the flag whose bit represents "1", of the flag (the flag indicative of validity) corresponding to the operation ID "1" in the operation database 17, and issues a command to the control parameter managing unit 21. When the operation correction unit 20 issues the command to the control parameter managing unit 21, as shown in FIG. 30A, the robot arm 5 gripping the flexible circuit board 75 with the hand 30 shifts toward the insert slot 75. Commands are successively issued to the control parameter managing unit 21 based on the operation information pieces following the operation ID "1". The operation IDs "9" to "12" each cause a command to be issued to the control parameter managing unit 21, commanding to operate in the force hybrid impedance control mode.

In a case of the force hybrid impedance control mode, the operation correction unit 20 sets the hybrid impedance control mode (the mode in which, while in operation in the position control mode, the robot arm 5 actuates in accordance with a force applied from the person or the like to the robot arm 5) to each of the position and orientation of the robot arm 5 having the flag whose bit represents "1", and sets the force control mode to any component having the force flag whose bit represents "1" (the flag indicative of validity), of the flag (the flag indicative of validity) corresponding to the operation ID in the operation database 17. The operation correction unit 20 sets the impedance control mode to those components to which none of the hybrid impedance control mode and the force control mode is set out of the six components of position and orientation.

For example, the operation ID "9" of the task ID "4" in FIG. 29 represents an operation in which, as shown in FIGS. 33A, 30C, and 30H (FIG. 30H is an enlarged view of the inserted portion), the tip portion 74h of the flexible circuit board 74 is shifting toward the tip portion 75h of the insert slot 75 until being brought into contact therewith. The flag corresponding to the operation ID is "9" is "1" for only the 0th, 1st, 3rd, 4th, 5th, and 8th bits. Therefore, the operation correction unit 20 sets the hybrid impedance control mode to the x-axis, y-axis and orientation components, and sets the force control mode to the z-axis component.

Next, with the operation IDs "10" to "12" of the task ID "4", the operation is performed in the similar operation modes as with the operation ID "9".

Next, with the operation IDs "13" and "14" of the task ID "4", the operation is performed in the similar operation modes as with the operation ID "1".

Next, a description will be given of an exemplary case in which, in accordance with a specification change in the flexible circuit board 74 or the insert slot 75 due to model change or the like, the person checks the situation or the like and desires to shift the position of the robot arm 5 or the orientation of the robot arm 5, to have it perform a task, as shown in FIG. 33B.

As shown in FIG. 33A, while an operation corresponding to the operation IDs "1" to "8" of the task ID "4" is being performed, the robot arm 5 is directly gripped by the person's hand 16, and a force is applied to the robot arm 5 so as to shift relative to the task plane (e.g., the insert plane of the insert slot 75 of the device 6).

Figure 32:
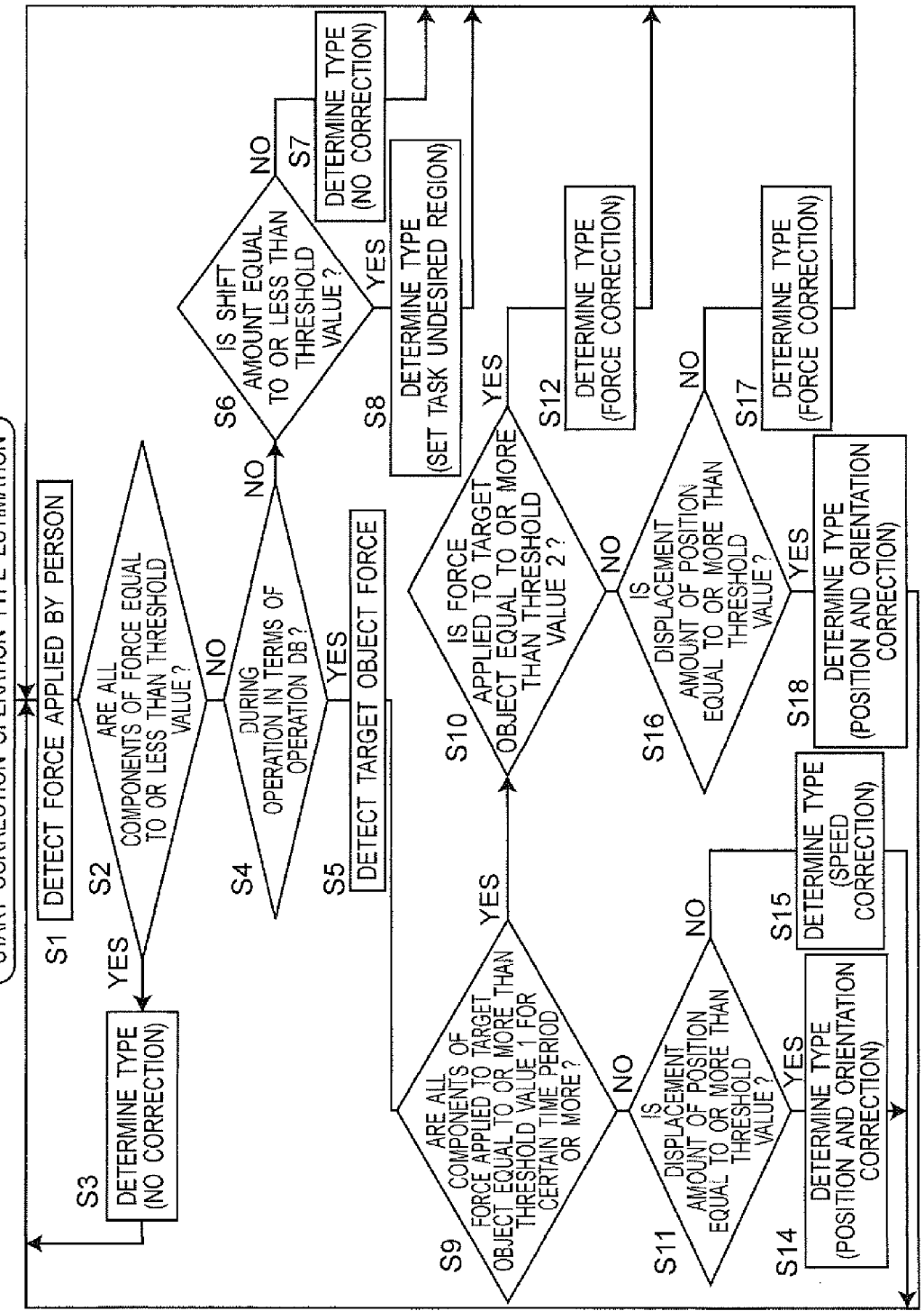
FIG. 32 is a flowchart representing operation steps of a correction operation type determining unit in the robot arm control apparatus according to the embodiment of the present invention.

The correction operation type determining unit 23 estimates and determines the correction type according to the correction type estimation process shown in the flowchart of FIG. 32, based on the force applied to the robot arm 5 by the person's hand 16 and the information stored in the operation database 17 acquired by the information acquiring unit 100. Here, the force is applied to the robot arm 5 by the person's hand 16, in a state not being brought into contact with the flexible circuit board 74 (in a state where the force detected by the target object force detecting unit 76 is equal to or less than the threshold value), to shift the robot arm 5 by an amount equal to or more than the certain threshold value. Therefore, in step S14, the correction operation type determining unit 23 determines the type "position and orientation correction" as the correction type.

In a case where the task is the one whose task ID is "4" and the operation ID is "1" in FIG. 29, while the robot arm 5 is being shifted in the position control mode, all the components of the position orientation are controlled in the hybrid impedance control mode, so that the force detecting unit 53 detects the force applied to the robot arm 5 by the person's hand 16 in the impedance control mode, whereby the robot arm 5 is shifted in the direction in which the force has been applied to the robot arm 5 by the person's hand 16, which has been acquired by the information acquiring unit 100. Thus, the position and orientation can be corrected as shown in FIG. 33C.

As described above, in a case where the robot arm 5 is gripped by the person's hand 16 and applied with a force such that the robot arm 5 shifts by ($\Delta x$, $\Delta y$, $\Delta z$, $\Delta\phi$, $\Delta\theta$, $\Delta\psi$), the values ($\Delta x$, $\Delta y$, $\Delta z$, $\Delta\phi$, $\Delta\theta$, $\Delta\psi$) are transmitted to the operation correction unit 20 via the control unit 22 and the control parameter managing unit 21.

The operation correction unit 20 obtains corrected operation information by subtracting ($\Delta x$, $\Delta y$, $\Delta z$, $\Delta\phi$, $\Delta\theta$, $\Delta\psi$) from all the position and orientation components of the operation information of the selected task ID, and transmits the result to the control parameter managing unit 21. The control parameter managing unit 21 instructs the control unit 22 to cause the robot arm 5 to operate at the coordinates corrected by ($\Delta x$, $\Delta y$, $\Delta z$, $\Delta\phi$, $\Delta\theta$, $\Delta\psi$). Thus, the corrected operation as shown in FIG. 33B can be achieved. Next, the operation storage unit 15 stores the operation information subtracted by ($\Delta x$, $\Delta y$, $\Delta z$, $\Delta\phi$, $\Delta\theta$, $\Delta\psi$) in the operation database 17.

According to the procedure described in the foregoing, in a state where the robot arm 5 is in operation in the hybrid impedance control mode or the force hybrid impedance control mode, a force by applied to the robot arm 5 by the person's hand 16 allows the operation correction unit 20 to correct the generated position for each direction, with reference to the position and orientation and time in the operation database 17.

Figure 34A:
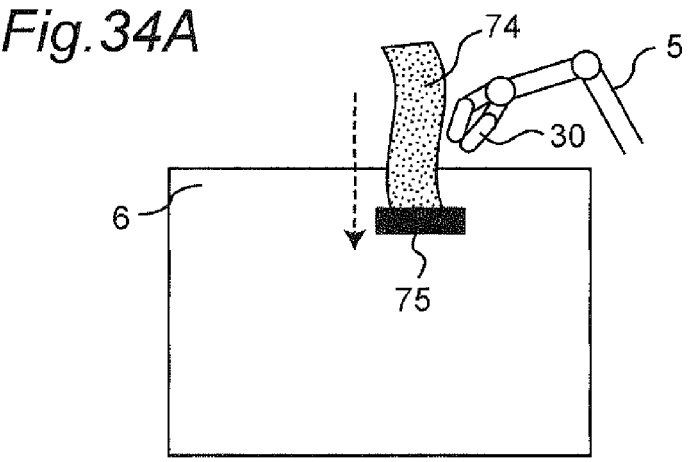
FIG. 34A is a view showing a manipulating state of the robot arm in the robot arm control apparatus according to the embodiment of the present invention.
Figure 34B:
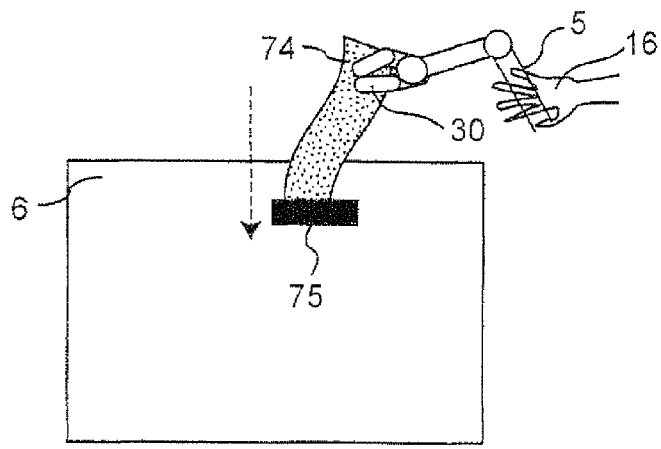
FIG. 34B is a view showing a manipulating state of the robot arm in the robot arm control apparatus according to the embodiment of the present invention.
Figure 34C:
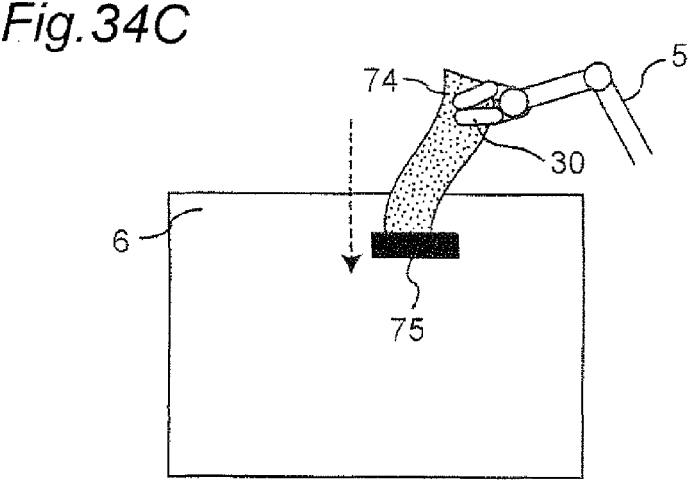
FIG. 34C is a view showing a manipulating state of the robot arm in the robot arm control apparatus according to the embodiment of the present invention.
Figure 34D:
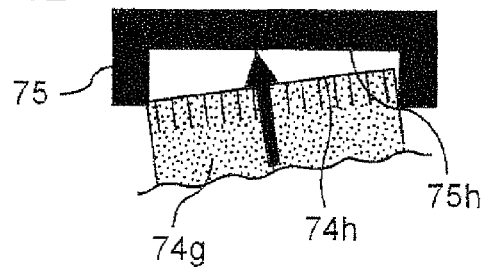
FIG. 34D is a view showing a manipulating state of the robot arm in the robot arm control apparatus according to the embodiment of the present invention (an enlarged view of an inserted portion of an insert slot shown in FIG. 34A)
Figure 34E:
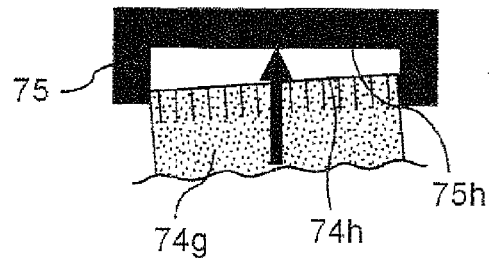
FIG. 34E is a view showing a manipulating state of the robot arm in the robot arm control apparatus according to the embodiment of the present invention (an enlarged view of an inserted portion of an insert slot shown in FIG. 34S)
Figure 34F:
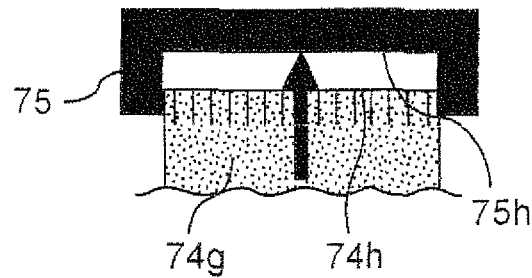
FIG. 34F is a view showing a manipulating state of the robot arm in the robot arm control apparatus according to the embodiment of the present invention (an enlarged view of an inserted portion of an insert slot shown in FIG. 34O)

As shown in FIGS. 34A and 34D (FIG. 34D is an enlarged view of the inserted portion of the insert slot 75 shown in FIG. 34A), in a case where an insertion is performed obliquely while an operation whose the operation ID "9" is being performed, as shown in FIG. 34B, the robot arm 5 is directly gripped by the person's hand 16, and a force is applied to the robot arm 5 so as to shift relative to the task plane (e.g., the insert plane of the insert slot 75 of the device 6).

The correction operation type determining unit 23 estimates and determines the correction type according to the correction type estimation process shown in the flowchart of FIG. 32, based on the force applied to the robot arm 5 by the person's hand 16 and the information stored in the operation database 17 each acquired by the information acquiring unit 100. Here, in a state where a force being equal to or more than the "threshold value 2" is applied to the flexible circuit board 74 (step S10), the robot arm 5 is shifted by an amount equal to or more than the certain threshold value by applying a force to the robot arm 5 with the person's hand 16 (step S16). Therefore, in step S17, the correction operation type determining unit 23 determines the type "position and orientation correction" as the correction type.

In a case where the task is the one whose task ID is "4" and the operation ID is "9" in FIG. 29, while the robot arm 5 is being shifted in the position control mode, the components of the position orientation except for the z-axis component are controlled in the hybrid impedance control mode, so that the force detecting unit 53 detects the force applied to the robot arm 5 by the person's hand 16 in the impedance control mode, whereby the robot arm 5 is shifted in the direction in which the force has been applied to the robot arm 5 by the person's hand 16. Thus, the position and orientation can be corrected as shown in FIG. 34C.

Next, as shown in FIG. 22B, when the speed is to be changed, the robot arm 5 is directly gripped by the person's hand 16; and in a case where it is desired to accelerate, a force is applied to the robot arm 5 by the person's hand 16 in the direction identical to the traveling direction of the robot arm 5; whereas in a case where it is desired to decelerate, a force is applied to the robot arm 5 by the person's hand 16 in the direction opposite to the traveling direction of the robot arm b. Here, the force is applied to the robot arm 5 by the person's hand 16 such that the speed of the hand position of the robot arm 5 may be changed, but the position should not be moved by an amount equal to or more than a certain threshold value.

The correction operation type determining unit 23 estimates and determines the correction type according to the correction type estimation process shown in the flowchart of FIG. 32, based on the force applied to the robot arm 5 by the person's hand 16, the information in the operation database 17, and the force applied to the target object, each acquired by the information acquiring unit 100. Here, the force is applied to the robot arm 5 by the person's hand 16, but the robot arm 5 is not shifted by an amount equal to or more than a certain threshold value. Therefore, in step S15 in FIG. 32, the correction operation type determining unit 23 determines the type "speed" as the correction type.

In the hybrid impedance control mode, while the robot arm 5 is being shifted in the position control mode, the force detecting unit 53 detects the force applied to the robot arm 5 by the person's hand 16 and the robot arm 5 is shifted in the direction in which the force has been applied to the robot arm 5 by the person's hand 16, in the impedance control mode.

Assuming that the time period it takes for the robot arm 5 to shift, e.g., from the position $(x_1, y_2, z_1)$ identified by the task ID and the operation ID in the operation database 17 to the robot arm 5's position $(x_2, y_2, z_2)$ identified by the next operation ID is $t_1$, when the speed of the robot arm 5 is changed by a force of the person's hand 16 (see FIG. 22B), that is, when the time period it takes to shift from the position $(x_1, y_2, z_1)$ to the position $(x_2, y_2, z_2)$ is changed from $t_1$ to $t_2$, the value time period $t_2$ is transmitted to the operation correction unit 20 via the control unit 22 and the control parameter managing unit 21. The operation correction unit 20 changes the time period $t_1$ to the time period $t_2$ for the operation information identified by the selected task ID, and transmits the same to the control parameter managing unit 21. The control parameter managing unit 21 instructs the control unit 22 to operate with the $t_2$ which is the corrected time period. Thus, the corrected operation as shown in FIG. 22C is achieved. Next, the operation storage unit 15 stores the time period $t_2$ in the operation database 17.

According to the procedure described in the foregoing, in a state where the robot arm 5 is in operation in the hybrid impedance control mode, a force applied to the robot arm 5 by the person's hand 16 allows the operation correction unit 20 to correct the operation speed of the robot arm 5, with reference to the information pieces of the position and orientation and the time period in the operation database 17.

Figure 35A:
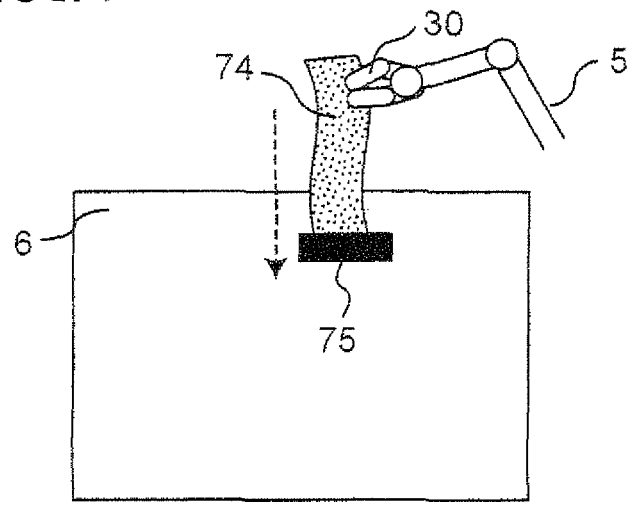
FIG. 35A is a view showing a manipulating state of the robot arm in the robot arm control apparatus according to the embodiment of the present invention.
Figure 35B:
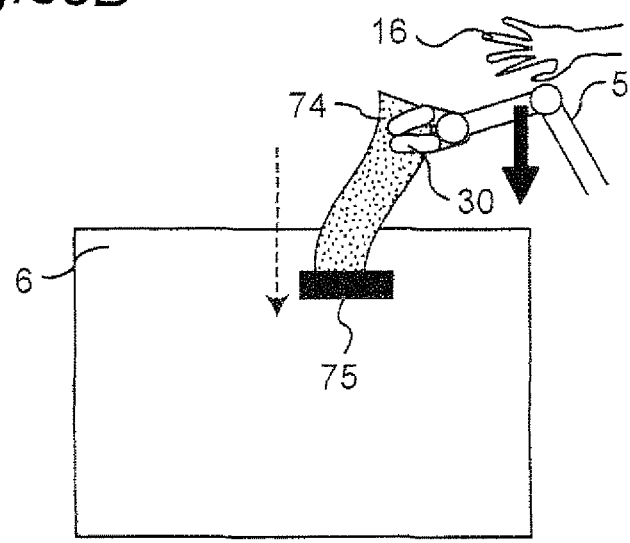
FIG. 35B is a view showing a manipulating state of the robot arm in the robot arm control apparatus according to the embodiment of the present invention.
Figure 35C:
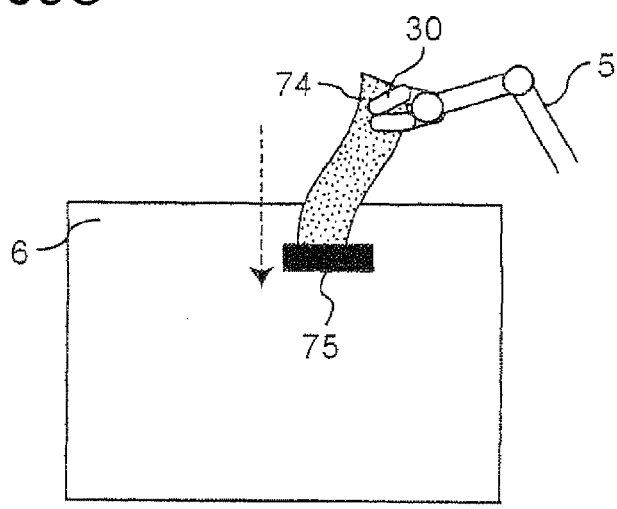
FIG. 35C is a view showing a manipulating state of the robot arm in the robot arm control apparatus according to the embodiment of the present invention.
Figure 35D:
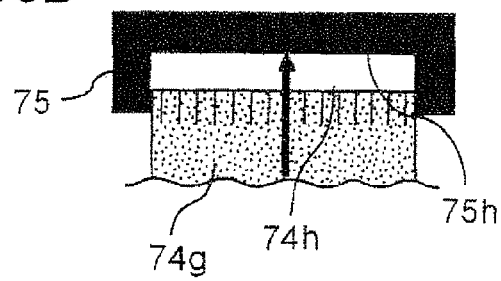
FIG. 35D is a view showing a manipulating state of the robot arm in the robot arm control apparatus according to the embodiment of the present invention (an enlarged view of an inserted portion of an insert slot shown in FIG. 35A)
Figure 35E:
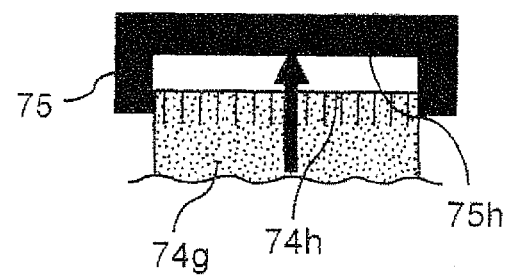
FIG. 35E is a view showing a manipulating state of the robot arm in the robot arm control apparatus according to the embodiment of the present invention (an enlarged view of an inserted portion of an insert slot shown in FIG. 35S)
Figure 35F:
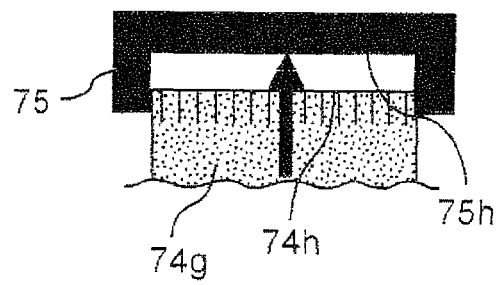
FIG. 35F is a view showing a manipulating state of the robot arm in the robot arm control apparatus according to the embodiment of the present invention (an enlarged view of an inserted portion of an insert slot shown in FIG. 35C)

Next, a description will be given of, as shown in FIG. 35B, a case in which a force to the task plane (e.g., the insert plane of the insert slot 75 of the device 6) in performing a task is to be changed; the robot arm 5 is directly gripped by the person's hand 16; and a force is applied to the robot arm 5 in the direction perpendicular to the task plane (e.g., the insert plane of the insert slot 75 of the device 6). This operation is shown in FIGS. 35A to 35F (FIGS. 35D to 35F are enlarged views showing around the insert slot 75). However, as to the operation similar to that shown in FIGS. 30A to 30F (FIGS. 30G to 30N are enlarged views showing around the insert slot 75) which show the previously described inserting task of the robot arm 5 inserting the flexible circuit board 74 into the insert slot 75, the description thereof will not be repeated.

The correction operation type determining unit 23 estimates and determines the correction type according to the correction type estimation process shown in the flowchart of FIG. 32, based on the force applied to the robot arm 5 by the person's hand 16, the information stored in the operation database 17, and the force applied to the target object, each acquired by the information acquiring unit 100. Here, the flexible circuit board 74 is brought into contact with the insert slot 75, the force of which being equal to or less than the "threshold value 2"; and a force is applied to the robot arm 5 by the person's hand 16, but the robot arm 5 is not shifted by an amount equal to or more than the certain threshold value. Therefore, in step S18, the correction operation type determining unit 23 determines the type "force correction" as the correction type.

At the timing where the correction operation type determining unit 23 determines the correction type to be the "force correction", the correction operation type determining unit 23 issues a command to the control parameter managing unit 21 to operate in the high-rigidity position control mode, from the force hybrid impedance control mode. In issuing the command from the correction operation type determining unit 23 to the control parameter managing unit 21, the correction operation type determining unit 23 in the high-rigidity position control mode can set high rigidity for each direction when controlling the positions. Therefore, for example, as to the flag of the operation whose task ID is "4" and the operation ID is "9" in the operation database 17 in FIG. 4, "1" is set for the 0th, 1st, 3rd, 4th, 5th and 8th bits. Therefore, the operation is performed in the force control mode as to the z-axis direction, and is performed in the hybrid impedance control mode as to the other directions. Accordingly, the correction operation type determining unit 23 issues a command to the control parameter managing unit 21 to operate in the high-rigidity position control mode as to the z-axis direction only, and to operate in the hybrid impedance control mode as to the other directions.

Next, as shown in FIG. 35B, when it is desired to change the inserting force to be greater (a greater force) by directly gripping the robot arm 5 by the person's hand 16 while the robot arm 5 is operating to perform the inserting task of the flexible circuit board 74, a force is applied downward to the robot arm 5 by the person's hand 16 toward the task plane (e.g., the insert plane of the insert slot 75 of the device 6). The high-rigidity position control mode is a mode with further higher rigidity than the position control mode being set for each direction under the hybrid impedance control mode. The high-rigidity position control mode can be achieved by increasing the gain in the positional error compensation unit 56 (specifically, about twice as great as that in the normal position control mode). In the high-rigidity position control mode, when a force is applied to the robot arm 5 by the person's hand 16, the robot arm 5 cannot easily be shifted, and the force detecting unit 53 can detect the force applied to the robot arm 5 by the person's hand 16. The force detected by the force detecting unit 53 of the control unit 22 is reported to the operation correction unit 20. The force reported to the operation correction unit 20 is stored by the operation storage unit 15 in the operation database 17. This makes it possible to correct the operation to perform insertion more forcibly (with a greater force). When the person desires to finish correcting, the person stops applying the force to the robot arm 5 by gripping the robot arm 5. In such a case where a force is not applied to the robot arm 5 by the person's hand 16, every component of the force becomes equal to or less than a threshold value, in step S2 in FIG. 32. Therefore, the correction operation type determining unit 23 determines "no correction" as the correction type (step S3 in FIG. 32). Upon receipt of the "no correction" information at the operation correction unit 20, the correction operation type determining unit 23 issues a command to the control parameter managing unit 21 to exert control in the hybrid impedance control mode, from the high-rigidity position control mode. Thus, the task is performed according to the operation database 17 after the correction is made.

According to the procedure described in the foregoing, in a state where the robot arm 5 is in operation in the hybrid impedance control mode, a force applied by the person's hand 16 allows the operation correction unit 20 to make a correction such that insertion task is performed with the corrected force, with reference to the force information in the operation database 17.

It is to be noted that, in the present example, the force control mode is switched to the high-rigidity position control mode for acquiring the force correction value. However, being different from the first embodiment, because the force detecting unit 53 detecting a force applied by the person and the target object force detecting unit 76 detecting a force applied to the target object are separately arranged, the force detecting unit 53 can detect a force applied by the person with the unchanged control mode, i.e., the force control mode. Further, in a case where the control is switched to the position control mode, the force detecting unit 53 is capable of performing detection also in the normal position control mode, without the necessity of changing the rigidity.

Figure 36A:
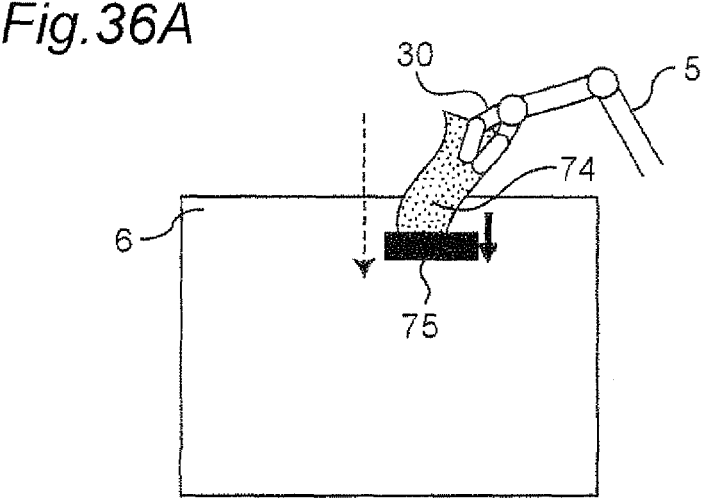
FIG. 36A is a view showing a manipulating state of the robot arm in the robot arm control apparatus according to the embodiment of the present invention.
Figure 36B:
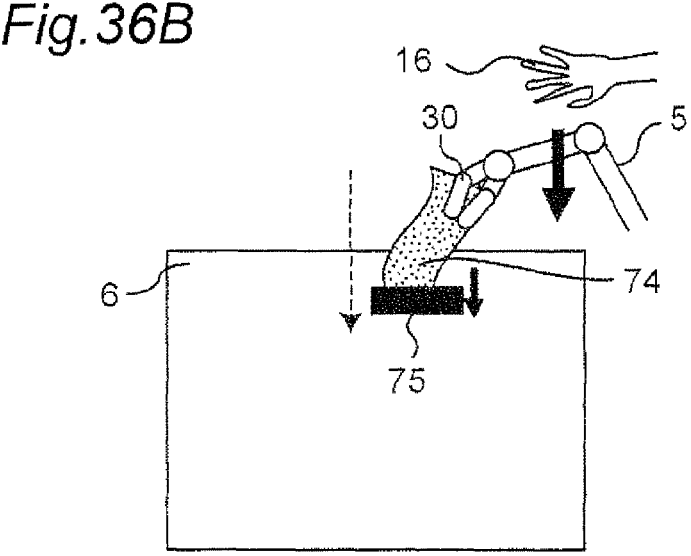
FIG. 36B is a view showing a manipulating state of the robot arm in the robot arm control apparatus according to the embodiment of the present invention.
Figure 36C:
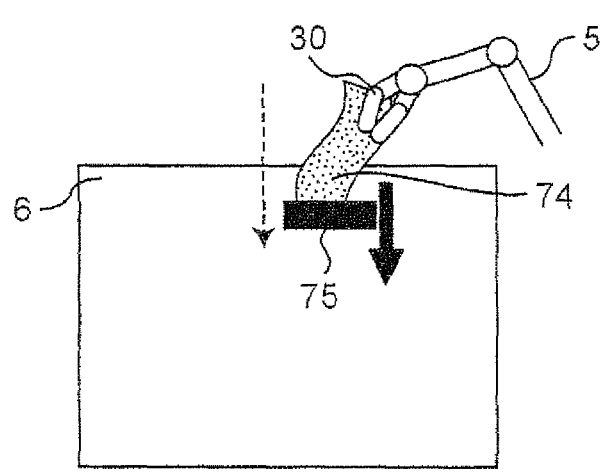
FIG. 36C is a view showing a manipulating state of the robot arm in the robot arm control apparatus according to the embodiment of the present invention.
Figure 36D:
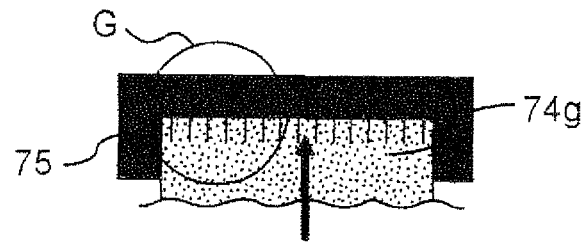
FIG. 36D is a view showing a manipulating state of the robot arm in the robot arm control apparatus according to the embodiment of the present invention (an enlarged view of an inserted portion of an insert slot shown in FIG. 36A)
Figure 36E:
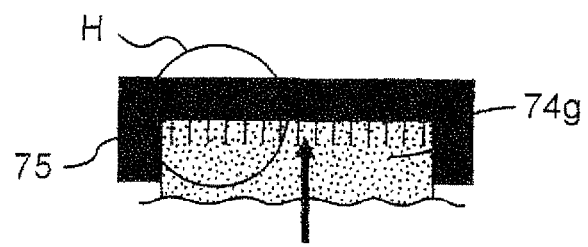
FIG. 36E is a view showing a manipulating state of the robot arm in the robot arm control apparatus according to the embodiment of the present invention (an enlarged view of an inserted portion of an insert slot shown in FIG. 36S)
Figure 36F:
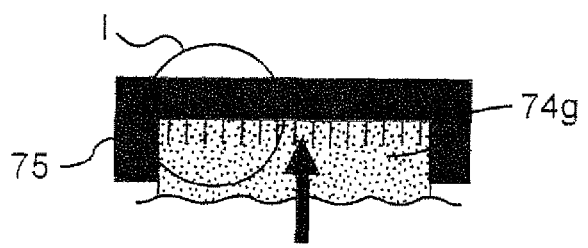
FIG. 36F is a view showing a manipulating state of the robot arm in the robot arm control apparatus according to the embodiment of the present invention (an enlarged view of an inserted portion of an insert slot shown in FIG. 36O)
Figure 36G:
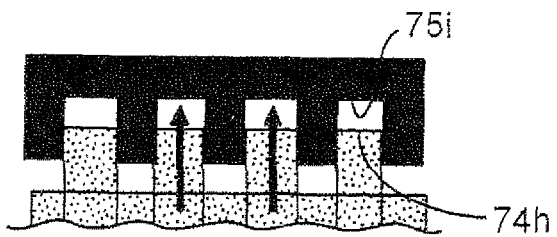
FIG. 36G is a view showing a manipulating state of the robot arm in the robot arm control apparatus according to the embodiment of the present invention (an enlarged view of a circle G shown in FIG. 36D)
Figure 36H:
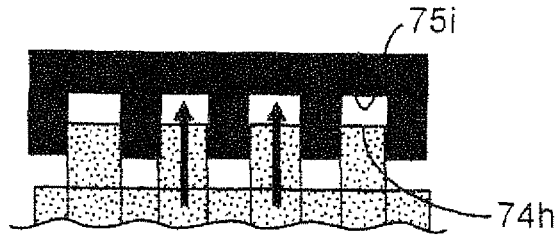
FIG. 36H is a view showing a manipulating state of the robot arm in the robot arm control apparatus according to the embodiment of the present invention (an enlarged view of a circle H shown in FIG. 36E)
Figure 36I:
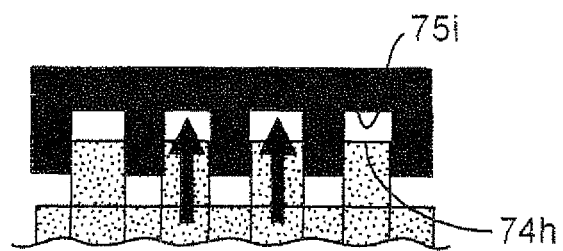
FIG. 36I is a view showing a manipulating state of the robot arm in the robot arm control apparatus according to the embodiment of the present invention (an enlarged view of a circle I shown in FIG. 36F).

Next, a description will be given of, as shown in FIG. 36B, a case in which a force to the task plane (e.g., the insert plane of the insert slot 75 of the device 6) in performing a task is to be changed, while an operation whose the task ID is "4", "11", or "12" is being performed; the robot arm 5 is directly gripped by the person's hand 16; and a force is applied to the robot arm 5 in the direction perpendicular to the task plane (e.g., the insert plane of the insert slot 75 of the device 6). This operation is shown in FIGS. 36A to 36I (FIGS. 36D to 36F are enlarged views showing around the insert slot 75, and FIGS. 36G to 36I are enlarged views of the encircled portions in FIGS. 36D to 36F). However, as to the operation similar to that shown in FIGS. 30A to 30F (FIGS. 30G to 30N are enlarged views showing around the insert slot 75) which show the previously described inserting task of the robot arm 5 inserting the flexible circuit board 74 into the insert slot 75, the description thereof will not be repeated.

The correction operation type determining unit 23 estimates and determines the correction type according to the correction type estimation process shown in the flowchart in FIG. 32, based on the force applied to the robot arm 5 by the person's hand 16, the information stored in the operation database 17, and the force applied to the flexible circuit board 74 being one example of the target object, each acquired by the information acquiring unit 100. Here, the flexible circuit board 74 is brought into contact with the insert slot 75, the force of which being equal to or greater than the "threshold value 2"; and a force is applied to the robot arm 5 by the person's hand 16. Therefore, in step S12, the correction operation type determining unit 23 determines the type "force correction" as the correction type. Here, only the "force correction" is selectable irrespective of the shift amount of the robot arm. This prevents the robot arm from shifting while the tip portion 74h of the flexible circuit board 74 is being inserted as shown in FIG. 36E, which may otherwise cause damage to the tip portion 74h of the flexible circuit board 74.

At the timing where the correction operation type determining unit 23 determines the correction type to be the "force correction", the correction operation type determining unit 23 issues a command to the control parameter managing unit 21 to operate in the high-rigidity position control mode, from the force hybrid impedance control mode. In issuing the command from the correction operation type determining unit 23 to the control parameter managing unit 21, the correction operation type determining unit 23 in the high-rigidity position control mode can set high rigidity for each direction when controlling the positions. Therefore, for example, as to the flag of the operation whose task ID is "4" and the operation ID is "9" in the operation database 17 in FIG. 4, "1" is set for the 0th, 1st, 3rd, 4th, 5th and 8th bits. Therefore, the operation is performed in the force control mode as to the z-axis direction, and is performed in the hybrid impedance control mode as to the other directions. Accordingly, the correction operation type determining unit 23 issues a command to the control parameter managing unit 21 to operate in the high-rigidity position control mode as to the z-axis direction only, and to operate in the hybrid impedance control mode as to the other directions.

Next, as shown in FIG. 35B, when it is desired to change the inserting force to be greater (a greater force) by directly gripping the robot arm 5 by the person's hand 16 while the robot arm 5 is operating to perform the inserting task of the flexible circuit board 74, a force is applied downward to the robot arm 5 by the person's hand 16 toward the task plane (e.g., the insert plane of the insert slot 75 of the device 6). The high-rigidity position control mode is a mode with further higher rigidity than the position control mode being set for each direction under the hybrid impedance control mode. The high-rigidity position control mode can be achieved by increasing the gain in the positional error compensation unit 56 (specifically, about twice as great as that in the normal position control mode). In the high-rigidity position control mode, when a force is applied to the robot arm 5 by the person's hand 16, the robot arm 5 cannot easily be shifted, and the force detecting unit 53 can detect the force applied to the robot arm 5 by the person's hand 16. The force detected by the force detecting unit 53 of the control unit 22 is reported to the operation correction unit 20. The force reported to the operation correction unit 20 is stored by the operation storage unit 15 in the operation database 17. This makes it possible to correct the operation to perform insertion more forcibly (with a greater force). When the person desires to finish correcting, the person stops applying the force to the robot arm 5 by gripping the robot arm 5. In such a case where a force is not applied to the robot arm 5 by the person's hand 16, every component of the force becomes equal to or less than a threshold value, in step S2 in FIG. 32. Therefore, the correction operation type determining unit 23 determines "no correction" as the correction type (step S3 in FIG. 32). Upon receipt of the "no correction" information at the operation correction unit 20, the correction operation type determining unit 23 issues a command to the control parameter managing unit 21 to exert control in the hybrid impedance control mode, from the high-rigidity position control mode. Thus, the task is performed according to the operation database 17 after the correction is made.

According to the procedure described in the foregoing, in a state where the robot arm 5 is in operation in the hybrid impedance control mode, a force applied by the person's hand 16 allows the operation correction unit 20 to make a correction such that insertion task is performed with the corrected force, with reference to the force information in the operation database 17.

It is to be noted that, in the present example, the force control mode is switched to the high-rigidity position control mode for acquiring the force correction value. However, being different from the first embodiment, because the force detecting unit 53 detecting a force applied by the person and the target object force detecting unit 76 detecting a force applied to the target object are separately arranged, the force detecting unit 53 can detect a force applied by the person with the unchanged control mode, i.e., the force control mode. Further, in a case where the control is switched to the position control mode, the force detecting unit 53 is capable of performing detection also in the normal position control mode, without the necessity of changing the rigidity.

A description will be given of, as shown in FIG. 23, an exemplary case in which the task undesired region RB is set to the assembly robot 1 through use of the robot arm 5.

When the data input IF 26 (e.g., the power button 26a of the console 26A) disposed at the top portion of the assembly robot 1 is powered on by the person's hand 16, the operation correction unit 20 issues a command to the control parameter managing unit 21 to operate in the impedance control mode. In a state where no task is selected by the operation selecting unit 29, as shown in FIG. 23, the hand 16 of the person 16A directly grips the robot arm 5 (e.g., the hand 30) to shift the robot arm 5 in the direction parallel to the task plane (e.g., the top plane of the workbench 7 where the device 6 is placed), to thereby shift the robot arm 5 (e.g., the hand 30) along the contour of the task undesired region RB. FIG. 25A shows the task plane (e.g., the top plane of the workbench 7 where the device 6 is placed) as viewed from above. In a case where the task undesired region RB is the hatched region, the person's hand 16 shifts the robot arm 5 (e.g., the hand 30) along the contour of the task undesired region RB, as indicated by arrows. Here, a mark 63 is applied to the center tip of the hand of the robot arm 5 (the hand 30) (see FIGS. 25A and 25B), and the robot arm 5 is shifted having the mark 63 point in the direction where a task performance is undesired.

In a case where: the correction operation type determining unit 23 executes the correction type estimation process shown in FIG. 32 and determines that it is not in operation in terms of the operation database 17 (step S4); and the shift amount for a certain time period is equal to or more than the certain threshold value, in step S8, the type "task undesired region" is determined as the correction type.

In the impedance control mode, the force detecting unit 53 detects the force applied to the robot arm 5 by the person's hand 16, and the robot arm 5 is shifted by the person's hand 16 in the direction in which the force has been applied to the robot arm 5. Thus, as shown in FIG. 25A, the robot arm 5 is shifted in order of the position $(x_1, y_1)$ the position $(x_2, y_2)$ the position $(x_3, y_3)$, and the position $(x_4, y_4)$. Here, these pieces of positional information are transmitted to the operation correction unit 20 via the control unit 22 and the control parameter managing unit 21. Upon receipt of the command, the operation correction unit 20 allows the operation storage unit to store the pieces of positional information as the information as to the task disapproved region RB in the task disapproved region database 28. The four positions' being the information as to the apices of the task disapproved region RB makes it possible to, for example, acquire hand positions of the robot arm 5 shifted by the person at certain intervals, to generate a region by connecting the coordinates of the acquired hand positions, and to regard it as the task disapproved region RB. Further, it is also possible to add a function for determining the shape to be taken by the region. For example, in a case where it is set as "rectangular", when the shift direction is changed by an angle of approximately 90 degrees, the position is stored as the apex information. In a case where it is set as "random", the hand positions of the robot arm 5 shifted by the person at certain intervals are acquired, to generate a region by connecting the coordinates of the acquire hand positions, and to regard it as the task disapproved region RB.

According to the procedure described in the foregoing, a force applied by the person's hand 16 allows the operation correction unit 20 to set the task undesired region.

By properly combining the arbitrary embodiments of the aforementioned various embodiments, the effects possessed by the embodiments can be produced.

INDUSTRIAL APPLICABILITY

The present invention is useful as a control apparatus and a control method for a robot arm, an assembly robot, a control program for a robot arm for an assembly robot, and a control-purpose integrated electronic circuit for a robot arm for an assembly robot, for controlling the operation of a robot arm of an assembly robot, for example in a situation where a robot, such as a robot performing assembly in a factory, performs a task in coordination with a person.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for controlling an operation of a robot arm of an assembly task-performing robot to perform an assembly task of assembling a target object gripped by the robot arm with respect to a targeted object, the control apparatus comprising:
   a force detecting unit that detects a force of a person acting on the robot arm;
   an information acquiring unit that acquires information regarding the operation of the robot arm, the acquired information including a position of the robot arm in the assembly task, and the force of the person detected by the force detecting unit;
   a target object force detecting unit that detects a force applied to the target object by the robot arm;
   an operation database that stores the information regarding the operation of the robot arm including the position of the robot arm in the assembly task;
   a correction operation type determining unit that determines a correction operation type for correcting the operation of the robot arm, the correction operation type being determined based on the information regarding the operation of the robot arm including the position of the robot arm acquired by the information acquiring unit, the force of the person acting on the robot arm acquired by the information acquiring unit, and the force applied to the target object detected by the target object force detecting unit, and the correction operation type being determined when the force detecting unit detects the force of the person acting on the robot arm during the performance of the assembly task of the robot arm based on the information regarding the operation of the robot arm stored by the operation database; and
   an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the performance of the assembly task of the robot arm based on the information regarding the operation of the robot arm stored by the operation database.

2. The control apparatus according to claim 1, wherein the acquired information regarding the operation of the robot arm includes, in correspondence to the assembly task performed by the robot arm, at least one of:
   information regarding the position and an orientation of the robot arm;
   information regarding a force applied to an assembly task plane by the robot arm;
   information regarding a direction of the robot arm;
   speed information regarding the robot arm; and
   task disapproved region information regarding a region where no task of the robot arm is performed.

3. The control apparatus according to claim 1, further comprising a display unit that displays information regarding the correction operation type based on the correction operation type determined by the correction operation type determining unit.

4. An assembly robot comprising:
   a robot arm; and
   the control apparatus according to claim 1 which controls the robot arm.

5. A control apparatus for controlling an operation of a robot arm of an assembly task-performing robot to perform an assembly task of assembling a target object gripped by the robot arm with respect to a targeted object, the control apparatus comprising:
   a force detecting unit that detects a force of a person acting on the robot arm;
   an information acquiring unit that acquires information regarding the operation of the robot arm, the acquired information including a position of the robot arm in the assembly task, and the force of the person detected by the force detecting unit;
   a target object force detecting unit that detects a force applied to the target object by the robot arm;
   a correction operation type determining unit that determines a correction operation type for correcting the operation of the robot arm, the correction operation type being determined based on the information regarding the operation of the robot arm acquired by the information acquiring unit, and the force applied to the target object detected by the target object force detecting unit; and
   an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the assembly task of the robot arm previously determined,
   wherein the acquired information regarding the operation of the robot arm includes, in correspondence to the assembly task performed by the robot arm, at least information regarding a force applied to a task plane by the robot arm, and
   wherein, based on the acquired information regarding the operation of the robot arm, (i) the operation correction unit sets a force control mode in which the robot arm performs the operation having a preset force acted on the task plane, for each of x-axis, y-axis, and z-axis directions in which the robot arm is shiftable and (ii), while the robot arm is performing the operation, the operation correction unit corrects, in accordance with the force of the person detected by the force detecting unit and acquired by the information acquiring unit, one of a magnitude and a direction of a set force included in the acquired information regarding the operation of the robot arm before a correction operation.

6. A control apparatus for controlling an operation of a robot arm of an assembly task-performing robot to perform an assembly task of assembling a target object gripped by the robot arm with respect to a targeted object, the control apparatus comprising:
   a force detecting unit that detects a force of a person acting on the robot arm;
   an information acquiring unit that acquires information regarding the operation of the robot arm, the acquired information including a position of the robot arm in the assembly task, and the force of the person detected by the force detecting unit;
   a target object force detecting unit that detects a force applied to the target object by the robot arm;
   a correction operation type determining unit that determines a correction operation type for correcting the operation of the robot arm, the correction operation type being determined based on the information regarding the operation of the robot arm acquired by the information acquiring unit, and the force applied to the target object detected by the target object force detecting unit; and an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the assembly task of the robot arm previously determined, wherein the acquired information regarding the operation of the robot arm includes, in correspondence to the assembly task performed by the robot arm:

information regarding the position and an orientation of the robot arm;

information regarding a direction of the robot arm;

speed information regarding the robot arm; and task disapproved region information regarding a region where no task of the robot arm is performed, and wherein, based on the acquired information regarding the operation of the robot arm, (i) the operation correction unit sets an impedance control mode in which the robot arm actuates in accordance with a force applied to the robot arm by the person while operating in a position control mode in which the position of the robot arm is controlled, the impedance control mode being set for each of x-axis, y-axis, and z-axis directions in which the robot arm is shiftable and, (ii) while the robot arm is operating the task, the operation correction unit corrects, in accordance with the force of the person detected by the force detecting unit and acquired by the information acquiring unit, the operation of the acquired information regarding the operation of the robot arm in the impedance control.

7. A control apparatus for controlling an operation of a robot arm of an assembly task-performing robot to perform an assembly task of assembling a target object gripped by the robot arm with respect to a targeted object, the control apparatus comprising:

a force detecting unit that detects a force of a person acting on the robot arm;

an information acquiring unit that acquires information regarding the operation of the robot arm, the acquired information including a position of the robot arm in the assembly task, and the force of the person detected by the force detecting unit;

a target object force detecting unit that detects a force applied to the target object by the robot arm;

a correction operation type determining unit that determines a correction operation type for correcting the operation of the robot arm, the correction operation type being determined based on the information regarding the operation of the robot arm acquired by the information acquiring unit, and the force applied to the target object detected by the target object force detecting unit; and an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the assembly task of the robot arm previously determined, wherein the correction operation type determining unit detects a shift amount of the position and an orientation of the hand of the robot arm, wherein, when the force applied to the target object detected by the target object force detecting unit and acquired by the information acquiring unit is less than a first threshold value and when the shift amount of the position and the orientation of the hand of the robot arm detected by the correction operation type determining unit is equal to or more than a third threshold value, the correction operation type determining unit determines a task plane position-and-orientation shift type as the correction operation type, and wherein the operation correction unit corrects the position and the orientation of the hand of the robot arm, in accordance with the force of the person detected by the force detecting unit and acquired by the information acquiring unit and the correction operation type determined by the correction operation type determining unit.

8. The control apparatus for a robot arm according to claim 7, further comprising a display unit that displays information regarding the correction operation type based on the correction operation type determined by the correction operation type determining unit.

9. A control apparatus for controlling an operation of a robot arm of an assembly task-performing robot to perform an assembly task of assembling a target object gripped by the robot arm with respect to a targeted object, the control apparatus comprising:

a force detecting unit that detects a force of a person acting on the robot arm;

an information acquiring unit that acquires information regarding the operation of the robot arm, the acquired information including a position of the robot arm in the assembly task, and the force of the person detected by the force detecting unit;

a target object force detecting unit that detects a force applied to the target object by the robot arm;

a correction operation type determining unit that determines a correction operation type for correcting the operation of the robot arm, the correction operation type being determined based on the information regarding the operation of the robot arm acquired by the information acquiring unit, and the force applied to the target object detected by the target object force detecting unit; and an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the assembly task of the robot arm previously determined, wherein the correction operation type determining unit detects a shift amount of the position and an orientation of the hand of the robot arm, wherein, when the force applied to the target object detected by the target object force detecting unit and acquired by the information acquiring unit is less than a first threshold value and when the shift amount of the position and the orientation of the hand of the robot arm detected by the correction operation type determining unit is less than a third threshold value, the correction operation type determining unit determines a speed correction type as the correction operation type, and wherein the operation correction unit corrects a speed of the robot arm, in accordance with the force of the person detected by the force detecting unit and acquired by the information acquiring unit and the correction operation type determined by the correction operation type determining unit.

10. A control apparatus for controlling an operation of a robot arm of an assembly task-performing robot to perform an assembly task of assembling a target object gripped by the robot arm with respect to a targeted object, the control apparatus comprising:

a force detecting unit that detects a force of a person acting on the robot arm;

an information acquiring unit that acquires information regarding the operation of the robot arm, the acquired information including a position of the robot arm in the assembly task, and the force of the person detected by the force detecting unit;

a target object force detecting unit that detects a force applied to the target object by the robot arm;

a correction operation type determining unit that determines a correction operation type for correcting the operation of the robot arm, the correction operation type being determined based on the information regarding the operation of the robot arm acquired by the information acquiring unit, and the force applied to the target object detected by the target object force detecting unit; and an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the assembly task of the robot arm previously determined, wherein the correction operation type determining unit detects a shift amount of the position and an orientation of the hand of the robot arm, wherein, when (i) a component of the force applied to the target object detected by the target object force detecting unit and acquired by the information acquiring unit exceeds a certain threshold value for a certain time period, (ii) the force applied to the target object detected by the target object force detecting unit and acquired by the information acquiring unit is equal to or less than another certain threshold value for a certain time period, and (iii) the shift amount of the position and the orientation of the hand of the robot arm detected by the correction operation type determining unit is equal to or more than a certain threshold value, the correction operation type determining unit determines a position-and-orientation correction type as the correction operation type, and wherein the operation correction unit corrects the position and the orientation of the robot arm, in accordance with the force applied to the target object detected by the target object force detecting unit and acquired by the information acquiring unit and the correction operation type determined by the correction operation type determining unit.

11. A control apparatus for controlling an operation of a robot arm of an assembly task-performing robot to perform an assembly task of assembling a target object gripped by the robot arm with respect to a targeted object, the control apparatus comprising:

a force detecting unit that detects a force of a person acting on the robot arm;

an information acquiring unit that acquires information regarding the operation of the robot arm, the acquired information including a position of the robot arm in the assembly task, and the force of the person detected by the force detecting unit;

a target object force detecting unit that detects a force applied to the target object by the robot arm;

a correction operation type determining unit that determines a correction operation type for correcting the operation of the robot arm, the correction operation type being determined based on the information regarding the operation of the robot arm acquired by the information acquiring unit, and the force applied to the target object detected by the target object force detecting unit; and an operation correction unit that corrects the operation of the robot arm by controlling the robot arm in accordance with the force of the person detected by the force detecting unit and acquired by the information acquiring unit and the correction operation type determined by the correction operation type determining unit, the operation of the robot arm being corrected during the assembly task of the robot arm previously determined, wherein, when (i) a component of the force applied to the target object detected by the target object force detecting unit and acquired by the information acquiring unit exceeds a certain threshold value for a certain time period, and (ii) the force applied to the target object detected by the target object force detecting unit and acquired by the information acquiring unit exceeds another certain threshold value for a certain time period, the correction operation type determining unit determines a force correction type as the correction operation type, and wherein the operation correction unit corrects the position and an orientation of the robot arm, in accordance with the force applied to the target object detected by the target object force detecting unit and acquired by the information acquiring unit and the correction operation type determined by the correction operation type determining unit.

12. A control method for controlling an operation of a robot arm of an assembly task-performing robot to perform an assembly task of assembling a target object gripped by the robot arm with respect to a targeted object, the control method being performed by a control apparatus and comprising:

detecting, via a force detecting unit of the control apparatus, a force of a person acting on the robot arm;

detecting, via a target object force detecting unit of the control apparatus, a force applied to the target object by the robot arm;

storing, via an operation database, information acquired by an information acquiring unit and regarding the operation of the robot arm including a position of the robot arm in the assembly task;

determining, via a correction operation type determining unit of the control apparatus, a correction operation type for correcting the operation of the robot arm, the correction operation type being determined based on (i) the stored information regarding the operation of the robot arm including the position of the robot arm acquired by the information acquiring unit, (ii) the force of the person acting on the robot arm detected by the force detecting unit, and (iii) the force applied to the target object detected by the target object force detecting unit, and the correction operation type being determined when the force detecting unit detects the force of the person acting on the robot arm during the performance of the assembly task of the robot arm based on the information regarding the operation of the robot arm stored by the operation database; and correcting the operation of the robot arm, via an operation correction unit of the control apparatus, by controlling the robot arm in accordance with the force of the person detected by the force detecting unit and the correction operation type determined by the correction operation type determining unit, the operation of the robot arm being corrected during the performance of the assembly task of the robot arm based on the information regarding the operation of the robot arm stored by the operation database.

13. A non-transitory computer-readable recording medium having a control program recorded thereon, the control program being for controlling a robot arm of an assembly task-performing robot and for controlling an operation of the robot arm for the assembly task-performing robot to perform an assembly task of assembling a target object gripped by the robot arm with respect to a targeted object, the control program causing a computer to execute a method comprising:

storing, via an operation database, information acquired by an information acquiring unit and regarding the operation of the robot arm including a position of the robot arm in the assembly task;

determining, via a correction operation type determining unit, a correction operation type for correcting the operation of the robot arm, the correction operation type being determined based on (i) the stored information regarding the operation of the robot arm including the position of the robot arm acquired by the information acquiring unit, (ii) a force of a person acting on the robot arm detected by a force detecting unit, and (iii) a force applied to the target object, as detected by a target object force detecting unit, and the correction operation type being determined when the force detecting unit detects the force of the person acting on the robot arm during the performance of the assembly task of the robot arm based on the information regarding the operation of the robot arm stored by the operation database; and correcting the operation of the robot arm, via an operation correction unit, by controlling the robot arm in accordance with the force of the person detected by the force detecting unit and the correction operation type determined by the correction operation type determining unit, the operation of the robot arm being corrected during the performance of the assembly task of the robot arm based on the information regarding the operation of the robot arm stored by the operation database.

14. A control-purpose integrated electronic circuit for controlling an operation of a robot arm of an assembly task-performing robot to perform an assembly task of assembling a target object gripped by the robot arm with respect to a targeted object, the control-purpose integrated electronic circuit comprising:

an operation database that stores information acquired by an information acquiring unit and regarding the operation of the robot arm including a position of the robot arm in the assembly task;

a correction operation type determining unit that determines a correction operation type for correcting the operation of the robot arm, the correction operation type being determined based on (i) the stored information regarding the operation of the robot arm including the position of the robot arm acquired by the information acquiring unit, (ii) a force of a person acting on the robot arm detected by a force detecting unit, and (iii) a force applied to the target object by the robot arm and detected by a target object force detecting unit, and the correction operation type being determined when the force detecting unit detects the force of the person acting on the robot arm during the performance of the assembly task of the robot arm based on the information regarding the operation of the robot arm stored by the operation database; and an operation correction unit that corrects the operation of the robot arm by controlling the robot arm in accordance with the force of the person detected by the force detecting unit and the correction operation type determined by the correction operation type determining unit, the operation of the robot arm being corrected during the performance of the assembly task of the robot arm based on the information regarding the operation of the robot arm stored by the operation database.

* * * * *